(12) United States Patent
Serikawa et al.

(10) Patent No.: US 6,347,092 B1
(45) Date of Patent: Feb. 12, 2002

(54) TIME DIVISION MULTIPLE ACCESS COMMUNICATION SYSTEM, SIGNAL RECEIVING METHOD IN TIME DIVISION MULTIPLE ACCESS COMMUNICATION SYSTEM, AND CENTER UNIT FOR USE IN TIME DIVISION MULTIPLE ACCESS COMMUNICATION SYSTEM

(75) Inventors: Atsuo Serikawa; Takayuki Ogawa, both of Tokyo; Takaya Yamamoto, Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/181,965

(22) Filed: Oct. 29, 1998

(30) Foreign Application Priority Data

Mar. 16, 1998 (JP) .......................................... 10-065926

(51) Int. Cl.[7] .................................................. H04J 3/06
(52) U.S. Cl. ...................................... 370/442; 370/509
(58) Field of Search ................................ 370/319, 322, 370/326, 328, 329, 336, 337, 347, 348, 349, 350, 442, 443, 444, 447, 458, 461, 462, 498, 503, 507, 508, 516, 517, 519, 509

(56) References Cited

U.S. PATENT DOCUMENTS

| | | | | |
|---|---|---|---|---|
| 4,262,356 A | * | 4/1981 | Lautier et al. | 370/323 |
| 5,561,846 A | * | 10/1996 | Hagio | 370/337 |
| 5,613,211 A | * | 3/1997 | Matsuno | 455/502 |
| 6,141,335 A | * | 10/2000 | Kuwahara et al. | 370/342 |

FOREIGN PATENT DOCUMENTS

| | | |
|---|---|---|
| JP | 63-237698 | 10/1988 |
| JP | 8-84128 | 3/1996 |

* cited by examiner

Primary Examiner—Kwang B Yao
(74) Attorney, Agent, or Firm—Rosenman & Colin LLP

(57) ABSTRACT

The present invention relates to a time division multiple access communication technique. A center unit for time division multiple access communications with a plurality of subscriber units comprises a channel receiving section for receiving a synchronization establishing signal with a variable receive timing, from each of the subscriber units as a varying channel signal and further for receiving, as a fixed channel signal, a communication signal from the synchronization established subscriber's unit at a constant timing, and a control section for controlling the receive processing in the channel receiving section so that the varying channel signal is receivable within a period for receiving the fixed channel signal.

38 Claims, 55 Drawing Sheets

FIG. 1
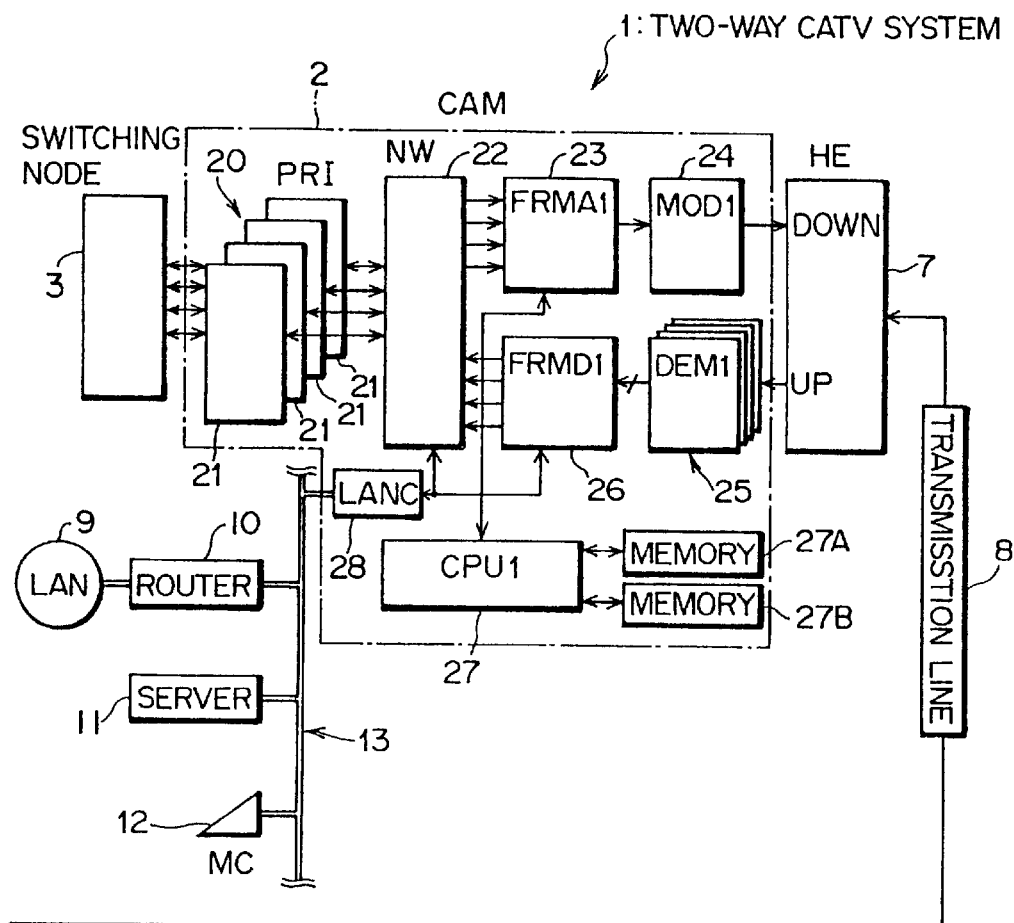
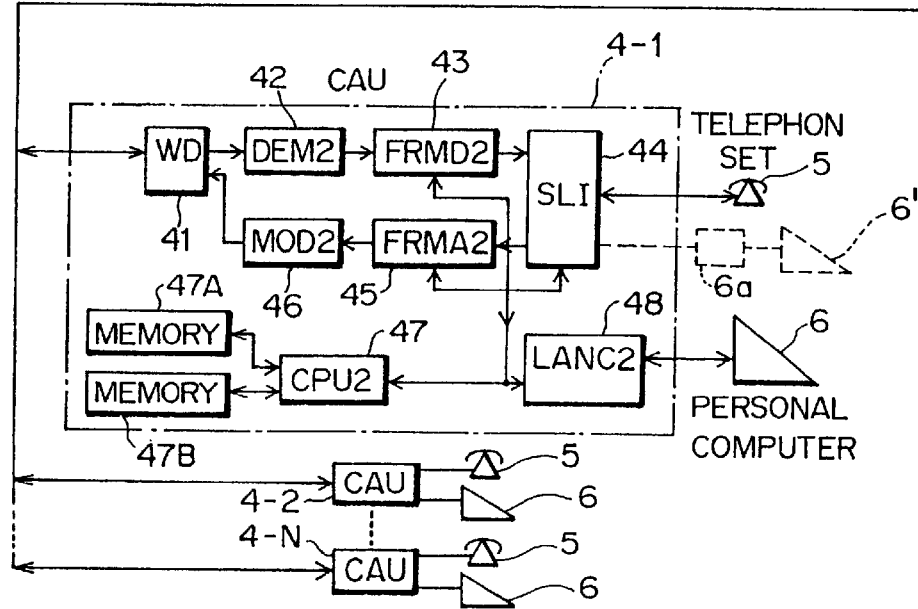

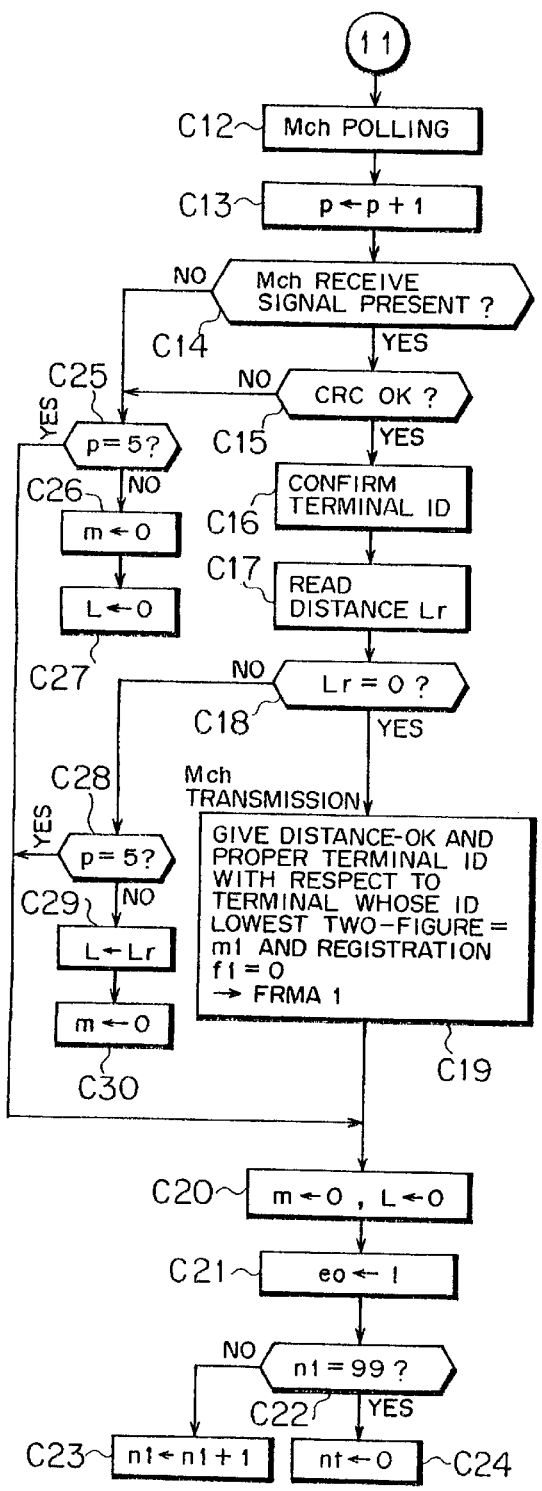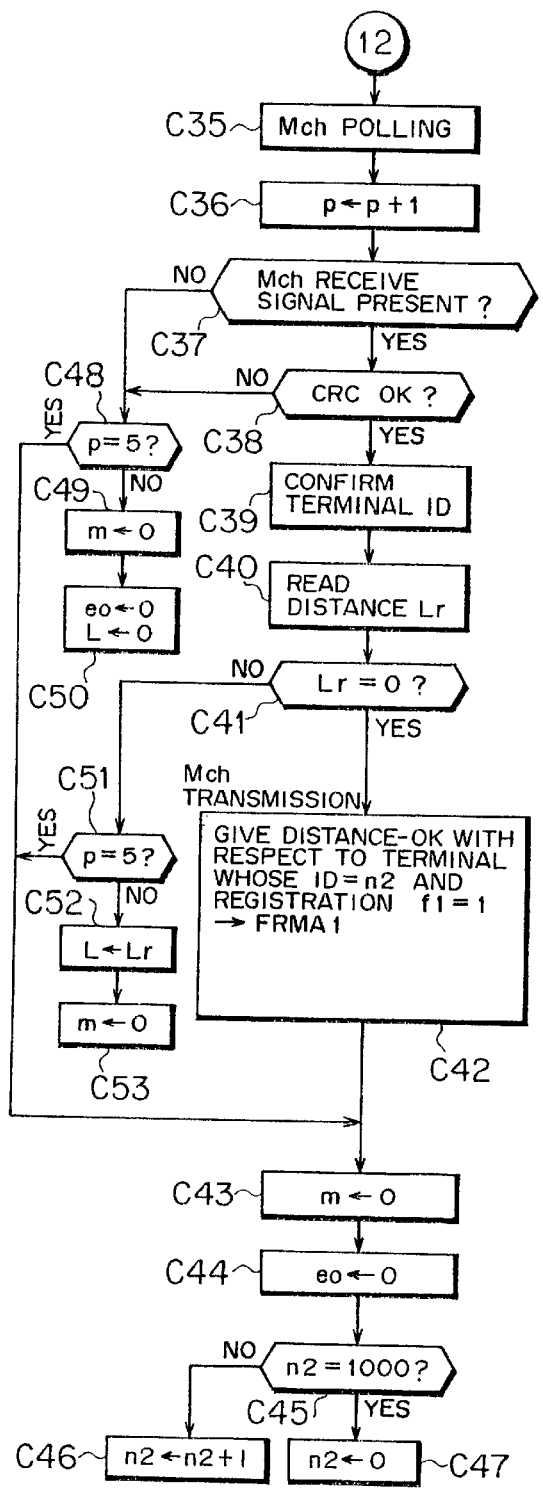

FIG. 45
RELATED ART

| TS No. | MF/F | | M ch / D ch | | B ch | | | | | | | | |
|---|---|---|---|---|---|---|---|---|---|---|---|---|---|
| FRAME No. | 00 | 01 | 02 | 32 | 33 | 34 | 35 | 36 | ~ | 124 | 125 | 126 | 127 |
| 00 | MF | | M ch | (1) | B0 | B1 | B2 | B3 | ~ | B91 | B92 | B93 | B94 |
| 01 | F | | M ch | (2) | B0 | B1 | B2 | B3 | ~ | B91 | B92 | B93 | B94 |
| 02 | F | | D ch | (1) | B0 | B1 | B2 | B3 | ~ | B91 | B92 | B93 | B94 |
| 03 | F | | D ch | (2) | B0 | B1 | B2 | B3 | ~ | B91 | B92 | B93 | B94 |
| 04 | F | | D ch | (3) | B0 | B1 | B2 | B3 | ~ | B91 | B92 | B93 | B94 |
| 05 | F | | D ch | (4) | B0 | B1 | B2 | B3 | ~ | B91 | B92 | B93 | B94 |
| 06 | F | | D ch | (5) | B0 | B1 | B2 | B3 | ~ | B91 | B92 | B93 | B94 |
| 07 | F | | D ch | (6) | B0 | B1 | B2 | B3 | ~ | B91 | B92 | B93 | B94 |
| 08 | F | | C ch | (1) | B0 | B1 | B2 | B3 | ~ | B91 | B92 | B93 | B94 |
| 09 | F | | C ch | (2) | B0 | B1 | B2 | B3 | ~ | B91 | B92 | B93 | B94 |
| ⋮ | ⋮ | | ⋮ | | ⋮ | ⋮ | ⋮ | ⋮ | ~ | ⋮ | ⋮ | ⋮ | ⋮ |
| 26 | F | | C ch | (19) | B0 | B1 | B2 | B3 | ~ | B91 | B92 | B93 | B94 |
| 27 | F | | C ch | (20) | B0 | B1 | B2 | B3 | ~ | B91 | B92 | B93 | B94 |
| 28 | F | | C ch | (21) | B0 | B1 | B2 | B2 | ~ | B91 | B92 | B93 | B94 |
| 29 | F | | C ch | (22) | B0 | B1 | B2 | B3 | ~ | B91 | B92 | B93 | B94 |
| 30 | F | | C ch | (23) | B0 | B1 | B2 | B3 | ~ | B91 | B92 | B93 | B94 |
| 31 | F | | C ch | (24) | B0 | B1 | B2 | B3 | ~ | B91 | B92 | B93 | B94 |

1 FRAME 125μs

TS : TIME SLOT, 1 TIME SLOT = 8 BITS
MF : MULTI FRAME BIT
F : FRAME BIT

M ch

C ch

D ch

B ch

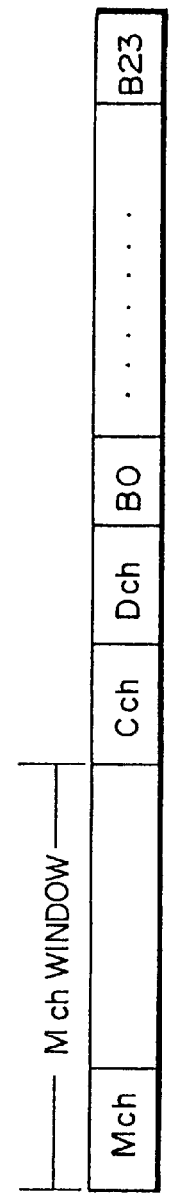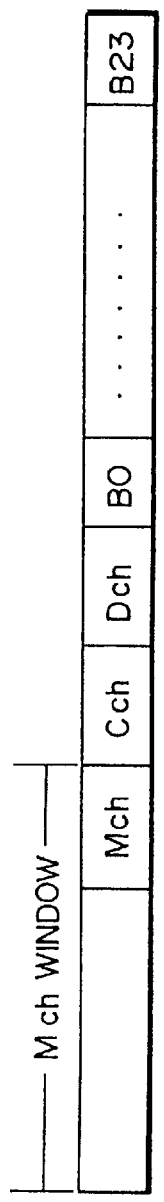
FIG. 61A
RELATED ART
FIG. 61B
RELATED ART

TIME DIVISION MULTIPLE ACCESS COMMUNICATION SYSTEM, SIGNAL RECEIVING METHOD IN TIME DIVISION MULTIPLE ACCESS COMMUNICATION SYSTEM, AND CENTER UNIT FOR USE IN TIME DIVISION MULTIPLE ACCESS COMMUNICATION SYSTEM

BACKGROUND OF THE INVENTION (1) Field of the Invention

The present invention relates to a time division multiple access communication system based upon a communication mode or method, called TDMA communication, a signal receiving method to be taken for the time division multiple access communication system, and a center unit to be employed for the time division multiple access communication system.

(2) Description of the Related Art

FIG. 43 is a block diagram showing one example of two-way (bidirectional) CATV (CAble TeleVision) system involving a TDMA communication mode. This two-way CATV system 1' shown in FIG. 43 is basically composed of a plurality of subscriber's units (that is, CAUs: Communication Access Units) 4-1 to 4-N (N denotes a natural number not less than 2) each being a home-use device and including terminals, such as a telephone set 5, a personal computer 6 and/or others, and a center unit (that is, CAM: Communication Access Master) 2' accommodating these CAUs 4-i (where i=1 to N) through a head end (HE) unit 7 and a necessary transmission line 8 such as a coaxial cable to execute centralized control of a TDMA communication protocol between the switching node 3 side and the CAU 4-i side.

In some cases, as indicated by a broken line in FIG. 43, in place of the telephone set 5, a personal computer 6' different from the aforesaid personal computer 6 is connected through a modem 6a to the foregoing CAU 4-i. In addition, when necessary, a desired communication network (in this case, a packet communication network dealing with packet data) such as a LAN (Local Area Network) 9 can be connected through a LAN transmission line 13 to the foregoing CAM 2'. Moreover, according to circumstances, in addition to a router 10 and a server 11 for the LAN 9, a maintenance console (MC) 12 which monitors the operating status of the CAM 2' and the CAU 4-i or the like is connected to the LAN transmission line 13.

Furthermore, as shown in FIG. 43, the CAM 2' comprises an interface section (PRI: Primary Rate Interface) 20 including a plurality of ISDN trunk cards 21, a network (NW) circuit 22, a frame assembling section (FRMA1: FRaMe Assemble 1) 23, a modulation section (MOD1) 24, demodulation sections (DEM1) 25, a frame disassembling section (FRMD1: FRaMe Disassemble 1) 26', a central processing unit (CPU1) 27, a non-volatile memory 27A, a volatile memory 27B, a LAN controller (LANC) 28, and other units. Further, each of CAUs 4-i is made up of a multiplexing and demultiplexing unit (WD) 41, a demodulation section (DEM2) 42, a frame disassembling section (FRMD2) 43, a single line interface (SLI) section 44, a frame assembling section (FRMA2) 45, a modulation section (MOD2) 46, a central processing section (CPU 2) 47, a non-volatile memory 47A, a volatile memory 47B, a data communication control unit 48, and others.

In the CAM 2', each of the trunk cards 21 constituting the interface section 20 is for interfacing with the switching node 3 side by converting a protocol (format) of a signal transmitted or received between the switching node 3 side and the CAM 2' side into a protocol suitable for each side, and the network circuit 22 is for conducting a switching operation of voice data (or personal computer data) between the switching node 3 and the telephone set 5 (or the personal computer 6), and is under control of the CPU 27.

The frame assembling section 23 assembles voice data (B channel) transmitted from each of the trunk cards 21 through the network circuit 22, a control signal (M channel, D channel) produced in the CPU 27 and packet data (C channel) transmitted from the LAN 9 through the LAN controller 28 into a TDMA signal (down-frame) having a frame format shown in FIG. 45.

This down-frame shown in FIG. 45 is made to be transmitted in the order from the left and upper side (time slot (TS) number=00, frame number=00) to the rightward direction (the direction that the TS number becomes higher) and the downward direction (the direction that the frame number becomes higher). In this case, a channel (data) corresponding to one frame [128 time slots (0 to 127) (1 time slot=8 bits)] is transmitted for 125 µs, and a channel corresponding to 1 multiframe (32 frames) is sent for 4 ms (=125 µs×32), thus providing a frame configuration with a transmission rate of 128 (TS)×8 (bits)×32 (frames)÷4 ms=8.192 Mbps.

Incidentally, in FIG. 45, F represents a frame bit showing a bit pattern indicative of the head of each frame, while MF designates a multiframe bit showing a bit-pattern representative of the head of a multiframe. The CAU 4-i establishes the bit synchronization with the CAM 2' on the basis of this down-frame, and synchronizes in multiframe on the basis of the MF.

Furthermore, an M channel (which will sometimes be referred hereinafter to as an Mch) primarily serves as a control channel to be used for when the CAM 2' measures the distance from the CAU 4-i and establishes the communication synchronization with the CAU 4-i. Concretely, when the transmission or reception of an M channel takes place with respect to a CAU 4-i which is not in the synchronized relation, the CAM 2' measures the delay of the transmission and reception timing (time-difference information) in the M channel occurring in accordance with the distance from the CAU 4-i (the length of the transmission line 8), and informs the CAU 4-i of that delay through the M channel, so that the CAU 4-i corrects its own signal transmission timing to establish the communication synchronization with the CAM 2'. As will be described herein later, the M channel is additionally used for a C-channel transmission halt request to the registered CAU 4-i or a periodical inquiry about the status (the turning-on/off of a power supply or the like) to the CAU 4-i.

Still further, a D channel (which will sometimes be referred hereinafter to as a Dch) serves as a calling process control channel between the switching node 3 and the CAM 2', and exchanges such as the transmission/reception about the telephone set 5 (or the personal computer 6) and the notification of an available B channel are done through this D channel. Further, a C channel (which will sometimes be referred hereinafter to as a Cch) acts as a packet communication channel, and is put to use for the transmission of packet data between the LAN 9 connected to the CAM 2' and the personal computer 6 connected to the CAU 4-i.

Moreover, a B channel (which will sometimes be referred hereinafter to as a Bch) is a channel for voice (sound) or data communication, and is put to use for the transmission of the voice (sound) data of the telephone set 5 (or the data of the personal computer 6') through the CAU 4-i. In this case, the B channel assuming 64 kbps (=8 bits÷125 μs) per frame (125 μs) is transmittable by a quantity corresponding to 95 channels (B0 to B94), which allows a maximum of 95 CAUs 4-i to simultaneously perform the communication. However, in the case of the ordinary communication, the simultaneous communication by the 95 CAUs 4-i is not very liable, and a free B channel is used properly. Accordingly, in this case, the CAM 2' can accommodate about 1000 CAUs 4-i.

Besides, the CPU 27 is made to give an ID (identification information) on the CAU 4-i, being the other party in the communication, to each of the aforesaid M channel, D channel and C channel, and as will be mentioned herein later, the CAU 4-i refers to each of the M channel, the D channel and the C channel it receives, and, when being addressed to its own, takes the channel data thereof and communicates it to the CPU 47.

Referring again to FIG. 43, the modulation section 24 modulates a down-frame created in the frame assembling section 23 by QPSK (Quadri-Phase Shift Keying) and further up-converts it into a radio-frequency (RF) signal. Further, in the head end unit 7 functioning as a two-way distributor, the down-frame up-converted is distributed to the transmission line 8 side, and then transmitted toward the CAU 4-i.

The demodulation sections 25 down-convert an up-frame (which will be mentioned later with reference to FIG. 46) coming from the CAU 4-i through the transmission line 8 and the HE unit 7, and QPSK-demodulate it. In this case, in the CAU 4-i, an up-frame including a B channel corresponding to a maximum of 24 channels (B0 to B23) is modulated with four types of frequencies, and the CAM2' receives it as a signal having a B channel corresponding to 95 channels (one channel is not put to use). For this reason, the four demodulation sections 25 exist corresponding to the respective frequencies.

The frame disassembling section 26' is for disassembling the up-frame demodulated in the aforesaid demodulation sections 25 into an M channel, a C channel, a D channel and a B channel, with the B channel data being transmitted through the network circuit 22 to the trunk card 21 side while the data of each of the M channel, the C channel and the D channel being outputted to the CPU 27.

Thus, concretely, each of the demodulation sections 25 is, as shown in FIG. 44, composed of a mixer (MIX) 25-1, a local oscillator (LO) 25-2, A/D (analog/digital) converters 25A-3 and 25B-3, a QPSK demodulator 25-4, a bit timing recovery (BTR) section 25-5, and a clock selection switch 25-6. The frame disassembling section 26' is made up of a channel demultiplexing section (DMPX) 26-1 including registers 26a to 26d for holding the B, M, C and D channel data, respectively, a timing generator (TG) 26-2, and a clock controller 26-3'.

In each of the demodulation sections 25, the mixer 25-1 mixes a signal (carrier regenerative signal) from the local oscillator 25-2 with a received signal (up-frame) from the CAU 4-i to separate the received signal into an in-phase component (I signal) and an orthogonal component (Q signal). Further, the A/D converters 25A-3 and 25B-3 sample the I and Q signals (analog signals) obtained by the mixer 25-1 in accordance with a sampling clock (ADCK) fed from the switch 25-6 to convert the I and Q signals into digital signals (I and Q sampled data), respectively.

The QPSK demodulator 25-4 is for demodulating an inputted signal (QPSK signal) on the basis of the phase difference between the I and Q sampled data obtained by the A/D converters 25A-3 and 25B-3, and the BTR section 25-5 is for detecting the reception of the M channel on the basis of the I and Q sampled data. This BTR section 25-5 is designed to measure the signal levels of the I and Q sampled data obtained in a manner that a clock (DCKM) with a frequency twice that of a system basic clock (CKM) is used as the sampling clock (ADCK), thus detecting the reception of the M channel with a high accuracy. A clock synchronizing with the signal receive timing (in other words, the signal transmission timing in the CAU 4-i) on that occasion is produced as an M-channel receive clock (CKS).

The clock selection switch 25-6 is for selecting (switching) the sampling clock (ADCK) to be supplied to the A/D converters 25A-3 and 25B-3. As will be mentioned herein later, it selects the system basic clock (CKM) as the sampling clock (ADCK) at the normal communication (after the establishment of the synchronization), and selects the aforesaid clock (DCKM) with a frequency twice that of the system basic clock (CKM) as the sampling clock (ADCK) for the M channel receive detection (M channel clock recovery) in the case of the detection of the reception of the M channel, and further, selects the M-channel receive clock (CKS), produced in the BTR section 25-5, as the sampling clock (ADCK) in the case of the reception of the M channel.

Meanwhile, in the frame disassembling section 26', the channel demultiplexing section 26-1 perceives the frame timing of the data demodulated in the QPSK demodulator 25-4 on the basis of a multiframe clock (MFCK) indicative of the head of a multiframe produced by the TG 26-2 and the system basic clock (CKM), and demultiplexes the demodulated data into M, C, D and B channel data in accordance with that frame timing.

Incidentally, this demultiplex processing is accomplished by detecting a peculiar unique word (UW) at every channel data in an up-frame which will be described herein later with reference to FIG. 46. Further, each of the demultiplexed channel data is temporarily stored in the corresponding one of the registers 26a to 26d, and the M, C and D channel data are communicated to the CPU 27 at an appropriate timing, while the B channel data is transmitted through the network circuit 22 to the switching node 3 side.

The TG 26-2 is for producing the aforesaid multiframe clock (MFCK), system basic clock (CKM) and M-channel receive detection clock (DCKM), and the clock controller 26-3' perceives the frame timing on the basis of the multiframe clock (MFCK) and system basic clock (CKM) coming from the TG 26-2, and creates a clock control signal (CKCNT) which controls the clock selection processing in the switch 25-6 to supply one of the aforesaid clocks (CKM, DCKM, CKS) as the sampling clock (ADCK) to the A/D converters 25A-3 and 25B-3.

For instance, in the case of the M channel coming from the CAU 4-i, irrespective of the establishment or no establishment of the synchronization, there is a possibility that its receive timing varies in accordance with the distance from the CAU 4-i, the clock controller 26-3' outputs a selection instructing signal of the clock (CKS) as the aforesaid clock control signal for a given time period called "M channel window" which will be mentioned herein later in order to sample and reproduce a received signal with the clock (CKS) synchronizing with the signal transmission timing of the CAU 4-i, and if the BTR section 25-5 recognizes that the signal level of the M channel is in a normal condition, the clock controller 26-3' issues the output signal [clock (CKS)] of the BTR section 25-5 which is in a synchronizing relation to the signal transmitted from the CAU 4-i.

On the other hand, since the C, D and B fixed channels (service channels) transmitted at a given timing from the CAU 4-i which is in the synchronized condition can be sampled with the system basic clock (CKM), the clock controller 26-3' is made to output the selection instructing signal of the clock (CKM) as the clock control signal (CKCNT).

Furthermore, in FIG. 43, the CPU 27 runs the centralized control of the TDMA communication in the CAM 2', and mainly provides the following functions (1) to (6):

(1) a call control function using the D channel between the switching node 3 and the CAM 2';

(2) a distance measuring function using the M channel between the CAM 2' and the CAU 4-i;

(3) a call control function using the D channel between the CAM 2' and the CAU 4-i;

(4) a communication function with the maintenance console 12 through the use of the LAN 9;

(5) a function of converting packet data obtained through the LAN controller 28 into C channel data to insert it into a down-frame to the CAU 4-i; and (6) a function of converting C channel data within an up-frame coming from the CAU 4-i into packet data to transmit it to the LAN 9 side.

Needless to say, the data such as software necessary for the operation of the CPU 27 and terminal IDs, which are needed to continuously retain irrespective of the turning-off of the power to the CAM 2', are stored in the non-volatile memory 27A, while the data such as flags and parameters necessary for the aforesaid various processing, which are to be initialized in response to the turning-off of the power to the CAM 2', are put in the volatile memory 27B.

The LAN controller 28 is controlled by the CPU 27 for taking charge of the control of the packet data given or taken between the LAN 9 and the CAM 2'.

Meanwhile, in the CAU 4-i, the distributor 41 serves as a two-way distributor having an up/down band-pass filter, and outputs a down-frame from the CAM 2' to the demodulation section 42 while outputting an up-frame from the modulation section 46, to be transmitted to the CAM 2', to the transmission line 8.

Furthermore, the demodulation section 42 down-converts a down-frame (RF signal) from the CAM 2' for the QPSK demodulation, and the frame disassembling section 43 disassembles the down-frame into the M, D, C and B channel data. At this time, if the ID of the M channel, the D channel or the C channel shows itself, that channel data is communicated to the CPU 47. In terms of the B channel, if the notice of the use of that B channel takes place through the D channel from the CAM 2', the B channel is supposed to be outputted through the SLI section 44 to the telephone set 5 (or outputted through the modem 6a to the personal computer 6').

Besides, this frame disassembling section 43 includes a register 431 for a registration flag f1 comprising 8 bits, for example, shown in FIG. 51, and if the frame-synchronization and bit-synchronization with the CAM 2' are established in a manner which will be described herein later, the data ("1") representative of the established synchronization (the completion of the registration) is set as the registration flag f1 in its least significant bit d0 (LSB) through the CPU 47. However, this registration flag f1 is reset when the down-frame becomes out of the multiframe-synchronization and the bit-synchronization at the turning-on of the power (that is, "0" is written therein).

The SLI section 44 functions as a subscriber's interface, that is, transmits the B channel data (voice data) from the frame disassembling section 43 to the telephone set 5 (or through the modem 6a to the personal computer 6') while outputting voice data from the telephone set 5 (or personal computer data coming from the personal computer 6' through the modem 6a) to the frame assembling section 45 so that it is transmitted as an up-frame to the CAM 2'.

Furthermore, the frame assembling section 45 allocates the B channel data from the SLI section 44 to one of time slots B0 to B23 designated by the CPU 47, and in the case of receiving the M channel and the D channel from the CPU 47 and in the case of receiving packet data as the C channel data from the personal computer 6 through the LAN controller 48, allocates the M channel data, the C channel data and the D channel data to the corresponding time slots, respectively, thereby assembling an up-frame shown in FIG. 46 as a transmission signal to the CAM 2'.

In FIG. 46, "M channel (Mch) window" denotes the time (variation) width (range: M channel variation allowable period) of the timing that the M channel transmitted from the CAU 4-i is received in the CAM 2', and this time width is set on the basis of the distance from the CAU 4-i being at a location remotest from the CAM 2'.

For instance, assuming that the distance between the CAM 2' and the CAU 4-i remotest from the CAM 2' is taken to be $L_{max}$ (km) and the delay time per 1 m of the transmission line 8 (coaxial cable) is taken as tx [ns (nanosecond)], the time width $M_{WIN}$ of "M channel window" is given as follows.

$$M_{WIN} = L_{max}(km) \times tx(ns) \times 2 = 2L_{max} \cdot tx(\mu s)$$

Further, adding the M channel data length $n_M$ ($\mu$s) ($n_M$ depicts an actual number equals to or greater than 0) thereto creates the following equation.

$$M_{WIN} = 2L_{max} \cdot tx + n_M(\mu s)$$

Moreover, as shown in FIGS. 47 to 49, each of the aforesaid M channel, C channel and D channel is configured to have a guard timing (G), a preamble (PR), a unique word (UW), a terminal ID, a data (DATA) part and a cyclic redundancy check (CRC) code, and as shown in FIG. 50, the B channel is structured to include a guard timing (G), a preamble (PR), a unique word (UW) and a data (DATA) part.

In these channels, the guard timing (G) is a signal which functions as a buffer time for, even if the CAU 4-i makes an error (several bits) about the M channel transmission timing, avoiding the influence on the channels before and after the M channel, with the transmission of the carrier (carrier signal) in the CAU 4-i being stopped during the guard timing. Further, the preamble (PR) is a signal (synchronization-bit) to be used for when the CAM 2' synchronizes with a signal from the CAU 4-i. For instance, a repetitive signal such as "0011" is transmitted therefor.

The unique word (UW) is a signal indicative of the end of the preamble (PR) and the head of the data (DATA) part, and when detecting this signal, the CAM 2' starts the reception of the data (DATA) part. Further, the terminal ID is a signal to be used for when the CAM 2' checks which CAU 4-i originates the received signal, and accordingly, a unique terminal ID is allocated to each of the CAUs 4-i.

The CRC is providing a function to detect an error (code error) about the received channel data in the CAM 2', and if an error is detected in the CAM 2' after the CRC processing, that channel data (DATA part) is treated as invalid data and a data re-transmission request is issued to the corresponding CAU 4-i. At this time, in response to the re-transmission request, the CAU 4-i again transmits the same data.

Incidentally, the reason why the B channel does not include the terminal ID as shown in FIG. 50 is that the CAM 2' can identify the CAU 4-i which originates the B channel it receives, since the time slot of the B channel each of the CAUs 4-i uses is reported through the D channel to the CAM 2'. In addition, the reason why there is no CRC code in the B channel is that the control on the CAM 2' becomes very complicated and difficult, with the re-transmission request caused by the communication error at the data communication using the B channel being usually done at end-end points in an upper layer.

Moreover, in FIG. 43, the modulation section 46, only in the case of receiving a signal from the frame assembling section 45, modulates that signal by QPSK and up-converts it into an RF signal to send the RF signal to the CAM 2'. In the case that there is the absence of a signal to be transmitted (including a condition during the aforesaid guard timing), the transmission of the carrier signal is also made to stop.

Furthermore, the CPU 47 is for conducting the centralized control of the TDMA communication in the CAU 4-i, and fulfills the following functions (1) to (4):

(1) a distance control function using the M channel;
(2) a call control function using the D channel;
(3) a LAN communication control function using the C channel; and
(4) an SLI control function.

In this case, this CPU 47 monitors the registration flag f1 set in the aforesaid register 431 (see FIG. 51), and when the registration flag f1 shows "0", outputs only an instruction for the transmission of the M channel to the frame assembling section 45, and when "1" constituting the registration flag f1 is written in the register 431, issues an instruction for the transmission of the M channel, the C channel, the D channel or the B channel to the frame assembling section 45 when necessary.

Besides, even in this case, the software necessary for the operation of the CPU 47, the terminal IDs and others are stored in the non-volatile memory 47A, while the flags, parameters and others necessary for the aforesaid various processing are put in the volatile memory 47B.

Secondly, a description will be made hereinbelow of an operation of the two-way CATV system 1' thus arranged.

First of all, let it be assumed that a down-frame is transmitted from the CAM 2' toward the CAU 4-i at a timing shown, for example, in (a) of FIG. 54. In this case, as shown in (c) of FIG. 54, the CAU 4-i receives the down-frame from the CAM 2' with a delay time equivalent to the distance from the CAM 2'.

In addition, in this state, assuming that, at time t0 in (a) of FIG. 54, the CAM 2' sets up a "response request signal" in the M channel (DATA part) of the down-frame and transmits it in order to establish the synchronization with the CAU 4-i which is not in a synchronizing condition yet (step B1 in FIG. 53), the CAU 4-i receives this M channel, for example, at time t1 shown in (c) of FIG. 54, and informs the CPU 47 of it.

Since the "response request signal" is set in the contents (DATA) of the informed M channel, the CPU 47 sets up a "response signal" in the M channel (DATA) of an up-frame to the CAM 2', and transmits the up-frame (M channel) to the CAM 2' at a receive timing (time t2) of the next down-frame, for example, as shown in (d) of FIG. 54 (step B2 in FIG. 53).

Meanwhile, at this time, in the frame disassembling section 26' of the CAM 2', at every head timing (every 4 ms) of the down-frame (multiframe), the clock controller 26-3' monitors whether or not the M channel is received from the CAU 4-i within the aforesaid "M channel window", and further conducts the above-mentioned clock switching processing in accordance with the detection of the reception of the M channel.

For instance, as shown in FIG. 52, assuming that the start time of the M channel window (the head timing of the down-multiframe) is taken as tM0 and the end time of the M channel window (the time of receiving the C channel from the CAU 4-i where the synchronization is established) is taken as tC0, the clock controller 26-3' monitors whether or not the present time t reaches the time tM0 (step A1, NO route from step A1). In this case, the clock controller 26-3' is equipped with a non-shown timer counter to take the present time t, and compares the present time t taken by this timer counter with the aforesaid time tM0 (tC0) to know the time tM0 (tC0).

Furthermore, at the time tM0, the clock controller 26-3' controls the switch 25-6 to supply the M-channel receive detection clock (DCKM) as the sampling clock (ADCK) for the A/D converters 25A-3 and 25B-3 (ADCK←DCKM: from step A1 through its YES route to step A2, see FIGS. 59 and 60). At this time, the counter value (the present time t) of the timer counter is incremented by one (t←t+1: step A3).

In this state, the clock controller 26-3' checks whether or not the present time t reaches the time tC0 (step A4). If not reaching the time tC0 (NO decision in step A4), the BTR section 25-5 decides, on the basis of the I and Q sampled data, whether the signal level representative of the reception of the M channel is detected (inputted) or not (step A5).

If this decision result shows no level detection (NO decision in step A5), the clock controller 26-3' repeatedly conducts the above-mentioned step A3 and following steps while the BTR section 25-5 monitors whether or not to detect the signal level indicative of the reception of the M channel [NO route from step A5, see (a) to (c) of FIG. 59].

In this case, for example, assuming that, as shown in (a) of FIG. 54, the M channel transmitted from the CAU 4-i at the time t2 [see (d) of FIG. 54] is received at the time t3 (t2<t3<tC0) and the signal level indicative of the reception of the M channel is detected within the "M channel window" [see (c) of FIG. 60], the clock controller 26-3' controls the switch 25-6 to switch (set) the sampling clock (ADCK) to the M channel receive clock (CKS) produced in synchronism with the inputted signal in the BTR section 25-5 as shown in (b) of FIG. 60 (ADCK←CKS: step A6). At this time, the counter value (the present time t) of the timer counter is further incremented by one (t←t+1: step A7).

Whereupon, the A/D converters 25A-3 and 25B-3 sample the inputted QPSK-demodulated signal in accordance with the M channel receive clock (CKS) to obtain the I and Q sampled data of the M channel. The I and Q sampled data obtained is demodulated and reproduced in the QPSK demodulation section 25-4 (step A8) and then outputted as the demodulated data to the channel demultiplexing section 26-1.

The channel demultiplexing section 26-1 refers to the unique word (UW) of the demodulated data inputted to identify that the demodulated data is the M channel, and stores the aforesaid DATA part subsequent to that UW in the Mch register 26b, and further, informs the clock controller 26-3' of the completion of the reception of the M channel at the time of the completion of the storage of the DATA part therein, while informing the CPU 27 of the M channel data (from step A9 through its YES route to step A10).

Subsequently, the CPU 27 checks, on the basis of the multiframe clock (MFCK) from the TG 26-2, the difference of the receive timing of the informed M channel data from the head of the multiframe, that is, calculates (measures) the delay time td [see (b) of FIG. 54] of the response signal from the CAU 4-i, and further sets that delay time td in the M channel of the down-frame at the timing [time t4 in (a) of FIG. 54] corresponding to the next multiframe clock (MFCK) and transmits the resultant to the CAU 4-i (distance correction+response request signal: step B3 in FIG. 53).

At this time, as the CAU 4-i lies at a position closer to the CAM 2', the M channel data (response) reaches more quickly to the CAM 2' so that the delay time td becomes shorter [see (a) to (d) of FIG. 55]. On the contrary, as the CAU 4-i stands at a location remoter therefrom, the M channel data reaches later to the CAM 2' so that the delay time td becomes longer [see (a) to (d) of FIG. 56]. For this reason, as mentioned before, the "M channel window" is required by a time width corresponding to the maximum distance (for example, 20 km) between the CAM 2' and the CAU 4-i.

On the other hand, at this time, on receiving the M channel receive completion notification from the channel demultiplexing section 26-1, the clock controller 26-3' continuously monitors the present time t while incrementing the counter value of the timer counter (NO route from step A11) until the present time t reaches the time tC0 (until the decision in Step A11 shows "YES"). When the present time t reaches the time tC0, the clock controller 26-3' controls the switch 25-6 to switch the sampling clock (ADCK) to the system basic clock (CKM) (from step A11 through its YES route to step A13), thus returning to the initial condition.

In the case of no completion of the M channel reception in the step A9, the clock controller 26-3' monitors whether or not the present time t reaches the time tC0 (from step A9 through its NO route to step A14), and while the time tC0 does not come, it repeatedly conducts the aforesaid step A7 and following steps (NO route from step A14), and when the time tC0 is reached, that is, since it is the end time of the "M channel window", it controls the switch 25-6 to switch the sampling clock (ADCK) to the system basic clock (CKM), then going back to the initial condition (from step A14 through its YES route to step A13).

Meanwhile, in the CAU 4-i, when receiving the M channel where the aforesaid delay time td is set therein, as indicated by the time t6 in (d) of FIG. 54, the CPU 47 again transmits the M channel as its response signal to the CAM 2' at a timing earlier by the delay time td than the transmission at the time t2 in (d) of FIG. 54 (step B4 in FIG. 53).

At the time of receiving the M channel from this CAU 4-i, if the delay time td disappears (td=0: that is, the synchronization is established) as indicated at the time t7 in (b) of FIG. 54, the CAM 2' informs the CAU 4-i of that effect or fact (distance-OK) through the use of the M channel (step B5 in FIG. 53). In the CAU 4-i, when receiving this distance-OK notification, the CPU 47 sets, to the frame assembling section 23, the condition that the use (transmission) of the M, C, D and B channels are possible (which is referred to as a registration). Whereupon, the CAU 4-i can transmit the M, C, D and B channels in synchronism with the head timing of the multiframe in the CAM 2' (step B6 in FIG. 53).

Thus, the CAM 2' can receive the M channel from the CAU 4-i at the head timing of the down-multiframe, and can establish the frame-synchronization and bit-synchronization between the up-frame from the CAU 4-i and the down-frame to the CAU 4-i. Accordingly, in the normal communications between the CAM 2' and the registered CAU 4-i, the head of the up-frame from the CAU 4-i always lies at the head of the down-multiframe.

In other words, although it is difficult to know the position of the M channel data, to be returned from the CAU 4-i which is to be newly registered (non-registered), in the "M channel window" (the timing at which the reception occurs), all the up-frames from the registered CAU 4-i which once measures the delay time gather at the head timing of the down-multiframe irrespective of the distance from the CAM 2' as shown in (a) to (d) of FIG. 57 and (a) to (d) of FIG. 58.

As described above, in the two-way CATV system 1', the synchronization establishing signals (response signal, response, distance correction, and others) for accomplishing the establishment of the synchronization in the TDMA communication between the CAM 2' and the CAU 4-i are given and taken (communicated) through the M channels therebetween, so that the CAU 4-i controls its own transmission timing to establish the synchronization in the TDMA communication with respect to the CAM 2'.

Incidentally, the service offering range (maximum transmission distance) the CATV system 1' covers, for example, assumes approximately 20 km through the following calculation if the M channel receive range in the up-frame is considered as shown in FIGS. 61A and 61B.

"$M$ channel window"=1 frame(8,192 bits)−($C_{ch}+D_{ch}+B_{ch}$×24 bits)=8,192−(532+276+276×24)bits=760 bits Now, since the area that the M channel itself takes within the "M channel window" is 108 bits (see FIG. 47), the M channel variation allowable area results in 760−108=652 bits. In this system 1', the transmission rate per bit of the up-frame is ¼ of that of the down-frame (8.192 Mbps) (that is, 2.048 Mbps), and therefore, when the aforesaid variation allowable area is converted into time, the following result is attainable.

652×(1÷2,048,000)=318.3($\mu$s)

In this case, since the time to be taken when a signal advances by 1 m (meter) in the transmission line 8 (coaxial cable) assumes 6 ns (nanosecond) in the worst case, the maximum transmission distance (the going and returning distance between the CAM 2' and the CAU 4-i) is as follows.

318.3($\mu$s)÷6(ns/m), that is, approximately 53 (km)

Accordingly, the maximum transmission distance between the CAM 2' and the CAU 4-i results in 53÷2=26.5 km, and will come to approximately 20 km if considering a margin.

Meanwhile, recently, the following requirements (1) and (2) exist on the market in terms of the above-described two-way CATV system 1':

(1) a request for the "M channel window" taking a wider range to cover a larger area such as an agricultural district as a service area; and (2) a strong request for the enhancement of the C channel throughput by the enlargement of the C channel band or the like with relation to the increase in the use of the LAN communication.

However, in the above-described two-way CATV system 1', as shown in FIG. 46, the CAM 2' is designed to receive the "M channel window" being the M channel (varying channel) receive allowable (possible) period in a state of completely distinguishing from the service channels such as the C, D and B channels [that is, when the reception of the M channel is not detected within the "M channel window", the system basic clock (CKM) is unconditionally used as the sampling clock (ADCK)], and therefore, meeting the above-mentioned requirements (1) and (2) creates the following problems:

(1) Enlarging the range of the "M channel window" requires the reduction of the band for the service channel (for example, the C channel), which causes the impairment of the service (LAN communication service); and (2) Widening the band for the C channel requires the reduction of the range of the "M channel window", so that the maximum distance between the CAM 2' and the CAU 4-i becomes short, which makes it difficult to cover a wide area as the service area.

SUMMARY OF THE INVENTION

The present invention has been developed with a view to eliminating the above-mentioned undesirable problems, and it is therefore an object of this invention to provide a time division multiple access communication system, a signal receiving method for use in the time division multiple access communication system, and a center unit to be employed in the time division multiple access communication system, which are capable of receiving a varying channel signal during a period of the reception of a fixed channel signal to prolong a variation allowable period of a varying channel without having any adverse influence on the receive period (band) of the fixed channel so that the distance between the center unit and a subscriber' unit is extensible.

For this purpose, in accordance with the present invention, there is provided a time division multiple access communication system comprising a plurality of subscriber's units and a center unit for performing a time division multiple access communication with respect to these subscriber's units, with a synchronization establishing signal being exchanged between the center unit and each of the subscriber's units for establishing the synchronization in the communication between the center unit and the subscriber's unit so that the subscriber's unit controls its own signal transmission timing to establish the synchronization of the communication with the center unit, wherein the center unit includes a channel receiving section for receiving the synchronization establishing signal from the subscriber's unit, whose receive timing is variable in accordance with a distance from the subscriber's unit, as a varying channel signal while receiving, as a fixed channel signal, a communication signal from the synchronization established subscriber's unit at a constant or predetermined timing, and further includes a control section for controlling receive processing in the channel receiving section so that the varying channel signal is receivable during a fixed channel receive period for receiving the fixed channel signal.

Furthermore, in accordance with this invention, there is provided a signal receiving method for use in a time division multiple access communication system comprising a plurality of subscriber's units and a center unit for performing a time division multiple access communication with respect to these subscriber's units, with a synchronization establishing signal being exchanged between the center unit and each of the subscriber's units for establishing the synchronization in the communication between the center unit and the subscriber's unit so that the subscriber's unit controls its own signal transmission timing to establish the synchronization in the communication with the center unit, wherein, when the center unit receives the synchronization establishing signal from the subscriber's unit, whose receive timing is variable in accordance with a distance from the subscriber's unit, as a varying channel signal while receiving, as a fixed channel signal, a communication signal from the synchronization established subscriber's unit at a constant timing, the reception of the varying channel signal takes place during a fixed channel receive period taken for receiving the fixed channel signal.

Still further, in accordance with this invention, there is provided a center unit for use in a time division multiple access communication system which comprises a plurality of subscriber's units, with a synchronization establishing signal being exchanged to/from each of the subscriber's units for establishing the synchronization in the communication so that the subscriber's unit controls its own signal transmission timing to establish the synchronization in the communication, the center unit comprising a channel receiving section for receiving the synchronization establishing signal from the subscriber's unit, whose receive timing is variable in accordance with a distance from the subscriber's unit, as a varying channel signal while receiving, as a fixed channel signal, a communication signal from the synchronization established subscriber's unit at a constant timing, and further comprising a control section for controlling receive processing in the channel receiving section so that the varying channel signal is receivable during a fixed channel receive period for receiving the fixed channel signal.

Thus, since the center unit can receive the varying channel signal from the subscriber's unit during the fixed channel receive period of receiving the fixed channel signal from the synchronization established subscriber's unit, it is possible to sharply prolong the receive allowable period of the varying channel signal as compared with before without having any adverse influence on the receive period of the fixed channel signal. Accordingly, this invention can construct a time division multiple access communication system which ensures a minimum of band necessary for the fixed channel signal while sharply extending the maximum distance between the center unit and the subscriber's unit to accommodate a wide area.

In this case, the center unit includes a varying channel receive detecting section for detecting the reception of the varying channel signal and a fixed channel receive detecting section for detecting the reception of the fixed channel signal, and when the varying channel receive detecting section detects the reception of the varying channel signal during the fixed channel receive period, the control section controls the receive processing in the channel receiving section to receive that varying channel signal. On the other hand, when the fixed channel receive detecting section detects the reception of the fixed channel signal during the fixed channel receive period, the control section controls the receive processing in the channel receiving section to receive that fixed channel signal.

Thus, the center unit can conduct the varying channel signal receive processing in response to the detection of the reception of the varying channel signal during the fixed channel receive period while performing the fixed channel signal receive processing in response to the detection of the reception of the fixed channel signal during the fixed channel receive period. Accordingly, the varying channel signal is certainly receivable even during the fixed channel receive period.

At this time, in the center unit, an arbitrary period other than the period for the reception of the varying channel signal from the synchronization established subscriber's terminal is set as the fixed channel receive period, and when the varying channel signal is received during this period, the probability that the varying channel signal and the fixed channel signal are received in an overlapping condition lowers, and therefore, the reliability of the receive processing on the respective channel signals improves. In addition, in this case, since the fixed channel receive period can properly be extended within the period other than the period for the reception of the varying channel signal from the synchronization established subscriber's terminal, the enhancement of the throughput of the fixed channel signal takes place to improve the service in the communications.

Moreover, it is also appropriate that, in the case that the varying channel signal and the fixed channel signal are received in an overlapping condition within the fixed channel receive period, the center unit sends a request for stopping the transmission of the fixed channel signal to the synchronization established subscriber's unit, while the subscriber's unit stops the transmission of the fixed channel signal when receiving this request from the center unit.

With this configuration, it is possible to avoid the situation that the varying channel signal from the synchronization non-established subscriber's unit is not received in a normal way to thus make it indefinitely difficult to establish the synchronization with the same subscriber's unit, which greatly contributes to the improvement of the reliability on the entire system.

If the fixed channel receive period is set to coincide with the receive period of a channel signal in packet communication, not only the varying channel signal receive allowable period is extensible, but also the band for the packet communication is extensible to enhance its throughput, so that the service in the packet communication is improvable.

Furthermore, if the fixed channel receive period is set to coincide with a period for the reception of a portion of a plurality of packet communication channel signals, there is a possibility that a portion of the channel signals is not normally received because of overlapping with the reception of the varying channel signal. For this reason, it is also possible to make a difference in communication charge between the use of a portion of channels (lines) and the use of the other channels, for example, to set the communication charge in the packet communication using the portion of the channels cheaper than the charge in the packet communication using the other channels. Thus, it is possible to flexibly offer the communication service in answer to the needs from the users.

Still further, if the fixed channel receive period is set to be the receive period of a call control channel signal, likewise, not only the varying channel signal receive allowable period is extensible, but also the band for the call control communication can be extended to enhance its throughput, so that the call control processing can be speedy.

Besides, if the fixed channel receive period is set to be the receive period of a portion of a plurality of call control channel signals, even in this case, for examples it is possible to make a difference in communication charge between a portion of channels and the other channels, so that offering the flexible communication service to the needs from the users becomes possible.

Moreover, if the fixed channel receive period is set to be the receive period of a data communication channel signal, in addition to prolonging the varying channel signal receive allowable period, the band for the data communication can be extended to enhance its throughput, with the result that the service in the data communication is improvable.

Still further, if the fixed channel receive period is set to be the receive period of a portion of a plurality of data communication channel signals, even in this case, for example, it is possible to make a difference in communication charge between a portion of channels and the other channels, so that offering the flexible communication service to the needs from the users becomes possible.

Still further, if the fixed channel receive period is set to be the receive period of a plurality of channel signals different in application from each other, in addition to prolonging the varying channel signal receive allowable period, each of the bands for the different types of communication can be extended to enhance the throughput in each communication, which allows the improvement of the service in each communication and the offering of more flexible communication service to the needs from the users.

If the aforesaid plurality of channel signals comprise an arbitrary combination of a packet communication channel signal(s), a call control channel signal(s) and a data communication channel signal(s), to the needs from the users, the band for one arbitrarily selected from the packet communication, the call control communication and data communication can be extended to enhance the throughput in each communication.

BRIEF DESCRIPTION OF THE DRAWINGS

FIG. 1 is a block diagram showing a two-way CATV communication system (TDMA communication system) according to an embodiment of the present invention;

FIGS. 6A and 6B are flow charts useful for explaining a basic operation of the CAM 2 (CPU 27) in this embodiment;

FIG. 45 is an illustration of one example of a format of a down-frame in the two-way CATV system shown in FIG. 43;

FIGS. 61A and 61B are illustrations of an up-frame format for describing the maximum transmission distance in the two-way CATV system shown in FIG. 43.

DESCRIPTION OF THE PREFERRED EMBODIMENTS

Figure 2:
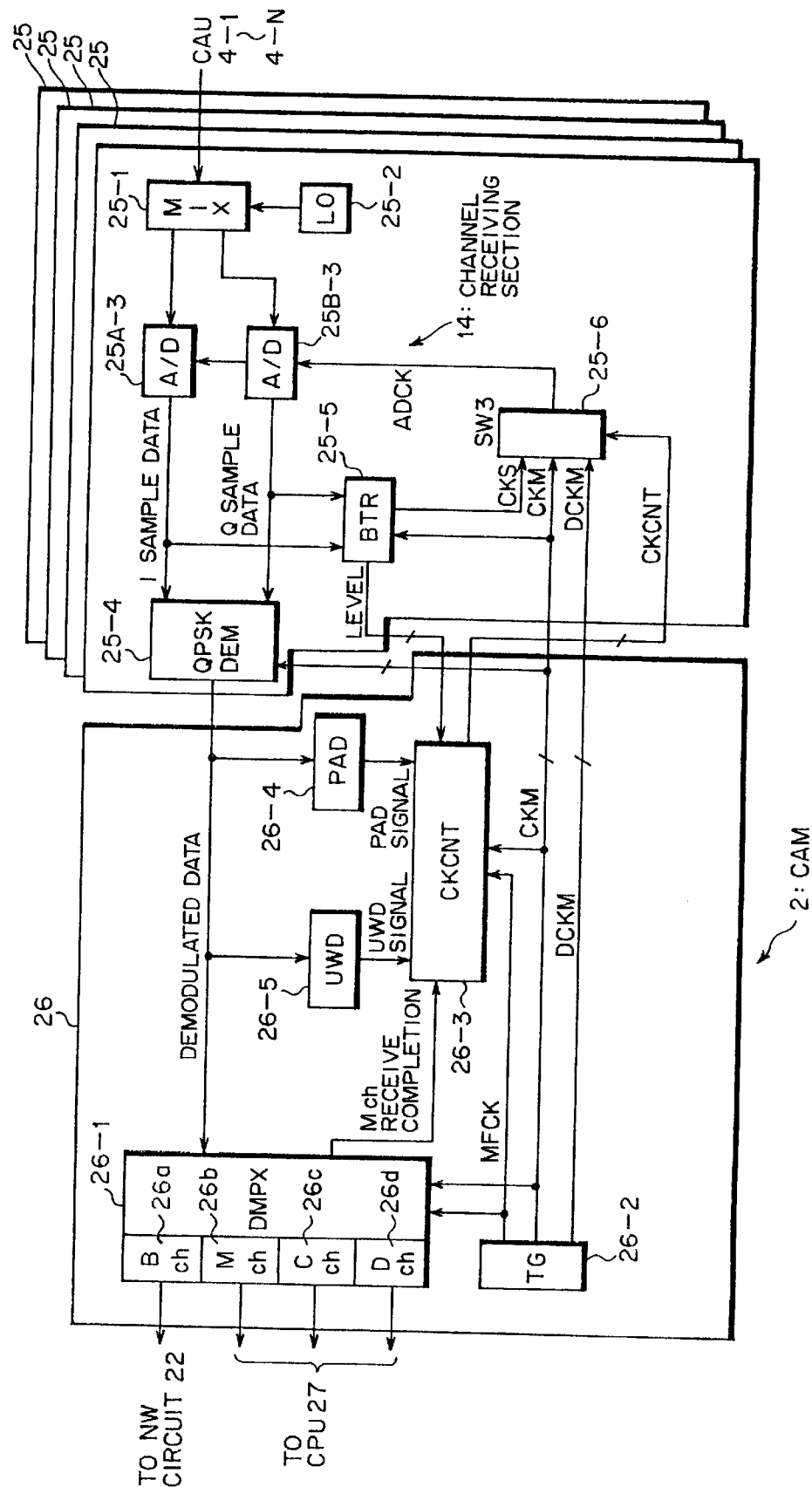
FIG. 2 is a block diagram showing detailed arrangements of a demodulation section and frame disassembling section in a CAM 2 in this embodiment.

Embodiments of the present invention will be described hereinbelow with reference to the drawings.

FIG. 1 is a block diagram showing a two-way (bidirectional) CATV communication system (TDMA communication system) according to an embodiment of the present invention. As well as the system 1' shown in FIG. 43, this system, generally designated at numeral 1 in FIG. 1, is composed of a plurality of subscriber's units (CAUs) 4-1 to 4-N (N denotes a natural number not less than 2) each installed in a home, for example, accommodating a terminal such as a home-use telephone set 5 and personal computer 6, and a center unit (CAM) 2 accommodating these CAUs 4-i (i=1 to N) through a head end (HE) unit 7 and a required transmission line 8 comprising a coaxial cable or the like for executing the centralized control of a TDMA communication protocol between the sides of a switching node 3 and the CAU 4-i.

Likewise, the aforesaid CAU 4-i can also be connected through a modem 6a to another personal computer 6' substituting for the telephone set 5 as indicated by a broken line in FIG. 1. Further, the aforesaid CAM 2 is connectable through a LAN transmission line 13 to a packet communication network such as a LAN 9 dealing with packet data when necessary. Still further, in addition to a router 10 or server 11 for the LAN 9, a maintenance console (MC) 12 for monitoring the operating conditions of the CAM 2 and the CAU 4-i and others are properly connected to the LAN transmission line 13.

Furthermore, in the two-way CATV system 1 according to this embodiment, likewise, a synchronization establishing signal (a response request, a response, a distance correction, and others) for establishing the synchronization in the TDMA communication is exchanged in the form of the M channel signal between the CAM 2 and the CAU 4-i, whereupon the CAU 4-i goes into a synchronization established relation to the CAM 2 in the TDMA communication by controlling its own signal transmission timing. Incidentally, the transmission signal (down-frame) to the CAU 4-i and the transmission signal (up-frame) from the CAU 4-i basically have structures (formats) similar to those mentioned before with reference to FIGS. 46 to 50.

Figure 43:
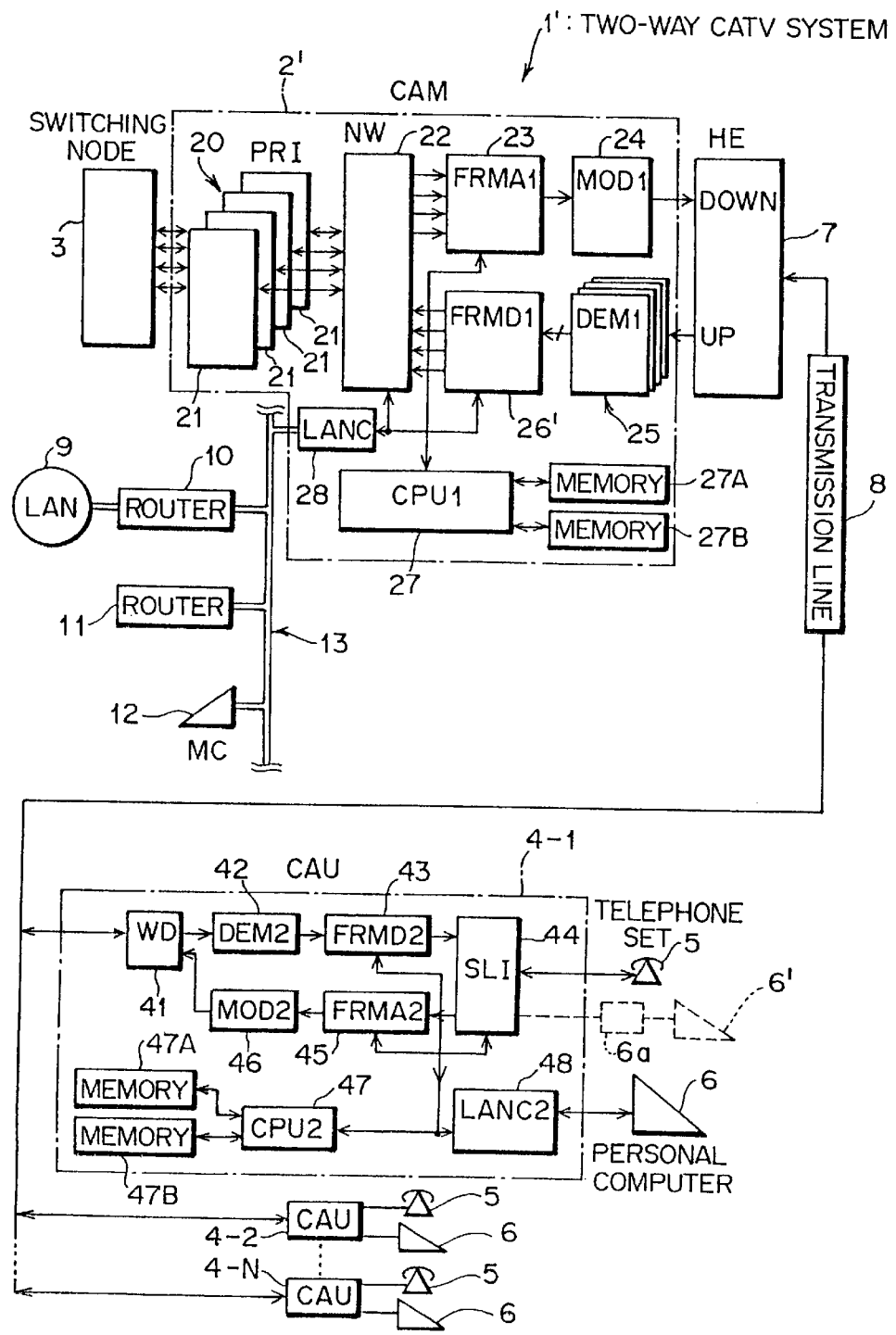
FIG. 43 is a block diagram showing one example of two-way CATV systems based upon a TDMA communication mode.

In this embodiment, the CAM 2 is, as shown in FIG. 1, equipped with a frame disassembling section 26 in place of the frame disassembling section 26' of the CAM 2' (see FIG. 43). The components or parts of the CAM 2 are the same as those described before with reference to FIG. 43 except this frame disassembling section 26, whereas the components of the CAU 4-i are the same as those described before with reference to FIG. 43.

Figure 3:
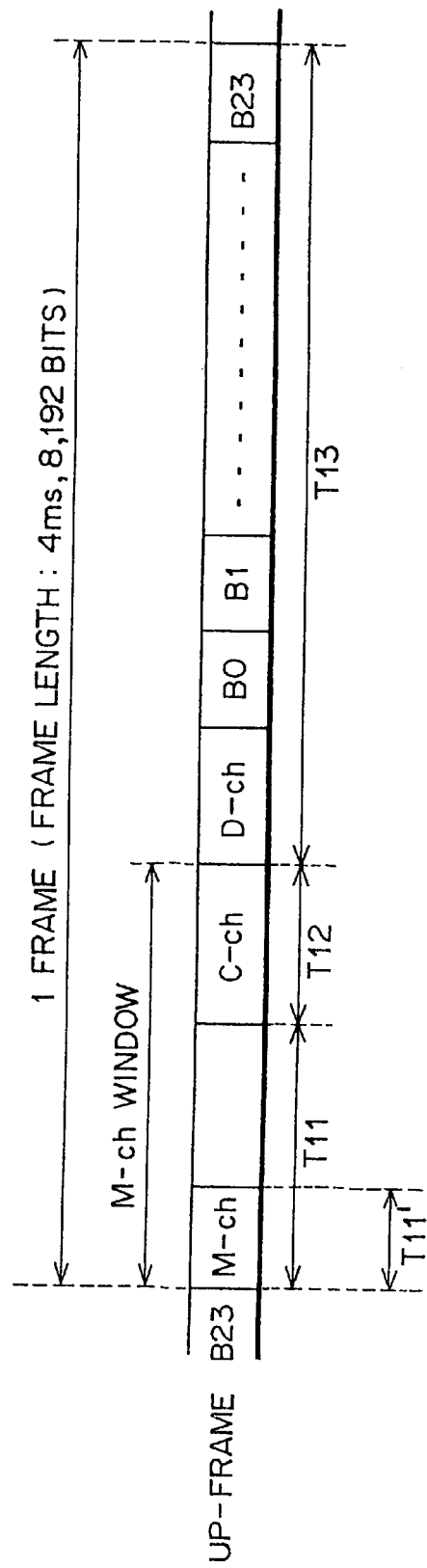
FIG. 3 is an illustration of one example of an up-frame format in this embodiment.

Likewise, the frame disassembling section 26 is for the purpose of disassembling the up-frame demodulated in demodulation sections 25 into the M channel, the C channel, the D channel and the B channel, but in this embodiment, for example, as shown in FIG. 3, the receive processing control for the respective channels are conducted so that the M channel from a non-registered CAU 4-i is receivable during the receive period (fixed channel receive period) T12 of a fixed channel (service channel), for example, the C channel, thereby allowing the extension of the "M channel window" (M channel variation allowable period) in the up-frame.

For instance, in FIG. 3, only the M channel is received during the period T11, and during the period T12, the receive processing control is conducted to receive the M channel when the M channel is transmitted from the CAU 4-i, while the receive processing control is done to receive the C channel when the C channel is transmitted from the CAU 4-i.

Figure 44:
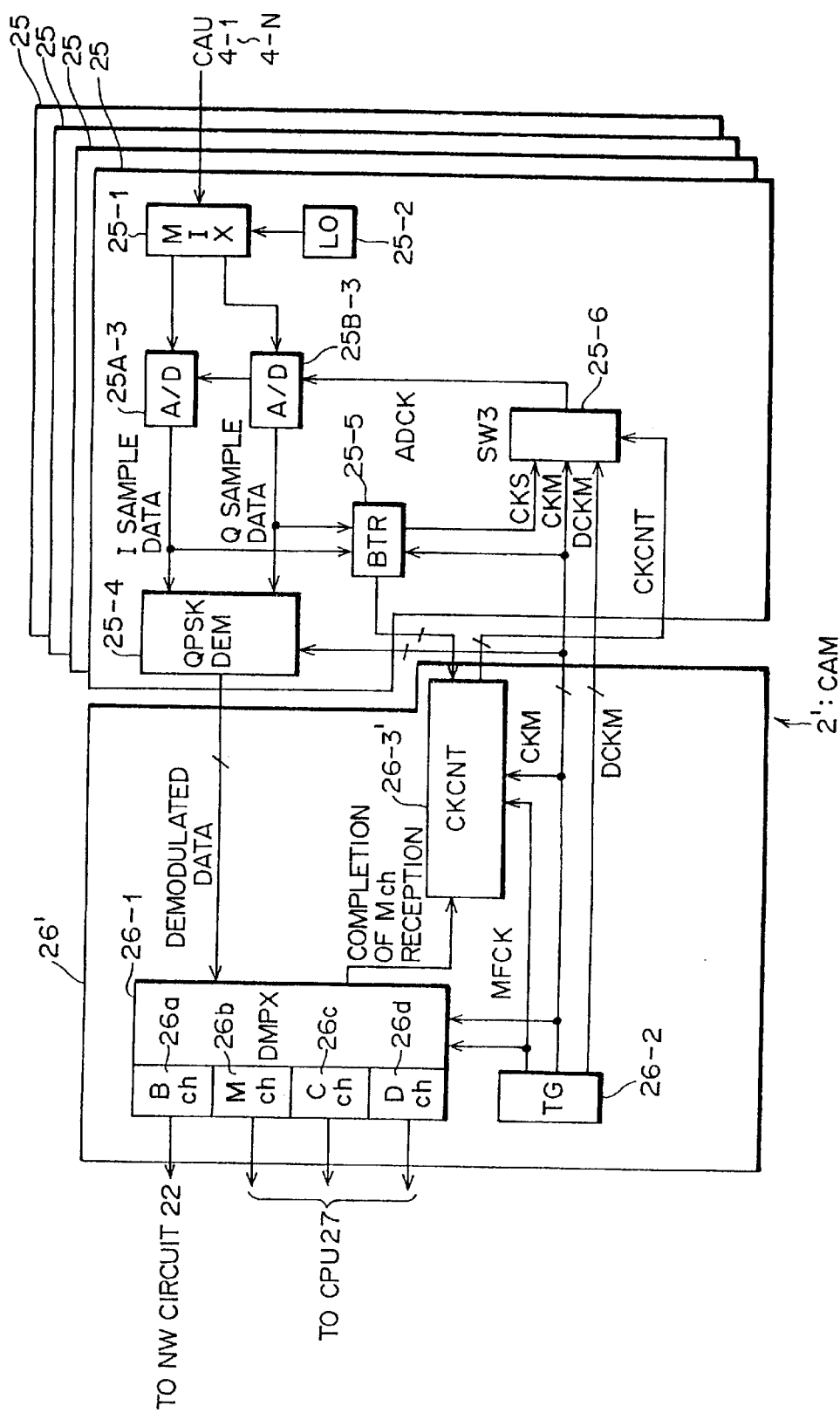
FIG. 44 is a block diagram showing detailed arrangements of a demodulation section and frame disassembling section in the CAM shown in FIG. 43.
Figure 46:
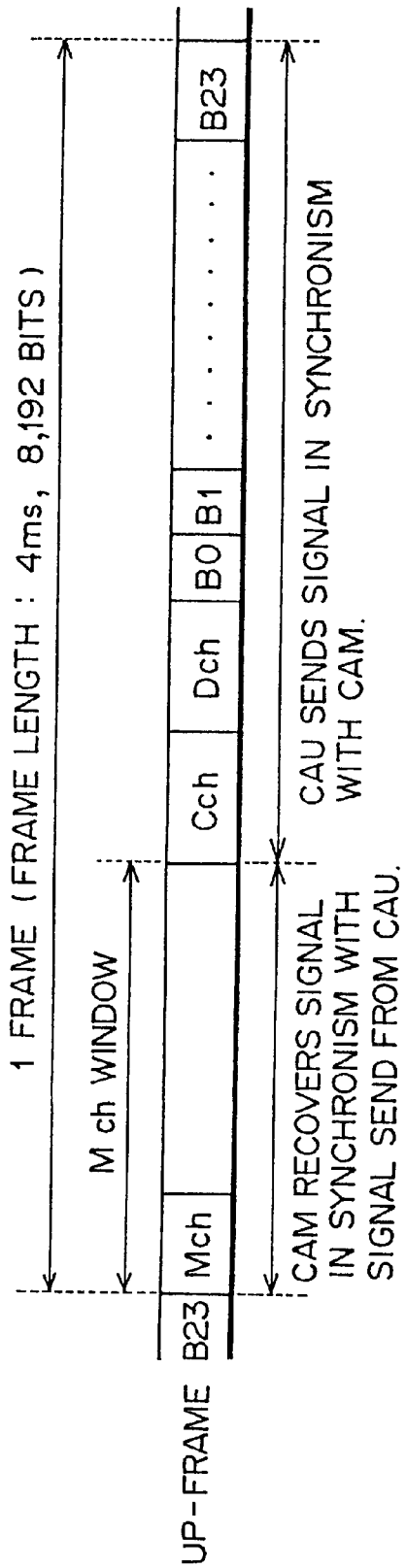
FIG. 46 is an illustration of one example of an up frame format in the two-way CATV system shown in FIG. 43.
Figure 47:
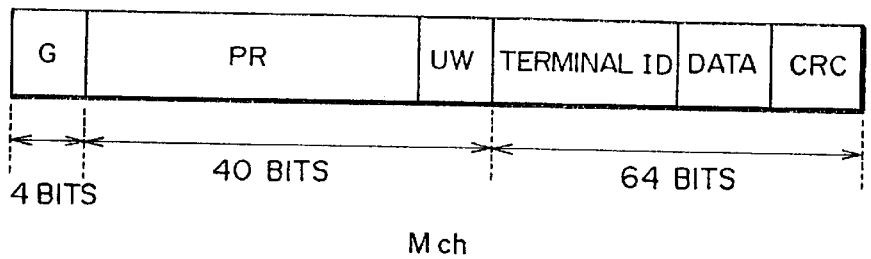
FIG. 47 is an illustration of one example of an M channel format in the two-way CATV system shown in FIG. 43.

In this embodiment, in order to realize the above-mentioned receive control, as shown in FIG. 2, the frame disassembling section 26 is equipped with a channel demultiplexing section (DMPX) 26-1 and a timing generator (TG) 26-2 which are respectively similar to those mentioned before with reference to FIG. 44, and further, is provided with a clock controller 26-3, a preamble detecting section (PAD) 26-4 and a unique word detecting section (UWD) 26-5.

In each of the demodulation sections 25 shown in FIG. 2, a mixer (MIX) 25-1, a local oscillator (LO) 25-2, A/D (analog/digital) converters 25A-3, 25B-3, a QPSK demodulator 25-4, a bit timing recovery (BTR) section 25-5 and a clock selection switch 25-6 are respectively similar to those described before with reference to FIG. 44.

In the frame disassembling section 26, the preamble detecting section 26-4 is for detecting a preamble (synchronization-bit: see FIG. 47) of the M channel on the basis of the demodulated data demodulated by the QPSK demodulator 25-4 of the demodulation section 25, and in this embodiment, is provided to make compensation for the accident that the BTR section (varying channel receive detecting section) 25-5 does not play its original role to detect the reception of the M channel by the clock switching control of the clock controller 26-3. That is, even if the BTR section 25-5 makes a mistake in the M channel receive detection, this detecting section 26-4 can detect the reception of the M channel.

The unique word detecting section (fixed channel receive detecting section) 26-5 detects the reception of the C channel by detecting the unique word (see FIG. 4) of the C channel on the basis of the demodulated data obtained by the QPSK demodulator 25-4.

The clock controller 26-3 is for producing a clock control (selection) signal (CKCNT) for the switch 25-6 to supply one of the aforesaid system basic clock (CKM), M-channel receive detection (M channel clock recovery) clock (DCKM) and M channel receive clock (CKS) as the sampling clock (ADCK) to the A/D converters 25A-3 and 25B-3, and in this embodiment, it is designed to produce clock control signals (CKCNT) different from each other in accordance with the following status. That is, (1) When the start time of the "M channel window" is reached, the clock controller 26-3 produces a clock control signal (CKCNT) to select the M-channel receive detection clock (DCKM) for detecting the reception of the M channel;

(2) In the case that a level representative of the reception of the M channel is detected in the BTR section 25-5 within the period T11 in FIG. 3, or in the case that the preamble of the M channel is detected in the preamble detecting section 26-4, it produces a clock control signal (CKCNT) for selecting the M-channel receive clock (CKS);

(3) When a level representative of the reception of the M channel is detected in the BTR section 25-5 during the period (fixed channel receive period) T12 in FIG. 3, it produces a clock control signal (CKCNT) for selecting the M-channel receive clock (CKS), and when the UW of the C channel is detected in the UWD 26-5, it produces a clock control signal (CKCNT) for selecting the system basic clock (CKM); and (4) When the end time of the "M channel window" is reached, it produces a clock control signal (CKCNT) for selecting the system basic clock (CKM) to receive the other service channel such as the D channel and the B channel.

In other words, the parts including the mixer 25-1, the local oscillator 25-2, the A/D converters 25A-3, 25B-3, the QPSK demodulator 25-4 and others function as a channel receiving section (see reference numeral 14 in FIG. 2) to receive, as the M (varying) channel signal, the response signal from the CAU 4-i, whose receive timing varies in accordance with the distance from the CAU 4-i and further to receive, as the fixed channel signal, the communication signal, (C channel, D channel, or the like) received from the synchronization established CAU 4-i at a constant timing.

Furthermore, the aforesaid clock controller 26-3 functions as a control section whereby, when the detection of the reception of the M channel takes place in the BTR section 25-5 during the period T12 in FIG. 3, the receive processing in the channel receiving section 14 is controlled for receiving the M channel, and when the detection of the reception of the C channel takes place in the UWD 26-5 during the period T12 in FIG. 3, the receive processing in the channel receiving section 14 is controlled for receiving the C channel.

However, this clock controller 26-3 sets, as the aforesaid C channel receive period (T12), an arbitrary period other than the period T11' in which the M channel is receivable from the registered CAU 4-i, and controls the receive processing in the channel receiving section 14 [performs the switching of the sampling clock (ADCK)] so that the C channel is receivable during this period. That is, the period T12 is set to be a period other than the period T11' for the reception of the M channel from the synchronization established CAU 4-i.

Figure 4:
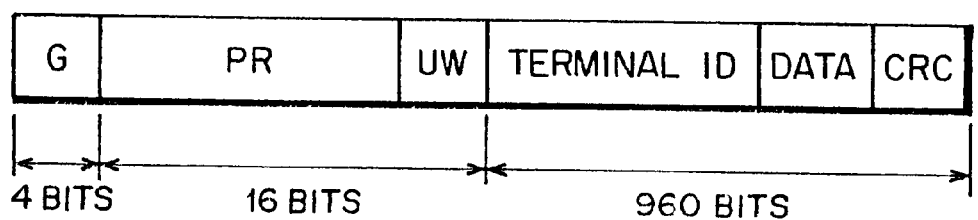
FIG. 4 is an illustration of one example of a C channel format in an up-frame in this embodiment.
Figure 48:
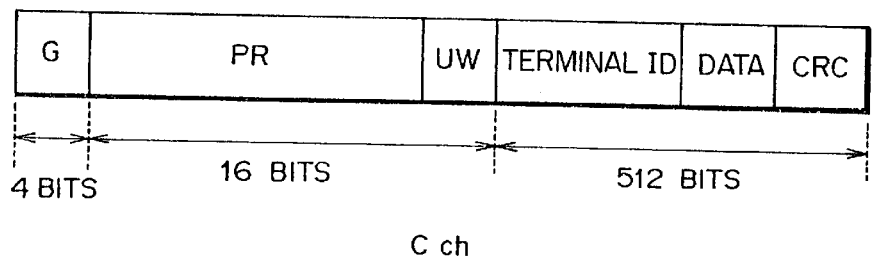
FIG. 48 is an illustration of one example of a C channel format in the two-way CATV system shown in FIG. 43.
Figure 49:
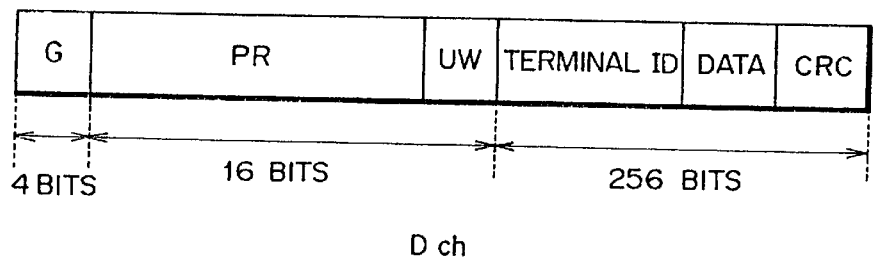
FIG. 49 is an illustration of one example of a D channel format in the two-way CATV system shown in FIG. 43.
Figure 50:
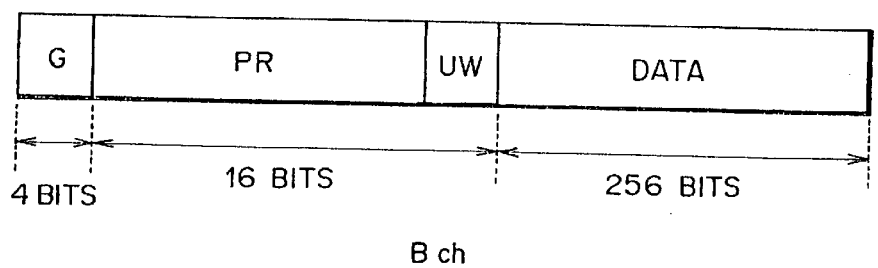
FIG. 50 is an illustration of one example of a B channel format in the two-way CATV system shown in FIG. 43.
Figure 51:
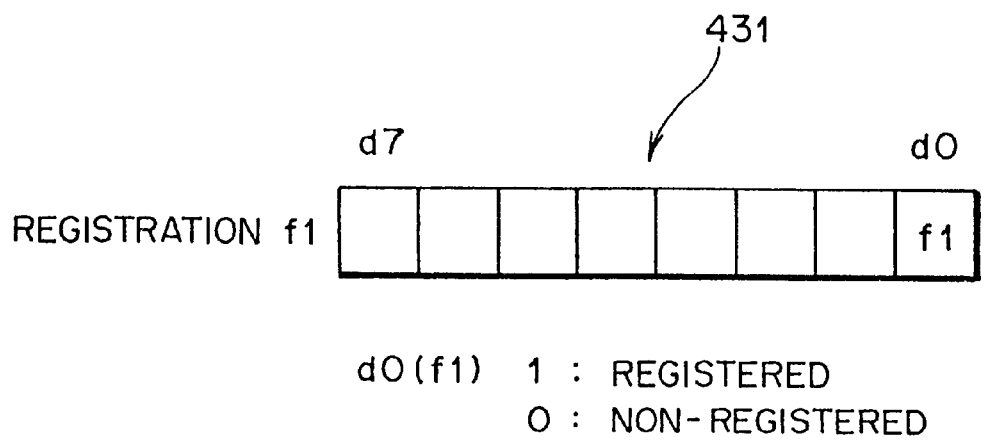
FIG. 51 is a block diagram showing a construction of a register for a registration flag in the CAU shown in FIG. 43.
Figure 52:
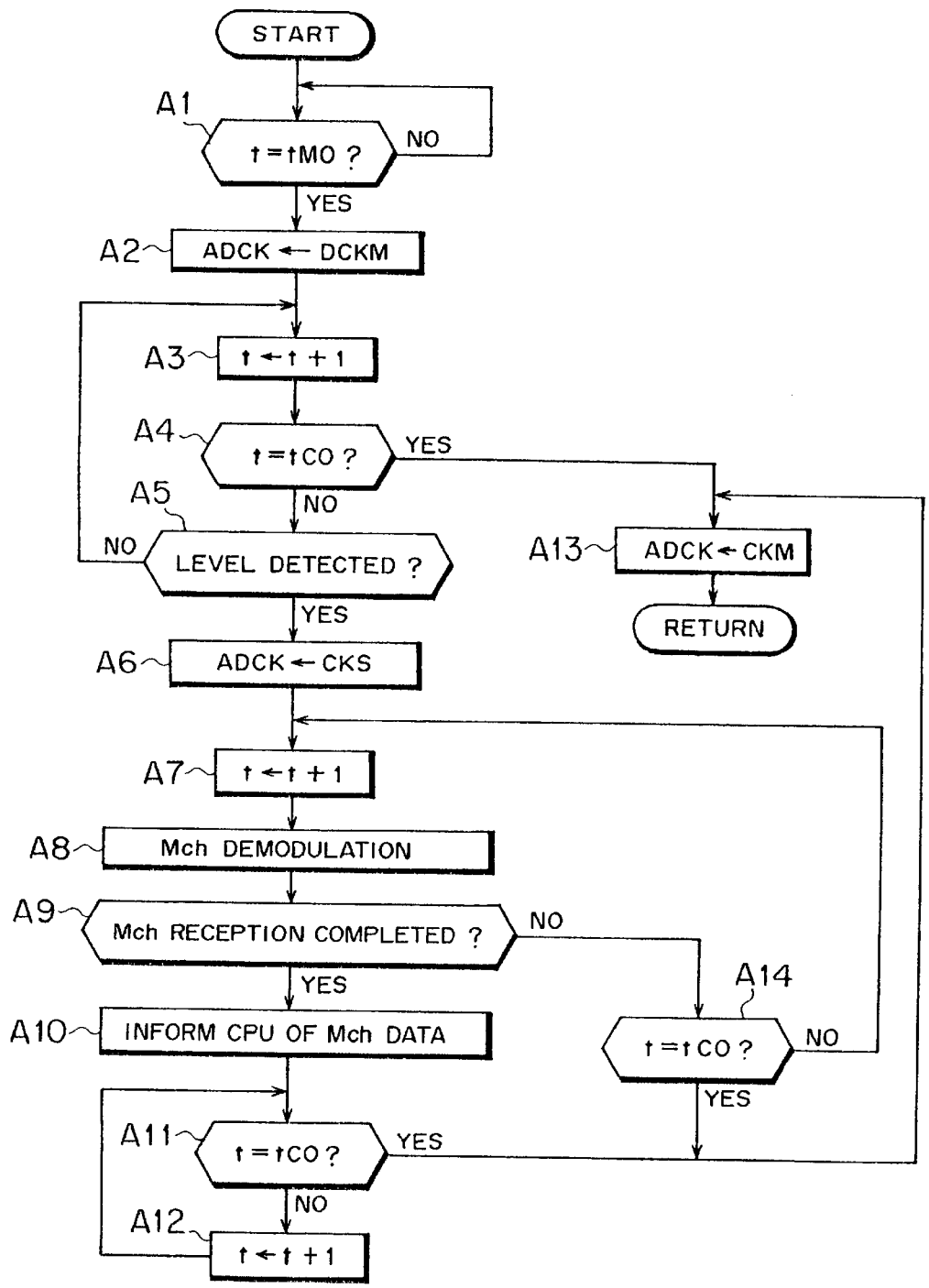
FIG. 52 is a flow chart for describing M channel and C channel receive processing of a demodulation section and frame disassembling section of the CAM shown in FIG. 43.
Figure 53:
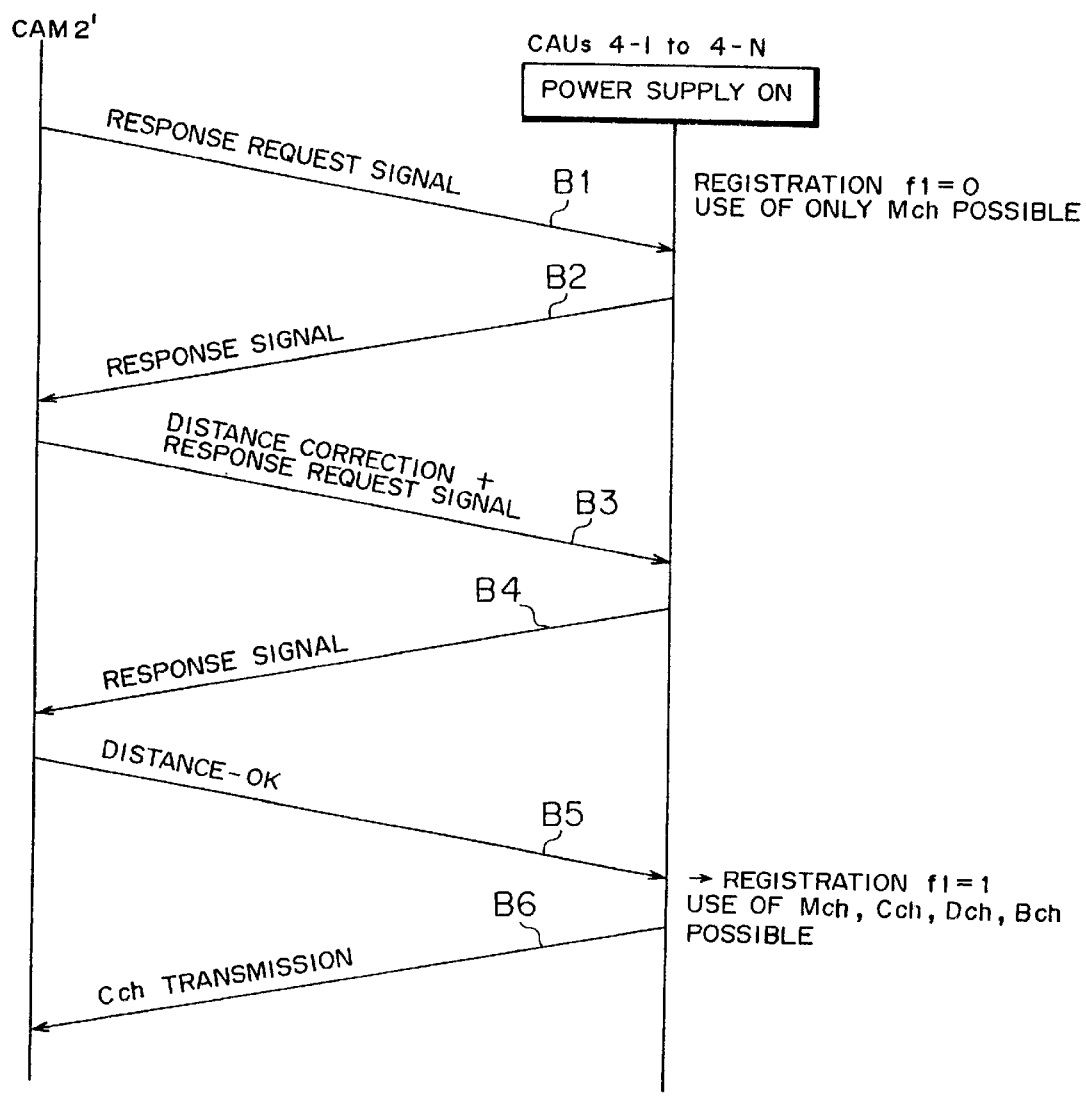
FIG. 53 is a sequence diagram for explaining a registration operation in the two-way CATV system shown in FIG. 43.
Figure 54:
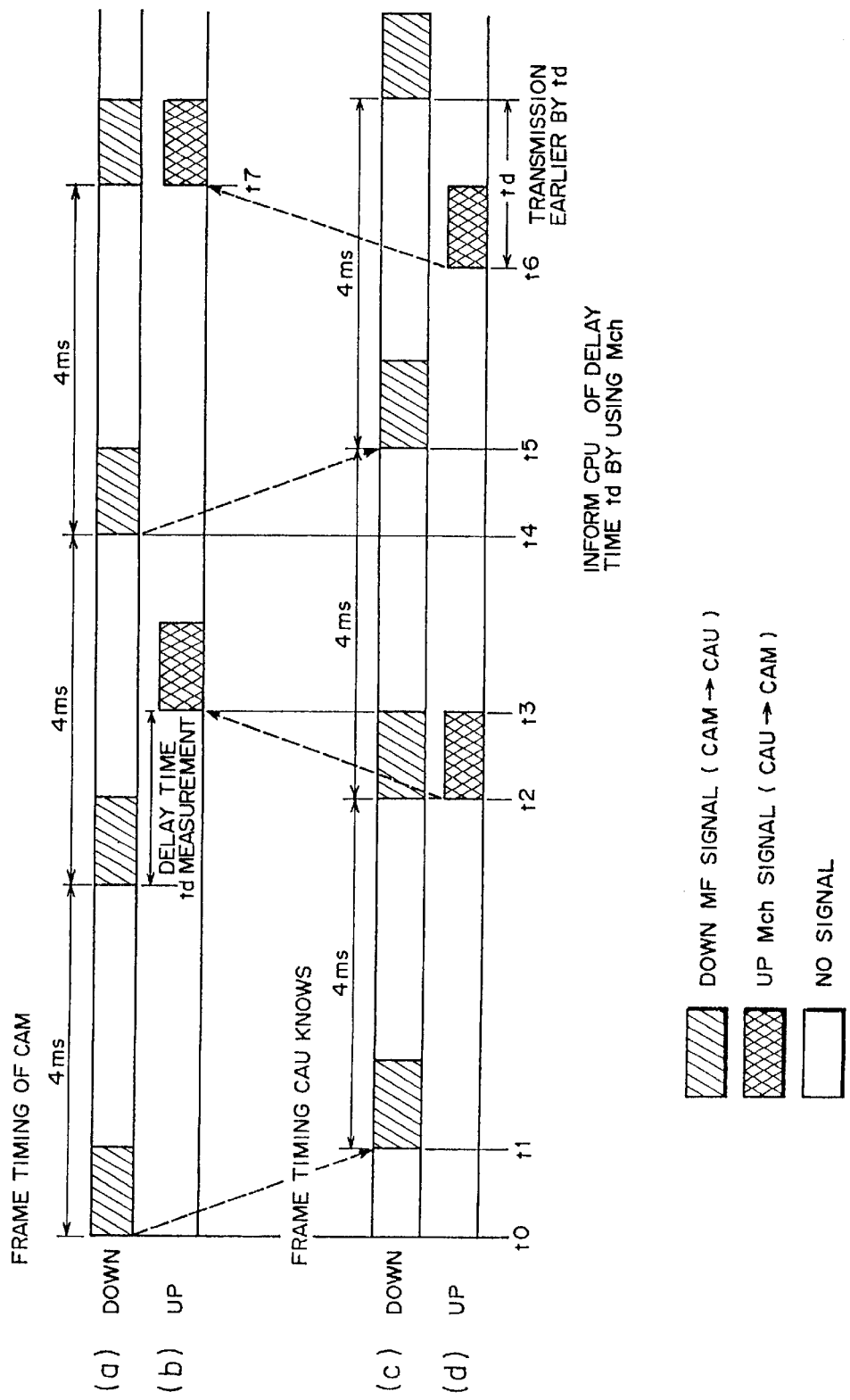
FIGS. 54 to 58 are time charts for explaining a registration operation in the two-way CATV system shown in FIG. 43.
Figure 55:
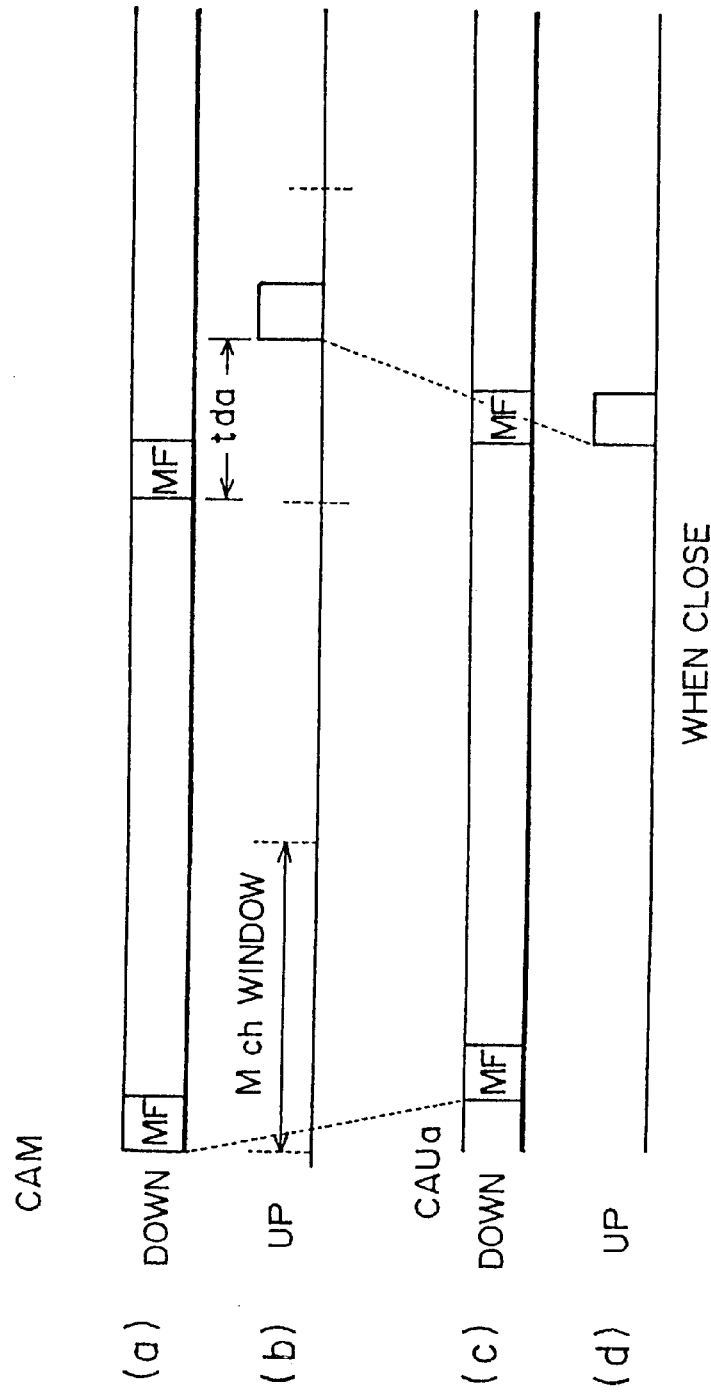
Figure 56:
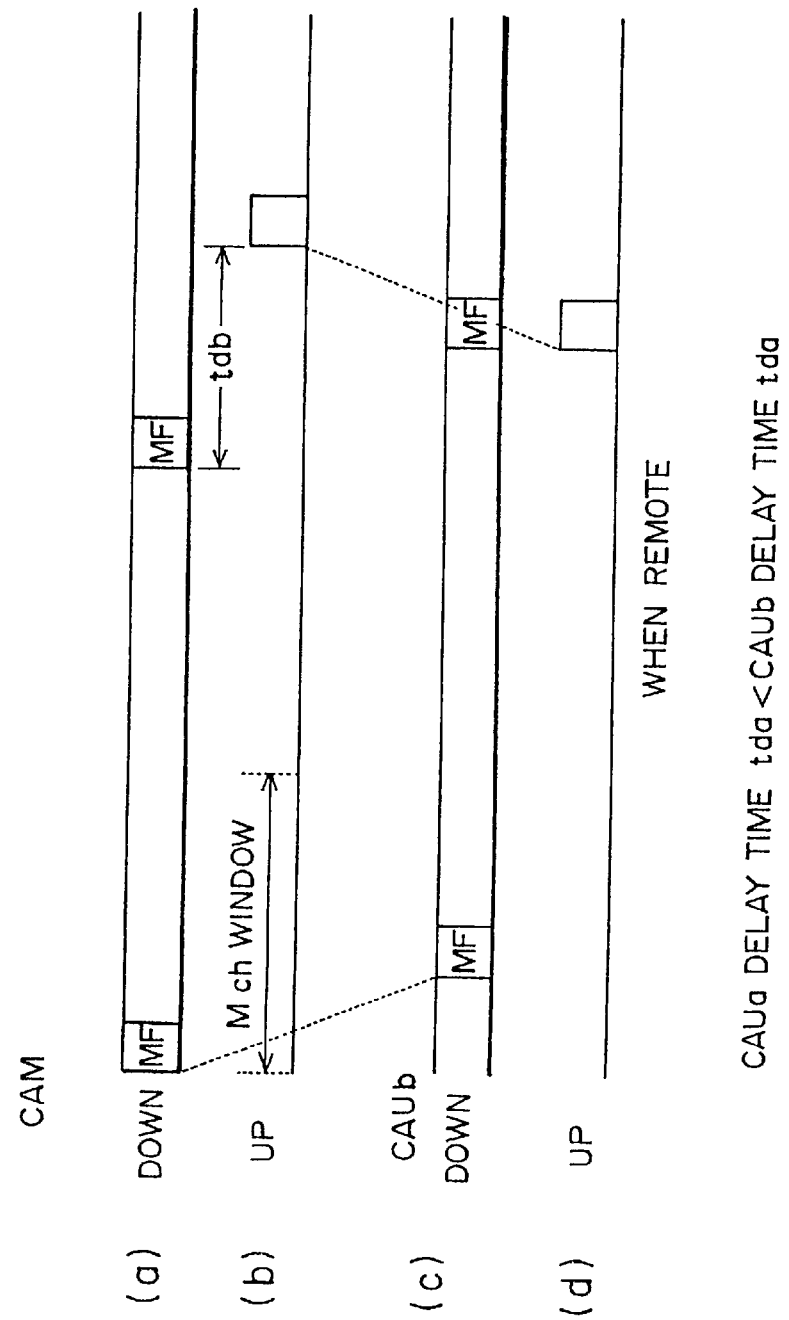
Figure 57:
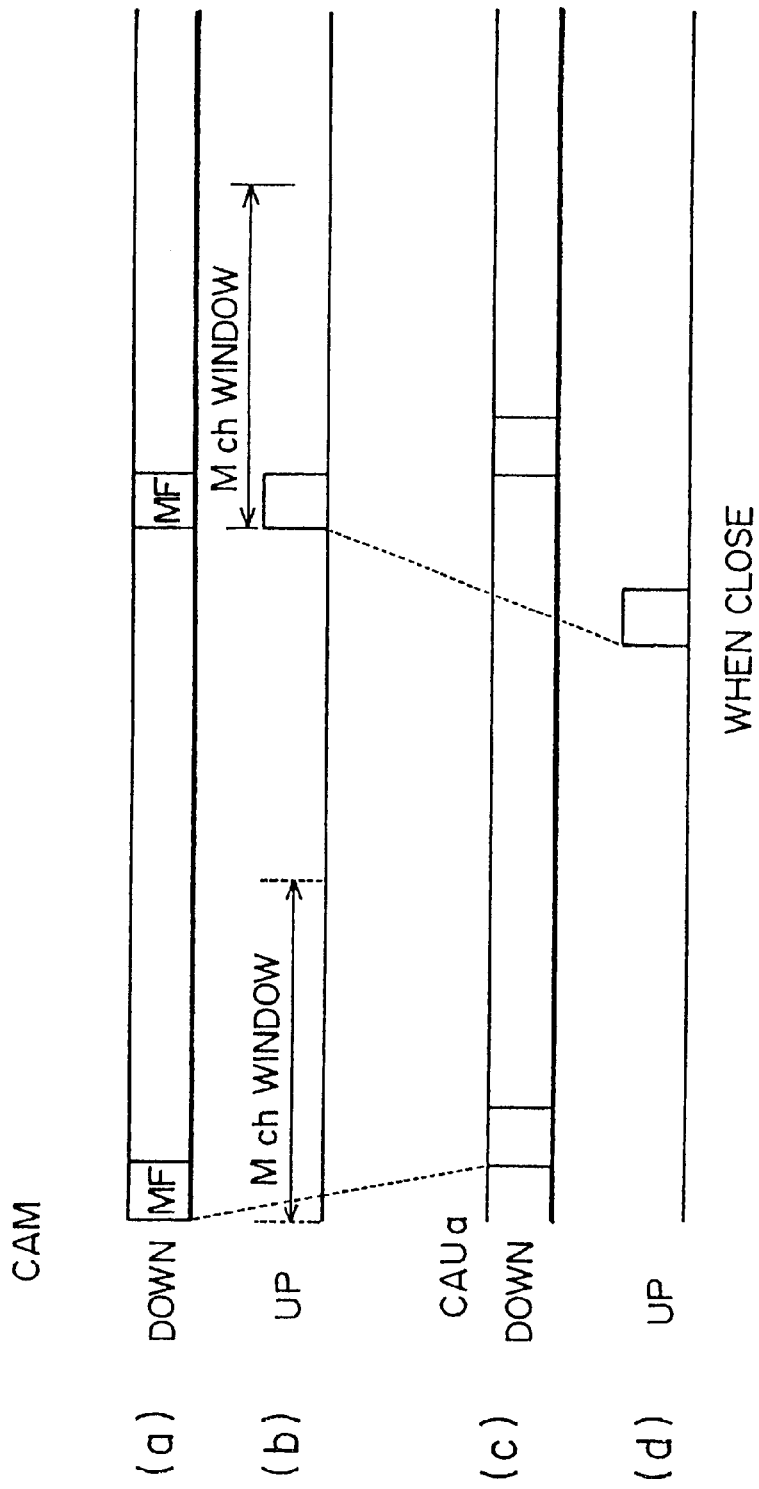
Figure 58:
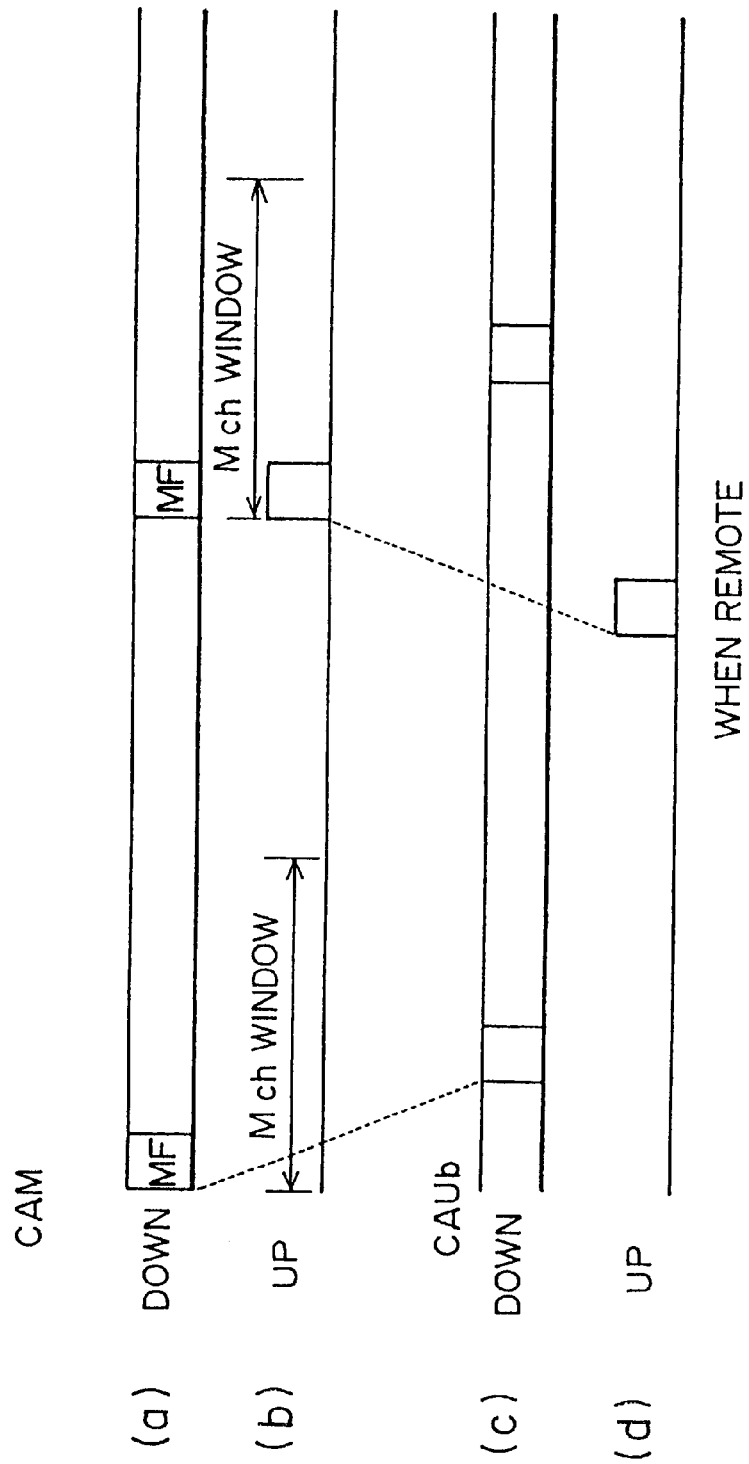
Figure 59:
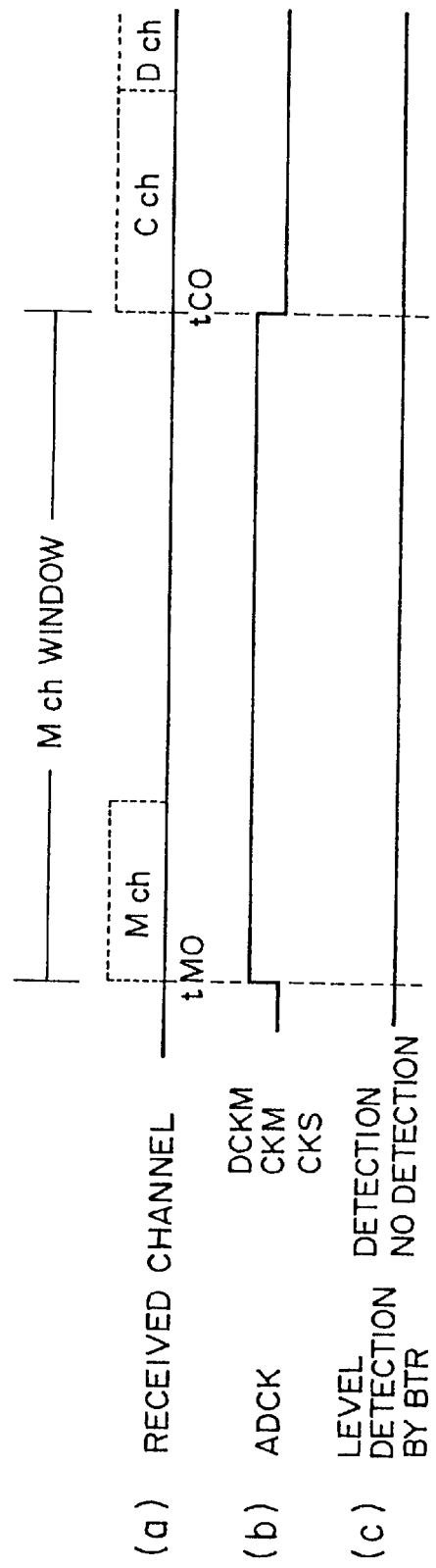
FIG. 59 is a time chart for explaining M channel and C channel receive processing in the CAM shown in FIG. 43.
Figure 60:
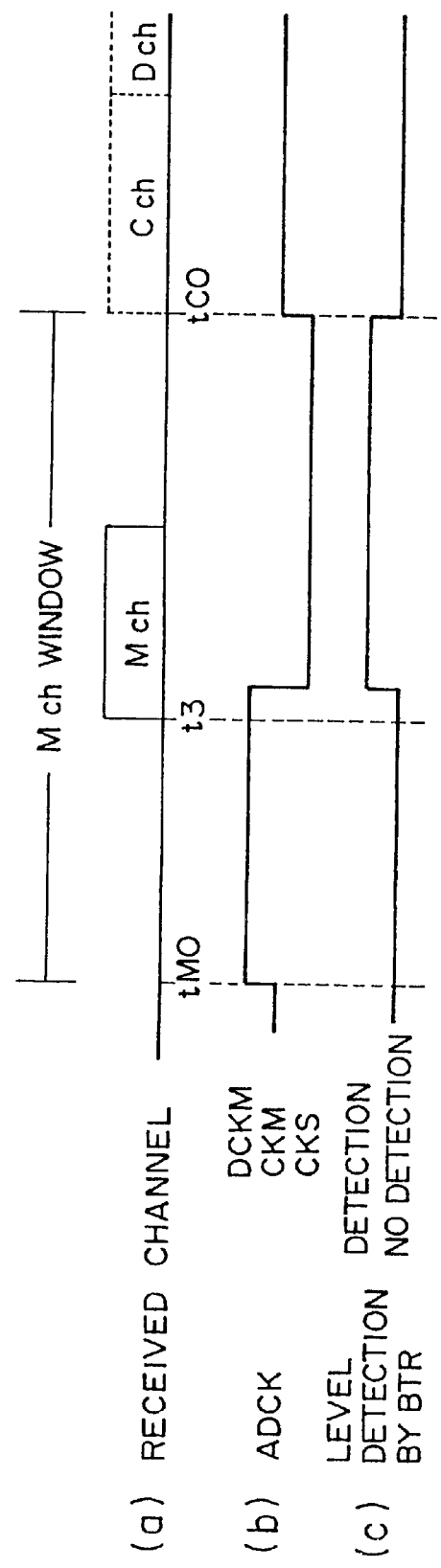
FIG. 60 is a time chart for explaining M channel and C channel receive processing in the CAM shown in FIG. 43.

Whereupon, in the channel receiving section 14, there occurs the reduction of the probability that the M channel and the C channel are received in an overlapping condition. In addition, in this case, since the C channel is included within the "M channel window", it is possible to arbitrarily set the length of the C channel within the "M channel window". Accordingly, in this embodiment, for example, as shown in FIG. 4, in the C channel, a portion comprising the terminal ID, the DATA part and CRC code is expanded to 960 bits (the system 1' shown in FIG. 43 takes 512 bits as shown in FIG. 48), thereby enhancing the throughput of the C channel.

A detailed description will be made hereinbelow of an operation of the two-way CATV system 1 thus arranged according to this embodiment.

(1) Description of a Basic Operation of CAM 2 (CPU 27)

Figure 5:
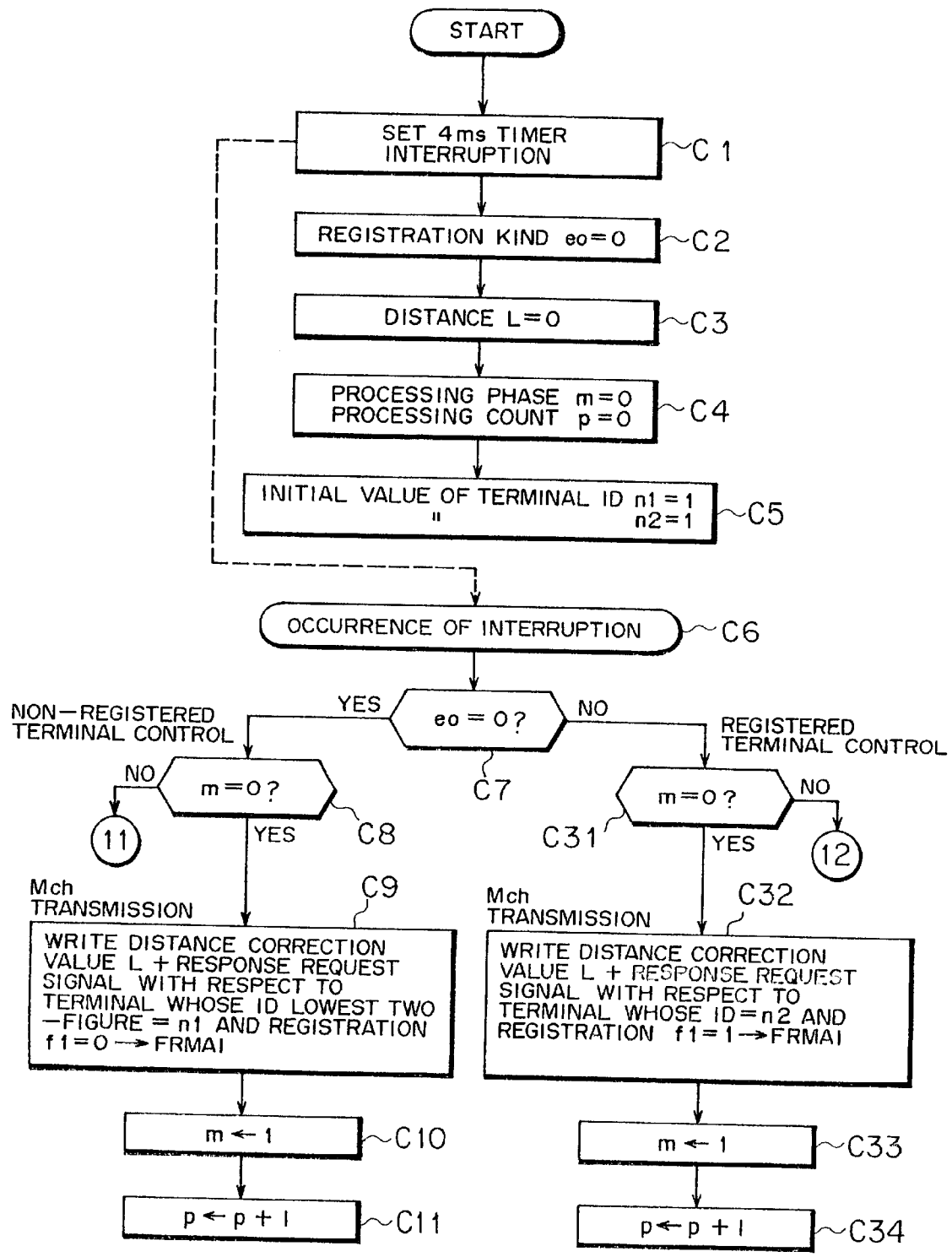
FIG. 5 is a flow chart useful for explaining a basic operation of the CAM 2 (CPU 27) in this embodiment.

First of all, in the CAM 2, at the time of the service start, as shown in FIG. 5, the CPU 27 sets an interruption timer (not shown) to cause an "interruption" at every 4 ms (step C1), and further, initializes the registration classification $e_0$, the distance (delay time information) L, the processing phase m, the processing count p, and the terminal identifiers (ID) n1, n2 ($e_0$=0, L=0, m=0, p=0, n1=1, n2=1: steps C2 to C5).

As will be described herein later, the registration classification $e_0$ serves as a decision parameter for alternately executing the control (registration control) about the non-registered (synchronization non-established) CAU 4-i and the control (monitoring control) about the registered (synchronization established) CAU 4-i, and the processing phase m is a parameter for discriminating between the transmission processing and the receive processing with respect to the CAU 4-i (which will sometimes be referred to hereinafter as the terminal 4-i), and further, the processing count p is a parameter for prescribing the receive waiting time of the M channel under the receive processing with respect to the CAU 4-i. These parameters are stored in the volatile memory 27B. However, since the information on the terminal ID is required to be retained even after the turning-off of the power supply, it is stored in the non-volatile memory 27A.

Furthermore, the CPU 27 conducts the following operations at every occurrence of the interruption caused by the interruption timer (step C6). That is, the CPU 27 first checks whether or not the registration classification $e_0$ is set at zero (step C7). If being zero, the CPU 27 starts the control on the non-registered terminal 4-i, and decides whether or not the processing phase m is set at zero (from step C7 through its YES route to step C8).

As a result, if the processing phase m=0, the CPU 27 recognizes that the processing to be conducted next is the transmission processing on the M channel to the CAU 4-i, and produces a distance correction value L and response request signal to the CAU 4-i where the terminal ID=n1 and the registration flag f1=0 and outputs these signals to the frame assembling section 23 (from step C8 through its YES route to step C9).

Thus, the frame assembling section 23 inserts the distance correction value L plus the response request signal as the M channel into the down-frame and transmits it to the non-registered CAU 4-i. Besides, since the distance L=0 at the initial stage (when the M channel is transmitted to one non-registered CAU 4-i for the first time), in substance, only the response request signal is transmitted through the M channel to the non-registered CAU 4-i.

On the completion of the M channel transmission processing, the CPU 27 sets the processing phase m to 1 and records this fact (step C10), and further, increments the processing count p by 1 (p←p+1: step C11), thereafter going into the wait state for the next occurrence of the interruption.

In this state, when the interruption again takes place due to the interruption timer, the CPU 27 knows that the registration classification $e_0$ remains at zero but the processing phase m comes to 1 (the decision of the step C7 shows "YES" and the decision of the step C8 shows "NO"), and as shown in FIG. 6A, refers to the channel demultiplexing section 26-1 (M-ch register 26B) of the frame disassembling section 26 to confirm the M channel receive status (M-ch polling: step C12). At this time, the processing count P is incremented by 1 (p←p+1: step C13).

If the reception of the M channel takes place at this time, the CPU 27 checks the CRC code of that M channel (from step C14 through its YES route to step C15). If the CRC code is normal, the CPU 27 confirms the terminal ID (step C16) and reads a distance Lr (step C17) and further checks whether or not a distance Lr is zero (step C18).

If the check result shows the distance Lr=0, the M channel from the non-registered CAU 4-i is received in synchronism with the head of the down-frame from the CAM 2, and hence, the CPU 27 produces the information indicative of the distance-OK (which signifies the status in which the synchronization is established) with respect to that non-registered CAU 4-i (CAU 4-i where the terminal ID lower two figures=n1, the registration flag f1=0) and the proper or formal terminal ID, and outputs them to the frame assembling section 23 (from step C18 through its YES route to step C19).

Still further, the CPU 27 sets the processing phase m and the distance L at zero (step C20) and sets the registration classification $e_0$ to 1 (step C21). Subsequently, the CPU 27 checks whether or not the lower (last) two figures (n1) of the terminal ID constitute 99 (step C22). If not constituting 99, the CPU 27 increments n1 by 1 (n1←n1+1): from step C22 through its NO route to step C23) in order to change the non-registered CAU 4-i as the processing target to the next CAU 4-i. On the other hand, if assuming 99, the CPU 27 initializes n1 to zero (from step C22 through its YES route to step C24).

More specifically, in this embodiment, assuming that the CAM 2 accommodates 1000 CAUs 4-i, since the way that the M channel transmission and receive processing with respect to each of the CAUs 4-i is done in a state where the terminal IDs different from each other are respectively allocated to the 1000 CAUs 4-i is extremely ineffective, for example, the CPU 27 is designed to only prepare temporary or provisional terminal IDs to 100 (00 to 99) CAUs 4-i, and to conduct the M channel transmission/reception processing with respect to a plurality of CAUs 4-i (whose terminal ID lower two figures are the same) at a time.

Meanwhile, in the case that the M channel polling result shows no reception of the M channel (the decision of the step C14 indicates "NO"), or in the case that the CRC code is abnormal although the M channel is received (the decision of the step C15 indicates "NO"), the CPU 27 checks whether or not all the processing counts p assume the prescribed value (for example, 5) (step C25). If not coming to 5, the CPU 27 sets the processing phase m and the distance L on zero (from step C25 through its NO route to steps C26 and C27), thereafter going into an interruption wait state.

Whereupon, since the occurrence of the next interruption shows the registration classification $e_0$=0 and the processing phase m=0 (since the steps C7 and C8 make the YES decisions, respectively), the CPU 27 again conduct the M channel (response request signal) transmission processing to the same non-registered CAU 4-i (steps C9 to C11).

That is, in case that difficulty is encountered to normally receive the M channel (response signal) from the non-registered CAU 4-i, the CPU 27 repeatedly conducts the M channel (response request signal) re-transmission processing until the repetition reaches the prescribed number of times (until the processing count P reaches 5).

Incidentally, in case that the normal reception of the M channel can not be done even if this re-transmission processing is repeated the prescribed number of times, the CPU 27 makes no further M channel receive processing for the same non-registered CAU 4-i when the processing count p reaches 5, and instead, conducts the processing in the step C20 and the following steps shown in FIG. 6A (YES route from step C25).

Furthermore, if the decision of the aforesaid step C18 shows that the distance Lr is not zero (in the case that the M channel from the non-registered CAU 4-i is not received in synchronism with the head of the down-frame from the CAM 2), likewise, the CPU 27 checks whether or not the processing count p reaches the prescribed value (from step C18 through its NO route to step C28), and if not reaching the prescribed value, it sets the distance Lr to the distance L (from step C28 through its NO route to step C29), and further, sets the processing phase m on zero (step C30), then going into an interruption wait state.

Whereupon, when the next interruption develops, since the registration classification $e_0$=0 and the processing phase m=0 (since the steps C7 and C8 made the YES decisions, respectively), the CPU 27 conducts the M channel transmission processing for requiring the correction of the distance Lr of the same non-registered CAU 4-i (Steps C9 to C11).

That is, when a difference between the receive timing of the M channel and the transmission timing of the down-multiframe exists (the distance Lr≠0) and the synchronization does not take place with respect to the non-registered CAU 4-i, the CPU 27 repeatedly conducts the M channel (the distance correction value L+the response request signal) re-transmission processing until the arrival at the prescribed number of times (the processing count p=5).

Besides, in case that the synchronization with the non-registered CAU 4-i is not established although this re-transmission processing is repeated the prescribed number of times, likewise, further M channel receive processing is brought to an end with respect to the same non-registered CAU 4-i when the processing count p reaches 5, the aforesaid step C20 and following processing in FIG. 6A are done (YES route from step C28).

The aforesaid prescribed value of the processing count p signifies a retry frequency of the processing to be conducted when difficulty is encountered to normally receive the M channel from the non-registered CAU 4-i or when difficulty is encountered to establish the frame synchronization and the bit synchronization with the non-registered CAU 4-i, and is employed in order to avoid the long-term retention of the receive processing with respect to the non-registered CAU 4-i. Although being set to 5 in the above example, this prescribed value can be set on an arbitrary value (an integer not less than 0) according to circumstances.

Furthermore, after the completion of the above-described processing (registration processing) for the non-registered CAU 4-i, if the interruption again takes place by means of the interruption timer, the CPU 27, at this time, recognizes that the registration classification $e_0$ is changed to 1 (see the step C21 in FIG. 6A) and the processing phase m comes to zero (the step C7 in FIG. 5 makes NO decision and the step C31 makes YES decision), and performs the following monitoring processing with respect to the registered CAU 4-i.

That is, as shown in FIG. 5, the CPU 27 produces a distance correction value L and a response request signal for the CAU 4-i where the terminal ID=n2 and the registration flag f1=1, and outputs these signals to the frame assembling section 23 (from step C31 through its YES route to step C32).

Thus, the frame assembling section 23 inserts the distance correction value L+the response request signal as the M channel into the down-frame and transmits it to the registered CAU 4-i. Since the distance L=0 at the initial stage (when the M channel is transmitted to one registered CAU 4-i for the first time), only the response request signal is actually transmitted to the non-registered CAU 4-i.

After the completion of the M channel transmission processing, the CPU 27 sets the processing phase m to 1 and records this fact (step C33), and further, increments the processing count p by 1 (p←p+1: step C34), then going into a wait state for the occurrence of the next interruption.

In this state, when the next interruption occurs, the CPU 27 recognizes that the registration classification $e_0$=1 and the processing phase m=1 (the steps C7 and C31 make NO decisions), and as shown in FIG. 6B, as well as the receive processing for the non-registered CAU 4-i, the CPU 27 refers to the channel demultiplexing section 26-1 (M-ch register 26b) of the frame disassembling section 26 to confirm the M channel receive condition (M-ch polling: step C35). At this time, the processing count p is incremented by 1 (p←p+1: step C36).

If the M channel is received at this time, the CPU 27 checks the CRC code of that M channel (from step C37 through its YES route to step C38). If the CRC code is in the normal condition, the CPU 27 confirms the terminal ID (step C39), and read the distance Lr (step C40), and further, checks whether or not the distance Lr is at zero (step C41).

If this check result shows the distance Lr=0, since the synchronization with the registered CAU 4-i is maintained, the CPU 27 produces the information representative of the distance-OK (the synchronization is established) to that registered CAU 4-i (the CAU 4-i in which the terminal ID=n2 and the registration flag f1=1), and outputs it to the frame assembling section 23 (from step C41 through its YES route to step C42).

Moreover, the CPU 27 sets the processing phase m at zero (step C43) and sets the registration classification $e_0$ at zero (step C44). Subsequently, the CPU 27 checks whether or not the terminal ID (n2) comes to 1000 (step C45). If not coming to 1000, the CPU 27 increments n2 by 1 to change the registered CAU 4-i as the processing target to the next CAU 4-i (n2←n2+1: from step C45 through its NO route to step C46), and if coming to 1000, the CPU 27 initializes n2 to zero (from step C45 through its YES route to step C47).

Thus, when the next interruption occurs, since the registration classification $e_0$=0 and the processing phase m=0, the CPU 27 conducts the M channel transmission processing with respect to the non registered CAU 4-i being the next processing target this time.

Meanwhile, in the case that the M channel is not received due to the M channel polling (the decision of the step C37 shows NO), or in the case that the CRC code of the M channel is not normal although the M channel is received (the decision of the step C38 indicates. NO), likewise, the CPU 27 checks whether or not the processing count p reaches the prescribed value (for example, 5) (step C48). If not reaching 5, the CPU 27 recognizes that the registered CAU 4-i is out of synchronization (the registered CAU 4-i comes into a non-registered condition), and sets each of the processing phase m, the distance L and the registration classification $e_0$ at zero (from step C48 through its NO route to steps C49 and C50), thus going into the interruption wait state.

Accordingly, when the next interruption arises, since the registration classification $e_0$=0 and the processing phase m=0 (since the steps C7 and C8 make YES decisions, respectively), the CPU 27 performs the transmission processing on the M channel (response request signal) to the non-registered CAU 4-i (steps C9 to C11).

That is, when difficulty is encountered to normally receive the M channel (response signal) from the registered CAU 4-i, the CPU 27 knows that the registered CAU 4-i is out of synchronization, and hence, repeatedly performs the re-transmission processing on the M channel (response request signal) for the CAU 4-i which becomes non-registered state until the repetition reaches the prescribed number of times (until the processing count p reaches the prescribed value "5") in order to re-establish the synchronization therewith. Besides, the out-of-synchronization occurring in a state where the power supply for the CAU 4-i turns on depends upon the service discontinuation for the maintenance of the CAM 2, the construction work for the transmission line 8, and others.

On the other hand, if the normal M channel reception is difficult although this re-transmission processing is repeated the prescribed number of times, the CPU 27 makes no further receive processing with respect to the M channel for the same CAU 4-i when the processing count p reaches 5, and instead, conducts the step C43 and following processing in FIG. 6B (YES route from step C48).

Furthermore, in the aforesaid step C41, even in the case that the distance Lr does not reach zero (when the M channel from the registered CAU 4-i is not received in synchronism with the down-multiframe), the CPU 27 checks whether or not the processing count p reaches the prescribed value (from step C41 through its NO route to step C51), and if not reaching the prescribed value, sets the distance Lr to the distance L (from step C51 through its NO route to step C52) and sets the processing phase m at zero (step C53), thereafter going into an interruption wait condition.

Thus, when the next interruption occurs, since the registration classification $e_0$=1 and the processing phase m=0 (since the step C'7 in FIG. 5 makes NO decision and the step C31 makes YES decision), the CPU 27 conducts the M channel transmission processing to make a request for the correction of the distance Lr to the same registered CAU 4-i (steps C31 to C34).

That is, when a difference between the receive timing of the M channel and the transmission timing of the down-multiframe exists (the distance Lr≠0) and the out-of-synchronization in the communication occurs with respect to the registered CAU 4-i, the CPU 27 repeatedly conducts the M channel (the distance correction value L+the response request signal) re-transmission processing until the prescribed number of times is reached (until the processing count p reaches the prescribed value "5").

Besides, if difficulty is encountered to establish the synchronization with the CAU 4-i being out of the synchronization although this re-transmission processing repeatedly takes place the prescribed number of times, even in this case, the M-channel receive processing for the same CAU 4-i is terminated when the processing count p reaches 5 and the step C43 and following processing in FIG. 6B are done (YES route from step C51).

As described above, the CPU 27 of the CAM 2 in this embodiment alternately conducts the M channel transmission/reception processing (registration processing) with respect to the non-registered CAU 4-i and the M channel transmission/reception processing (monitoring processing) with respect to the registered CAU 4-i at every occurrence of the interruption (4 ms).

(2) Description of a Basic Operation of CAU 4-i (CPU 47)

Figure 7:
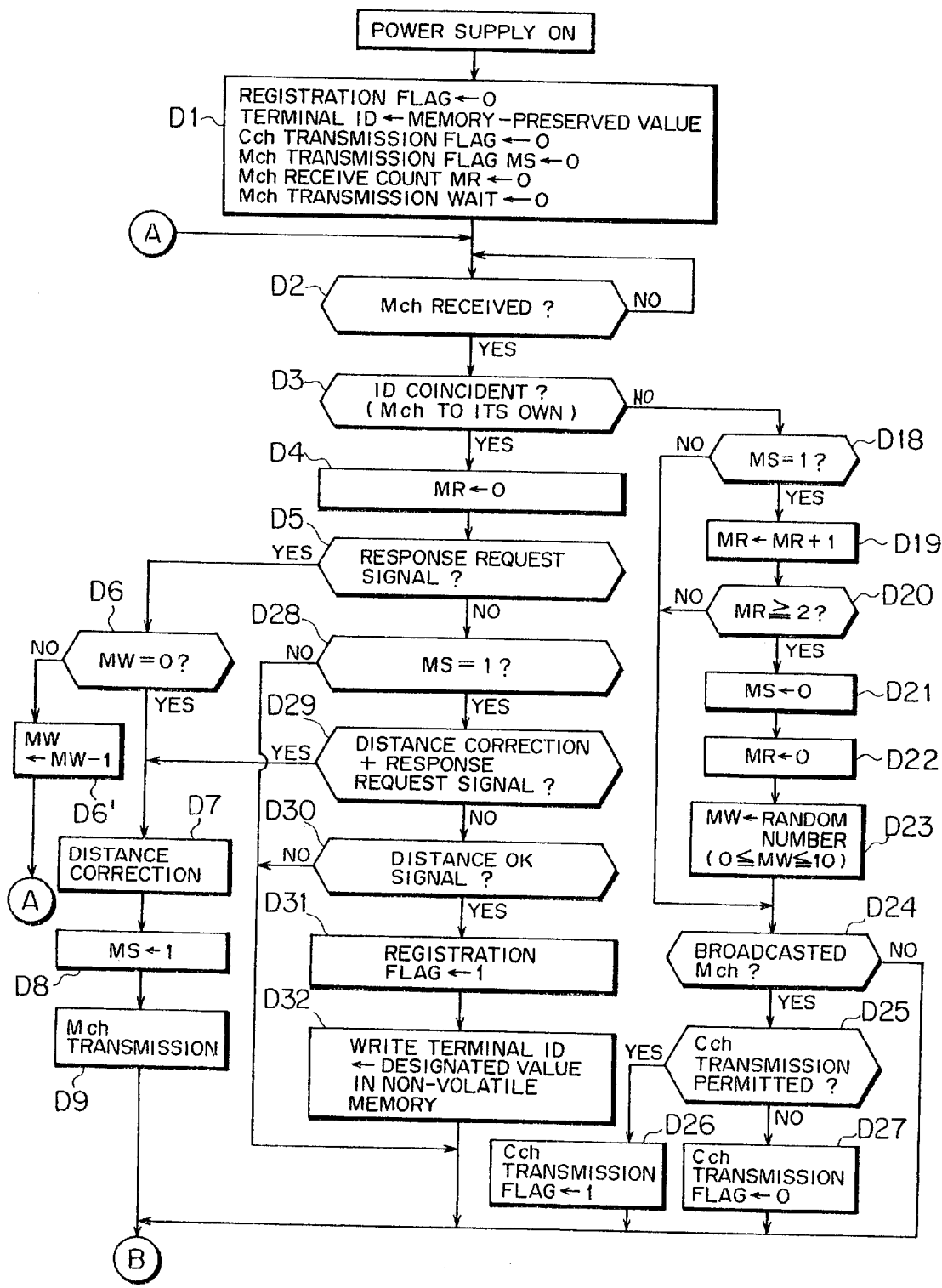
FIG. 7 is a flow chart useful for describing a basic operation of a CAU 4-i (CPU 47) in this embodiment.

First of all, as shown in FIG. 7, when the power supply turns on, in the CAU 4-i, the CPU 47 initializes a registration flag f1, a terminal ID, a C-channel transmission flag CS, an M-channel transmission flag MS, an M-channel receive count value MR, and an M-channel receive wait count value MW [registration flag f1←0, terminal ID←value preserved in the memory 47A (Initially, for example, "1" is set as a temporary ID), C-channel transmission flag CS←0, M-channel transmission flag MS←0, M-channel receive count value MR←0, M-channel transmission wait count value MW←0: step D1].

Each of the aforesaid terminal ID, registration flag f1, C-channel transmission flag CS, M-channel transmission flag MS, M-channel receive count value MR and M-channel receive wait count value MW assumes an integer not less than 0, and the terminal ID is stored in the memory 47A, whereas the C-channel transmission flag CS, the M-channel transmission flag MS, the M-channel receive count value MR and the M-channel receive wait count value MW are put in the memory 47B.

In addition, the CPU 47 monitors whether or not to receive an M channel (NO route from step D2), and upon receipt of the M channel (the decision of step D2 shows "YES"), checks whether or not the terminal ID given to that M channel coincides with its own terminal ID (whether or not the received M channel is addressed to itself) (step D3).

If this check result indicates that the received M channel is directed to itself (the decision of step D3 shows "YES"), the CPU 47 sets the M-channel receive count value MR at zero (step D4), and subsequently, checks whether or not the received M channel is a response request signal (step D5). Further, if the received M channel is the response request signal [the decision of step D5 is affirmative (YES)], the CPU 47 further checks whether or not the M-channel transmission wait count value MW is zero (step D6).

Following this, if the M-channel transmission wait count value MW assumes a value other than zero [the decision of step D6 is negative (NO)], the CPU 47 decrements the M-channel transmission wait count value MW by one (−1) (step D6'), and then, conducts the step D2 processing and following processing.

On the other hand, when the M-channel transmission wait count value MW is zero (the decision of step D6 is affirmative), the CPU 47 corrects the M-channel transmission timing to the CAM 2 on the basis of correction distance (delay time) information designated in the received M channel (step D7), and subsequently, sets the M-channel transmission flag MS to 1 (step D8), before outputting a response signal as M channel data to the frame assembling section 23. Whereupon, the response signal to the aforesaid response request signal is transmitted as the up-frame M channel to the CAM 2 (step D9).

Incidentally, if the correction distance is not specified in the received M channel (response request signal) (in the case that the CAM 2 sends a response request signal to the CAU 4-i for the first time), the CPU 47 does not correct the M-channel transmission timing, but conducts the transmission processing on the M channel (response signal) at an arbitrary timing (the head timing of the next up-frame to be transmitted).

Figure 8:
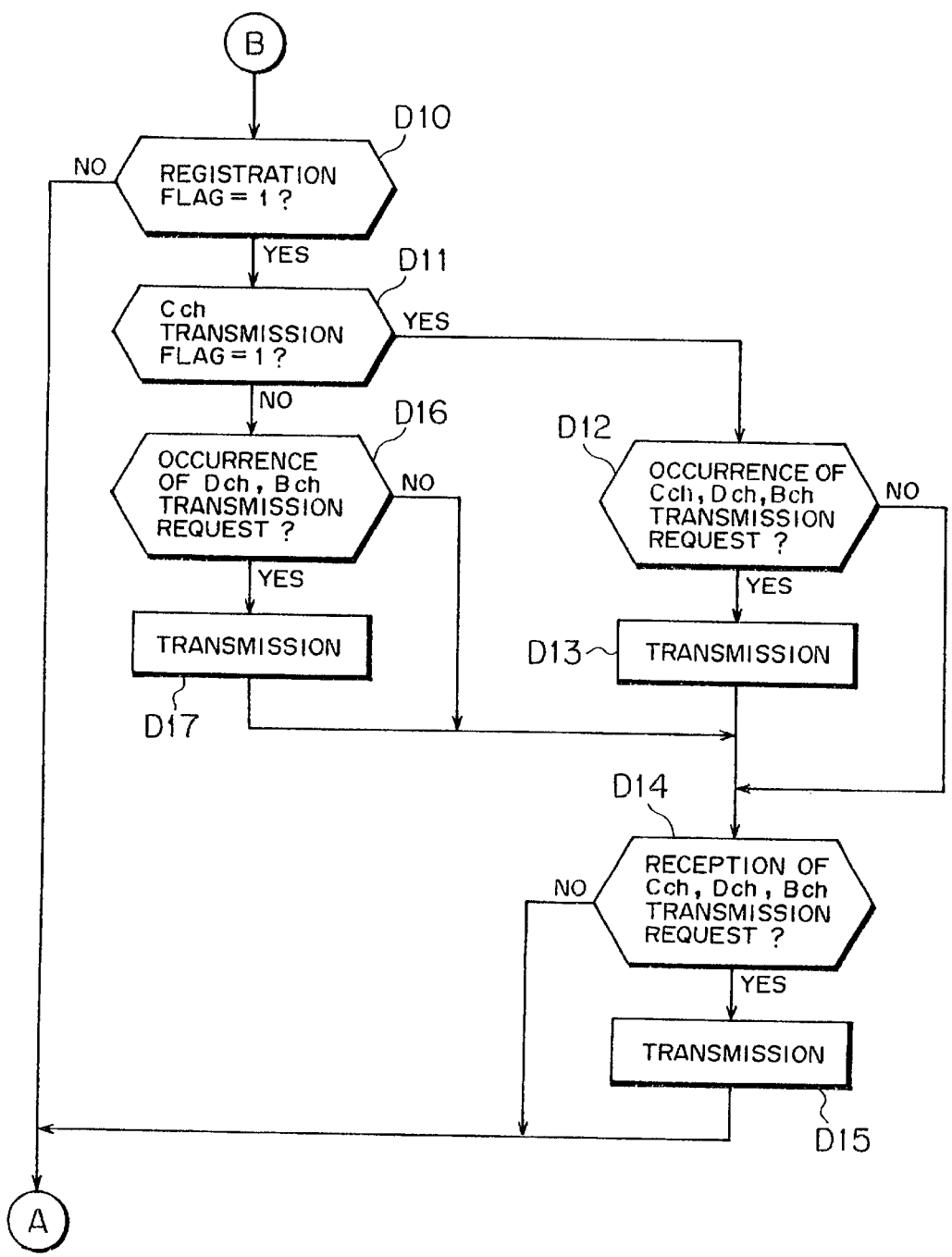
FIG. 8 is a flow chart useful for describing a basic operation of a CAU 4-i (CPU 47) in this embodiment.

Secondly, as shown in FIG. 8, the CPU 47 checks whether or not the registration flag f1 is 1 (step D10). At this time, since the registration flag f1 is left in the initial condition (0) (the decision of step D10 is negative), the above-mentioned step D2 and following steps in FIG. 7 take place (the control goes into the M-channel wait state).

If the registration flag f1 is 1 (when the answer of step D10 is affirmative), the CPU 47 additionally checks whether or not the transmission flag CS assumes 1 (whether the transmission of the C channel is possible or not) (step D11).

The check result indicates that the transmission flag CS is 1, the CPU 47 monitors whether a transmission request for a C channel, D channel or B channel occurs or not (from step D11 through its YES route to step D12). On the occurrence of the request, that channel data is outputted to the frame assembling section 45 to be transmitted to the CAM 2 (from step D12 through its YES route to step D13).

On the other hand, if no request occurs, the CPU 47 monitors, for the synchronization confirmation, whether or not the transmission request for the C channel, D channel or B channel is received from the CAM 2 (from step D12 through its NO route to step D14). Upon receipt of this transmission request, the CPU 47 performs the transmission processing on the requested channel data to the CAM 2 (from step D14 through its YES route to step D15). If the receipt of the transmission request does not occurs, the step D2 and following processing in FIG. 7 again take place (NO route from step D14).

In the aforesaid step D11, if the C-channel transmission flag CS is not 1 (when the answer of step D11 is negative), the CPU 47 monitors whether or not the transmission request for the D channel or the B channel occurs (step D16). In answer to the occurrence of the transmission request, the CPU 47 fulfills the transmission processing on the corresponding channel data (from step D16 through its YES route to step D17), and conducts the aforesaid step D14 and following processing. Incidentally, in the case that no transmission request for the D channel or the B channel comes about, the CPU 47 shifts the control to the aforesaid step D15 and following processing without conducting the transmission processing on the D channel or the B channel (NO route from step D17).

Meanwhile, in the step D3 in FIG. 7, if the received M channel is not addressed to its own, the CPU 47 checks whether or not the M-channel transmission flag MS is 1 (whether or not it receives a response signal in the past) (from step D3 through its NO route to step D18). If the check result shows that the M-channel transmission flag MS is 1, the CPU 47 increments the M-channel receive count value MR by 1 (from YES route of step D18 to step D19).

Furthermore, the CPU 47 checks, for example, whether or not the M-channel receive count value MR is 2 or more due to this increment processing (that is, whether or not the M channel from the CAM 2 is inputted at least twice) (step D20). If equaling or exceeding 2 (the decision of step D20 shows "YES"), the CPU 47 decides that the response signal transmitted in the past runs into a response signal from the other CAU 4-i in the CAM 2 so that the normal receipt thereof is difficult, and hence, clears both the M-channel transmission flag MS and M-channel receive count value MR to zero (steps D21 and D22) and, then, generates an integer between 0 to 10 as a random number to set that random number as the M-channel transmission wait count value MW (step D23). Whereupon, the CAU 4-i goes into the M-channel transmission wait condition until the M channel reception count value MW reaches zero.

Subsequently, the CPU 47 checks whether or not the received M channel is the M channel (which will be referred hereinafter to as a broadcasted M channel) broadcast-transmitted from the CAM 2 (step D24). If being a broadcasted M channel (the decision of the step D24 shows "YES"), the CPU 47 checks whether or not that M channel is a transmission permission signal of the C channel (packet data for the LAN 9) (step D25).

As a result, if the broadcasted M channel it receives is the transmission permission signal of the C channel, the CPU 47 sets the C-channel transmission flag CS to 1 (from step D25 through its YES route to step D26). Thus, the CAU 4-i comes into a C-channel transmission permission condition. On the other hand, if the received broadcasted M channel is a transmission inhibition signal (transmission stop request) of the C channel, the CPU 47 sets the C-channel transmission flag CS to zero (from step D25 through its NO route to step D27) so that the CAU 4-i goes into a C-channel transmission inhibition condition.

In the aforesaid step D18, if the M-channel transmission flag MS does not assume 1 (if step D18 makes NO decision), or in the aforesaid step D20, if the M-channel receive count value MR does not reach 2 (if step D20 makes NO decision), the CPU 47 shifts the control to the aforesaid step D24 and the processing subsequent thereto. Further, in the aforesaid step D24, if the received M channel is not the broadcasted M channel, the CPU 47 performs the step D10 and following processing in FIG. 8.

Furthermore, in the foregoing step D5 in FIG. 7, in the case that the received M channel is not the response request signal, the CPU 47 checks whether or not the M-channel transmission flag MS is 1 (whether or not the response signal is transmitted to the CAM 2 in the past) (from step D5 through its NO route to step D28). If being 1, the CPU 47 further checks whether or not the received M channel is the response request signal in which a correction distance is designated (which will be referred hereinafter to as a distance correction and response request signal) (from step D28 through its YES route to step D29).

As a result, if the received M channel is the distance correction and response request signal (step D29 makes YES decision), the CPU 47 executes the aforesaid step D7 and the processing subsequent thereto (response signal transmission processing). On the other hand, if not the distance correction and response request signal (step D29 makes NO decision), the CPU 47 checks whether or not the received M channel is a distance-OK signal (indicative of the fact that the M channel transmitted is received in synchronism with the head of the down-multiframe in the CAM 2) (step D30).

If the received M channel is the distance-OK signal (the decision of step D30 is affirmative), the CPU 47 sets the registration flag f1 to 1 (step D31), and further, changes the temporary terminal ID to the proper terminal ID received together with the distance-OK signal and preserves that ID by writing in the non-volatile memory 47A (step D32). Thereafter, the CPU 47 executes the aforesaid step D10 and the processing subsequent thereto in FIG. 8.

That is, in the CAU 4-i, at the transmission/reception processing of the M channel to/from the CAM 2 to establish the frame-synchronization and bit-synchronization of the up-frame with the CAM 2, in case where the M channel (response signal) it transmits collides against an M channel from the other CAU 4-i at the CAM 2 so that difficulty is encountered to normally receive the M channel, it transmits, in the CAM 2, a random number to be decremented whenever the M channel is received is produced, and the M-channel transmission is stopped until the random number reaches zero so that the collision of the M channels at the CAM 2 is avoidable.

(3) Description of an Operation of the Whole CATV System 1

(3-1) Description of a Basic Operation

Figure 9:
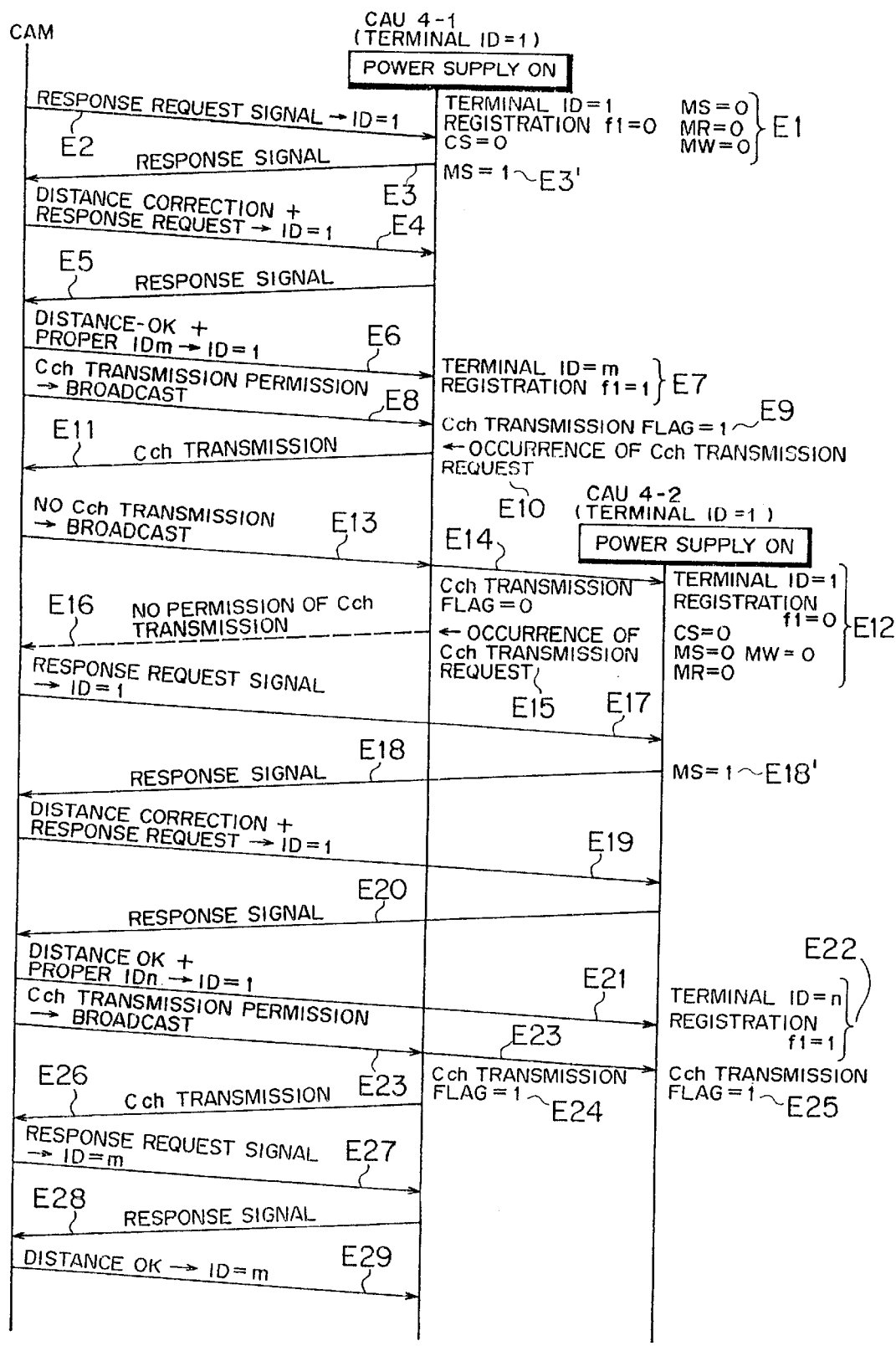
FIG. 9 is a sequence diagram available for explaining the entire operation (operation in a normal condition) of the two-way CATV system according to this embodiment.

Referring to a sequence diagram of FIG. 9, a detailed description will be made hereinbelow of a basic operation of the whole CATV system 1 based upon the respective operations of the aforesaid CAM 2 and CAU 4-i.

First, let it be assumed that the power supply for the CAU 4-1 turns on. At this time, in the CAU 4-1, the CPU 47 initializes a terminal identifier (ID), a registration flag f1, a C-channel transmission flag CS, an M-channel transmission flag MS, an M-channel receive count MR and an M-channel transmission wait count MW [terminal ID←preserved value (for example, 1) in the memory 27B, registration flag f1←0, C-channel transmission flag CS←0, M-channel transmission flag MS←0, M-channel receive count MR←0, M-channel transmission wait count MW←0: step E1]. For the registration flag f1=0, the CAU 4-i is in a transmission allowable (permission) condition of only the M channel to the CAM 2.

Furthermore, for example, the CAM 2 transmits a response request signal to a non-registered CAU 4-1 whose the terminal ID=1 (temporary terminal ID=1) through the use of an M channel (step E2). The CAU 4-1 with the terminal ID=1 receives this response request signal, and transmits a response signal corresponding to the received response request signal to the CAM 2 through the use of an M channel (step E3). At this time, the CPU 47 of the CAU 4-1 sets the M-channel transmission flag MS on 1 (step E3').

Upon receipt of the M channel (response signal) from the CAU 4-1, the CAM 2 measures the distance with respect to the CAU 4-1 [the difference (delay time) from the transmission timing of a down-multiframe] on the basis of the receive timing, and if the delay time occurs, sends a distance correction and response request signal using an M channel (terminal ID=1) (step E4).

This M channel is taken by the CAU 4-1 whose terminal ID=1, and the CAU 4-1 again returns a response signal to this M channel to the CAM 2 through the use of an M channel, and at this time, the transmission of the M channel (response signal) is accomplished in a manner that the transmission timing to the CAM 2 is corrected to eliminate the delay time known by the received M channel (step E5).

Still further, when the CAM 2 receives the M channel from the CAU 4-1 in synchronism with the head timing of the down-multiframe (when the aforesaid distance Lr is zero), because the answer of the step C18 in FIG. 6A shows the YES decision, the CAM 2 informs the CAU 4-1 of the distance-OK and the proper terminal ID=$m_0$ ($m_0$ assumes a natural number not less than 2) through the use of an M channel (step E6).

The CAU 4-1 changes the terminal ID from the temporary terminal ID (=1) to the proper terminal ID (=$m_0$) on the basis of the M channel received from the CAM 2, and sets the registration flag f1 to 1 (step E7). After the completion of this registration, when the CAM 2 broadcasts a C-channel transmission permission signal to all the CAUs 4-i (step E8), the aforesaid CAU 4-1 registered sets the C-channel transmission flag CS to 1 (step E9), before going into a C-channel transmission permission condition.

In this condition, for instance, if a transmission request for packet data for the LAN 9 arises in the CPU 47 (step E10), the CAU 4-1 communicates that packet data through a C channel to the CAM 2 (step E11).

In the meantime, assuming that a power supply for a CAU 4-i (for example, CAU 4-2) other than the aforesaid CAU 4-1 turns on after recovering its normal condition by the elimination of troubles such as a power failure, as in the CAU 4-1, the CAU 4-2 initializes a terminal ID, a registration flag f2 and a C-channel transmission flag CS [terminal ID (temporary)=1, registration flag f1=0, C-channel transmission flag CS=0: step E12].

On the other hand, at this time, the CAM 2 the M-channel transmission/reception processing in order to establish the frame synchronization with the CAU 4-2 as well as the processing for the CAU 4-1. In this case, if the other registered CAU 4-i (for example, CAU 4-1) unconditionally transmits a C channel, the C channel from the CAU 4-1 runs into the M channel from the CAU 4-2 so that difficulty is experienced to normally receive the M channel from the CAU 4-2, with the result that there is a possibility of making it difficult to establish he frame-synchronization with the CAU 4-2 for any length of time.

For this reason, in this embodiment, in the case of setting up the frame synchronization with the non-registered CAUs 4-i forming a portion of all the CAUs 4-i, that is, for receiving the M channel and the C channel in the channel receiving section 14 in an overlapped condition for the aforesaid C-channel receive period T12 (see FIG. 3), the CAM 2 transmits (broadcasts) a C-channel transmission inhibition signal (transmission stop request) to all the registered CAUs 4-i through the M channel (step E13). Incidentally, the transmission stop request to the registered CAU 4-i takes place, for example, when the CPU 27 gets an instruction from the maintenance console 12 (see FIG. 1).

Moreover, for instance, in the CAU 4-1, upon receipt of this C-channel transmission stop request, the CPU 47 sets the C-channel transmission flag CS to zero (step E14), then going into a C-channel transmission stop condition. Whereupon, even if a transmission request for a C channel (packet data for the LAN 9) arises through the personal computer 6 (step E15), the CAU 4-1 can not transmit the packet data as indicated by a broken line (step E16).

In this state, the CAM 2 forwards a response request signal to the CAU 4-2 through the use of an M channel (step E17). Upon receipt of this response request signal, the CAU 4-2 sets the M-channel transmission flag MS to 1 (step E18'), and returns a response signal to the CAM 2 through an M channel (step E18). Further, the CAM 2 repeats the M-channel transmission/reception processing as with the CAU 4-1 until this response signal is received in synchronism with the head timing of a down-multiframe (steps E19 and E20).

Furthermore, on receiving the response signal from the CAU 4-2 in synchronism with the head timing of the down-multiframe, the CAM 2 forwards the distance-OK and the proper terminal ID=$n_0$ (where no is a natural number satisfying the conditions of $n_0 \geq 2$ and $n_0 \neq m_0$) to the CAU 4-2 through an M channel (step E21). Thereupon, in the CAU 4-2, the CPU 47 changes the terminal ID from the temporary terminal ID (=1) to the proper terminal ID (=$n_0$), and sets the registration flag f1 to 1 (step E22).

Thereafter, the CAM 2 gives a signal representative of C-channel transmission permission through an M channel to all the registered CAUs 4-i including the CAU 4-2 (step E23), while each of the CAUs 4-1 and 4-2 receiving this M channel comes into the C-channel transmission permission condition in a manner that its CPU 47 sets the C-channel transmission flag CS to 1 (steps E24 and E25).

Then, for example, when the CAU 4-1 receives the packet data from the personal computer 6 (when a C-channel transmission request arises), the CAU 4-1 forwards the packet data as a C channel to the CAM 2 (step E26).

Besides, the CAM 2 monitors whether or not it is in the synchronous relation to the registered CAU 4-i (for example, CAU 4-1) by periodically transmitting a response request signal to the CAU 4-1 in the form of an M channel (steps E27 to E29).

As described above, according to the CATV system 1 organizing this invention, in case where an M channel from a non-registered CAU 4-i and a C channel from a registered CAU 4-i are received in the CAM 2 in an overlapped condition, a C-channel transmission stop request is sent to the registered CAU 4-i to stop the transmission of a C channel signal from the registered CAU 4-i, and therefore, it is possible to avoid the status in which an M channel from the non-registered CAU 4-i is not normally received and the synchronization with that CAU 4-i is not set up for any length of time.

Particularly, this function is effective in case where CAUs 4-i constituting a portion of the CAUs 4-i lying in one restrict malfunction at a time due to troubles such as power failures, and when a power supply for each of the CAUs 4-i turns on after the settlement of the troubles, the registration of each of the CAUs 4-i can quickly be done without encountering obstacles by a C channel from the other CAUs 4-i, which greatly contributes to the improvement of the reliability of the whole CATV system 1.

Figure 10:
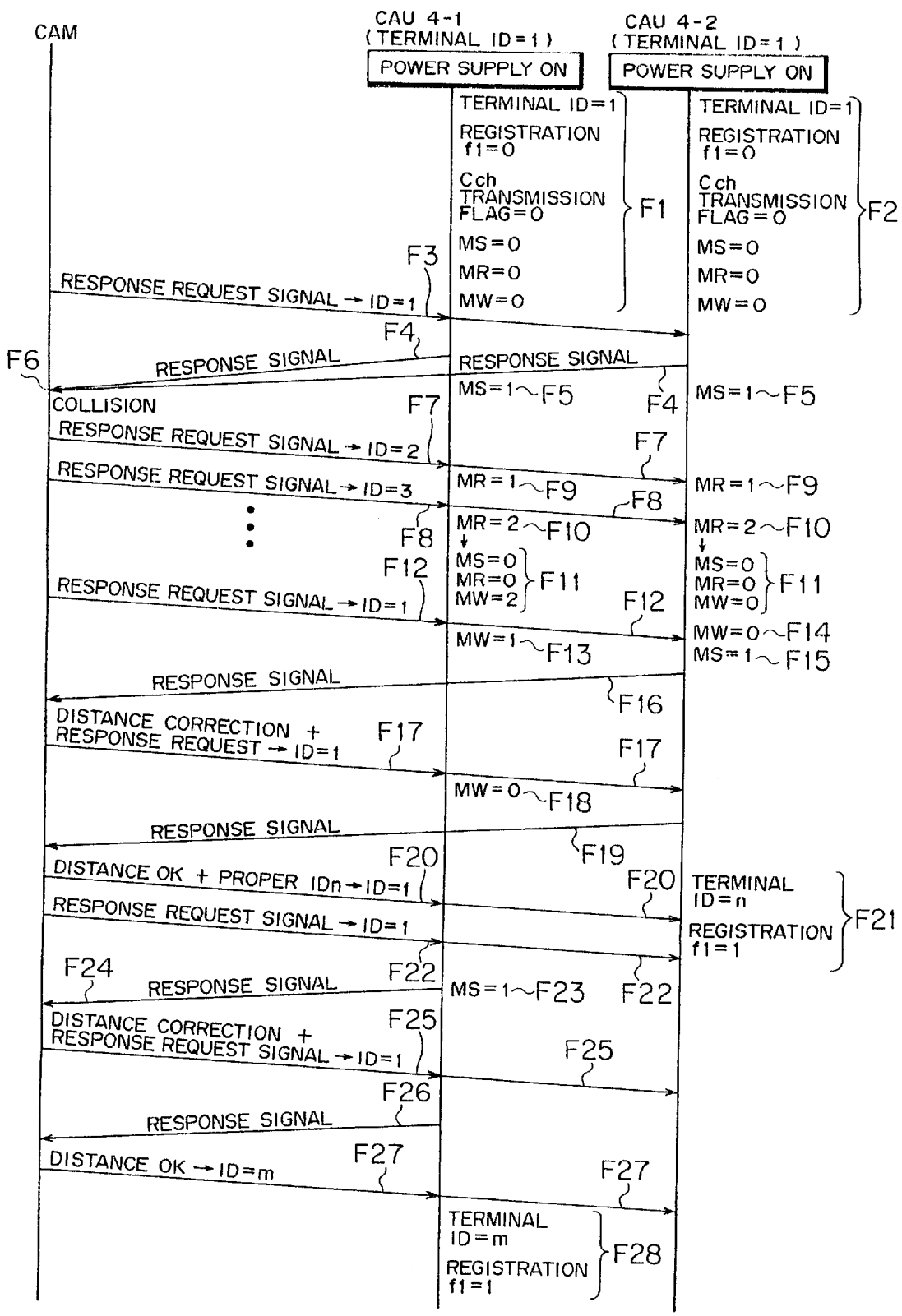
FIG. 10 is a sequence diagram available for explaining the entire operation (at M channel collision) of the two-way CATV system according to this embodiment.

(3-2) Description of an Operation to be Conducted for When a Plurality of M channels are Received (Run into Each Other) in the CAM 2 in an Overlapped Condition For instance, as shown in FIG. 10, let it be assumed that power supplies for a plurality of CAUs 4-i (in this case, CAU 4-1 and CAU 4-2) substantially turn on at the same time. Whereupon, in each of the CAUs 4-1 and 4-2, its CPU 47 initializes a terminal ID, a registration flag f1, a C-channel transmission flag CS, an M-channel transmission flag MS, an M-channel receive count value MR and an M-channel transmission wait count value MW [Steps F1 and F2 (corresponding to the step D1 in FIG. 7]. At this time, the terminal ID of each of the CAUs 4-1 and 4-2 assumes the temporary terminal ID=1.

Furthermore, the CAM 2 transmits a response request signal, whose destination or address is the terminal ID=1, through the use of an M channel in order to establish the frame synchronization with the CAUs 4-1 and 4-2 for which power supplies turn on [step F3 (corresponding to the step C9 in FIG. 5)]. Thereupon, in each of the CAUs 4-1 and 4-2, the received M channel terminal ID=1 coincides with its own terminal ID, and that M channel is a response request signal, and therefore, a response signal to this response request signal is returned through the use of an M channel [step F4 (corresponding to the processing from the YES routes of the steps D5 and D6 to the steps D7 to D9)]. At this time, in each of the CAUs 4-1 and 4-2, the M-channel transmission flag MS is set to 1 [step F5 (corresponding the step D7 in FIG. 7)].

Meanwhile, the CAM 2 is in a condition of waiting for a response signal (M channel) to be issued from each of the CAUs 4-1 and 4-2 in answer to the aforesaid response request signal, but, if M channels transmitted from the CAUs 4-1 and 4-2 run into each other (step F6), difficulty is encountered to normally receive the M channels from both the CAUs 4-1 and 4-2 in the CAM 2.

For this reason, after an elapse of a given time period (when the processing count p reaches 5 as previously mentioned with reference to FIG. 6A), the CAM 2 cancels the M-channel receive wait condition (corresponding to the NO route of the step C15 and the YES route of the step C25 in FIG. 6A), and successively conducts the M-channel transmission processing for the other CAUs 4-i. That is, the CAM 2 increments the terminal ID by one (=2, 3, . . . ) (corresponding to the step C23 in FIG. 6A), and further, sends response request signals through the use of M channels in a state where destination is the terminal ID=2, 3, . . . (steps F7 and F8).

Accordingly, each of the CAUs 4-1 and 4-2 returns a response signal to the CAM 2 as mentioned before (the M-channel transmission flag is at 1), and then, receives a response request signal to which a terminal ID (=2, 3, . . . ) different from its own terminal ID (=1) is given (in FIG. 7, the decision of the step D3 shows "NO" and the decision of the step D18 indicates "YES"), and hence, increments the M-channel receive count value MR by one at every receive of M channel [MR=1, 2: steps F9 and F10 (correspond to the step D19 in FIG. 7].

Furthermore, when the M-channel receive count value MR arrives at 2 (that is, when the response request signal to which a terminal ID different from its own terminal ID is given is received twice), each of the CAUs 4-1 and 4-2 initializes the M-channel transmission flag MS and the M-channel receive count value MR into zero, and produces a random number (for example, the CAU 4-1 generates "2" while the CAU 4-2 creates "0") to set it as the M-channel transmission wait count value MW [step F11 (corresponding to the steps D21 to D23 in FIG. 7).

In this state, after making a round of the transmission processing of the response request signals to the respective CAUs 4-i, the CAM 2 again forwards the M channel (response request signal) to which the terminal ID=1 is given (step F12), whereupon each of the CAUs 4-1 and 4-2 decrements the M-channel transmission wait count value MW by one (−1) [steps F13 and F14 (corresponding to the step D6' in FIG. 7)].

Thus, since the M-channel transmission wait count value MW comes to zero in the CAU 4-2, the CAU 4-2 is released from its M-channel transmission wait condition, and sets the M-channel transmission flag MS to 1 (step F15), and further, returns a response signal in answer to the aforesaid response request signal (terminal ID=1) to the CAM 2 through the use of an M channel (step F16).

Upon receipt of this response signal, the CAM 2 measures the distance [the difference (delay time) from the transmission timing of a down-multiframe] from the CAU 4-1 on the basis of that receiving timing, and if the delay time develops, forwards a distance correction and response request signal (terminal ID=1) by means of an M channel (step F17). Now that the terminal ID=1 is given, this distance correction and response request signal is received (taken) by each of the CAUs 4-1 and 4-2. Whereupon, the CAU 4-1 further decrements the M-channel transmission wait count value MW by one so that it reaches zero (step F18), while the CAU 4-2 performs the transmission processing (the correction of the M-channel transmission timing) on a response signal corresponding to the distance correction and response request signal it receives (step F19).

Furthermore, upon receipt of the response signal from the CAU 4-2 in synchronism with the head timing of the down-multiframe [the aforesaid delay time disappears (Lr= 0)], the CAM 2, as mentioned before, transmits the distance OK and the proper terminal ID=$n_0$ as an M channel addressed to the CAU 4-i whose terminal ID=1 [step F20 (corresponding to the step C19 in FIG. 6A)].

Thus, the CAU 4-2 changes its own terminal ID from the temporary terminal ID (=1) to the proper terminal ID (=$n_0$) communicated in the M channel form, and further, sets the registration flag f1 to 1 [step F21 (corresponding to the step D31) in FIG. 7]. Whereupon, the CAU 4-2 goes into a transmission permission condition on C, D and B channels unless receiving the aforementioned C-channel transmission inhibition signal from the CAM 2. Besides, although the aforesaid M channel is also received by the CAU 4-1 because the terminal ID=1 is given, the M-channel transmission flag MS of the CAU 4-1 is zero at this time (in FIG. 7, the step D28 makes NO decision), the CAU 4-1 disregards it.

Let it be assumed that the CAM 2 again forwards an M channel (response request signal) to the non-registered (terminal ID=1) CAU 4-i afterwards (step F22). In this case, since, in the CAU 4-1, the M-channel transmission wait count value MW assumes zero (M-channel transmission permission condition), the CAU 4-1 sets the M-channel transmission flag MS to 1 (step F23), and returns a response signal in answer to the received response request signal to the CAM 2 at the next transmission timing (step F24).

When receiving this response signal from the CAU 4-1, the CAM 2 measures the difference (delay time) from the transmission timing of the down-multiframe on the basis of its reception timing, and if there is the delay time, transmits a distance correction and response request signal (terminal ID=1) in the form of an M channel (step F25). Upon receipt of this distance correction and response request signal, the CAU 4-1 corrects the transmission timing to the CAM 2 and then transmits a response signal to the CAM 2 (step F26).

Furthermore, when receiving the response signal from the CAU 4-1 in synchronism with the head timing of the down-multiframe (when the aforesaid delay time disappears), the CAM 2 transmits the distance-OK and the proper terminal ID =$m_0$ as an M channel directed to the CAU 4-i whose terminal ID=1 [step F27 (corresponding to the step C19 in FIG. 6A)].

Whereupon, the CAU 4-1 changes its own terminal ID from the temporary terminal ID (=1) to the proper terminal ID (=$m_0$) given in the M channel form, and sets the registration flag f1 on 1 [step F28 (corresponding to the step D31 in FIG. 7)]. As a result, the CAU 4-1 comes into a transmission permission condition for C, D and B channels except for the case of receiving the aforesaid C-channel transmission inhibition signal from the CAM 2.

As described above, in this CATV system 1, through the transmission/reception (exchange) of the control signals such as the response request signal, the response signal and the distance correction and response request signal between the CAM 2 and the non-registered CAUs 4-i in an M channel form, the registration on the non-registered CAUs 4-i becomes achievable. In addition, in case where the M channels from a plurality of non-registered CAUs 4-i collide against each other on the CAM 2 side to make the normal M channel reception difficult, the registration on each of the CAUs 4-i is done in a manner that the M-channel transmission timing is shifted on the CAU 4-i side.

(4) Description of an Operation of a Principal Section (Demodulation section 25 and Frame Disassembling Section 26) of the CAM 2

Referring to the flow chart of FIG. 11, a description will be made hereinbelow of M-channel and C-channel receiving processing in the demodulation section 25 and frame disassembling section 26 of the CAM 2 constituting a principal section of this embodiment. In the following description, as shown in (a) of FIG. 12, the start time (the head timing of a multiframe) of "M channel window" is taken to be t0, the end time thereof is taken as t3, the timing (time) at which the UW of a C channel is detectable is taken as t2, and the timing (time) previous by 2 clocks to the head timing of the C-channel is taken as t1.

In the demodulation section 26, the clock controller 26-3 (which will hereinafter be referred simply to as a controller 26-3) performs a monitoring operation while counting (timing) the present time t until the time reaches the time t0 [until the reception of a multiframe clock (MFCK) from the TG 26-2: until the decision of step G1 indicates "YES"] (from step G1 through its NO route to step G2).

In this state, when receiving a multiframe clock (MFCK) from the TG 26-2, the controller 26-3 controls the switch 25-6 to set a sampling clock (ADCK) to the A/D converters 25A-3 and 25B-3 on an M-channel receive detection clock (DCKM) generated in the TG 26-2 (from step G1 through its YES route to step G3), thus setting the receive processing of the demodulation section 25 (channel receiving section 14) to an M-channel receive detection (monitor) mode.

Furthermore, the controller 26-3 monitors whether or not the BTR section 25-5 detects a level representative of the reception of an M channel till the time t1 while measuring the present time t (step G4, NO route from step G5, NO route from step G6).

In this state, upon the detection of the level indicative of the reception of the M channel in the BTR section 25-5 before the time t1, the controller 26-3 controls the switch 25-6 to switch or set the aforesaid sampling clock (ADCK) to an M-channel receive clock (CKS) produced in synchronism with the timing of the received M channel in the BTR section 25-5 (from step G5 through its YES route to step G7), thus placing the receiving processing into an M-channel receive mode in the demodulation section 25 (channel receiving section 14).

Thus, the received M channels are successively demodulated in the QPSK demodulator 25-4 and stored in the Mch register 26b of the channel disassembling section 26-1, and then, successively communicated to the CPU 27.

On the other hand, at this time, the controller 26-3 continuously monitors whether or not to complete the demodulation (receive) of the M channel until the time t3 while measuring the present time t (steps G8 to G10, NO routes of steps G10 and G11), and when receiving information about the receive completion of the M channel from the channel disassembling section 26-1 until the time t3 (the answer of step G10 is affirmative), hands over the demodulated M channel data from the channel disassembling section 26-1 to the CPU 27 (step G12).

In addition, the controller 26-3 checks whether or not the present time t reaches the time t3 (whether or not the "M channel window" comes to an end) (step G12), and if not reaching the time t3 (NO decision in step G12), further decides whether or not the present time t reaches the time t1 (step G13).

If this decision result shows that the present time t does not reach the time t1, the controller 26-3 performs the monitoring operation while counting the present time t until the present time t reaches the time t1 or t3 (step G13, and from step G14 through its NO route to step G15). Besides, when the present time t comes to the time t3 (YES decision in step G11 or G13), because of the completion of the "M channel window", the controller 26-3 controls the switch 25-6 to switch the sampling clock (ADCK) for the A/D converter 25A-3 and 25B-3 to the system basic clock (CKM) (step G16), and sets the receive mode in the demodulation section 25 to a fixed channel (D channel, B channel) receive mode.

On the other hand, in the case of the arrival at the time t1 with no reception of the M channel (YES decision in step G6), or in the case of the arrival at the time t1 after the completion of the reception of the M channel (YES decision in step G14), in either case, the controller 26-3 controls the switch 25-6 to switch the sampling clock (ADCK) to the system basic clock (CKM) (step G17), and sets the receive mode in the demodulation section 25 to a fixed channel (C channel) receive wait mode.

Thus, the demodulation section 25 demodulates the C channel upon receipt of the C channel after the arrival at the time t1. Further, the controller 26-3 continues the C-channel receive wait mode while monitoring whether or not the present time t reaches the time t2 (steps G18 to G20, and NO route from step G20). At the time t2, the UWD 26-5 checks whether or not to detect the UW of the C channel (from step G20 through its YES route to step G21).

At this time, along with the detection of the UW of the C channel by the UWD 26-5, upon receipt of a UW detection signal (H level), the controller 26-3 keeps the system basic clock (CKM) as the sampling clock (ADCK) to change the receive mode of the demodulation section 25 to the C-channel receive mode, and communicate the C channel data from the channel disassembling section 26-1 (register 26c) to the CPU 27 (steps G22 and G23).

In the case that the UWD 26-5 does not detect the UW of the C channel (NO decision in step G21), the controller 26-3 controls the switch 26-5 to set the sampling clock (ADCK) to the M-channel receive detection clock (DCKM) (step G3), thereby setting the receive mode in the demodulation section 25 to the M-channel receive detection mode. Whereupon, even if the M channel is received between the time t2 and the time t3, the demodulation section 25 can normally receive (demodulate) the M channel.

That is, by the setting of the receive mode by the controller 26-3, the demodulation section 25 performs C-channel receiving processing if a C channel is received in the period (corresponding to the period T12 in FIG. 3) between the time t2 and the time t3, whereas conducting M-channel receiving processing upon the reception of an M channel. Thereupon, in an up-frame, a receive permission period for an M channel from a non-registered CAU 4-i which is seldom used during the usual service and a receive period for a service channel from a registered CAU 4-i are timewise overlapped with each other.

Referring here to the time charts of FIGS. 12 to 21, a detailed description will be given hereinbelow of a concrete example of the above-mentioned receiving processing.

Figure 12:
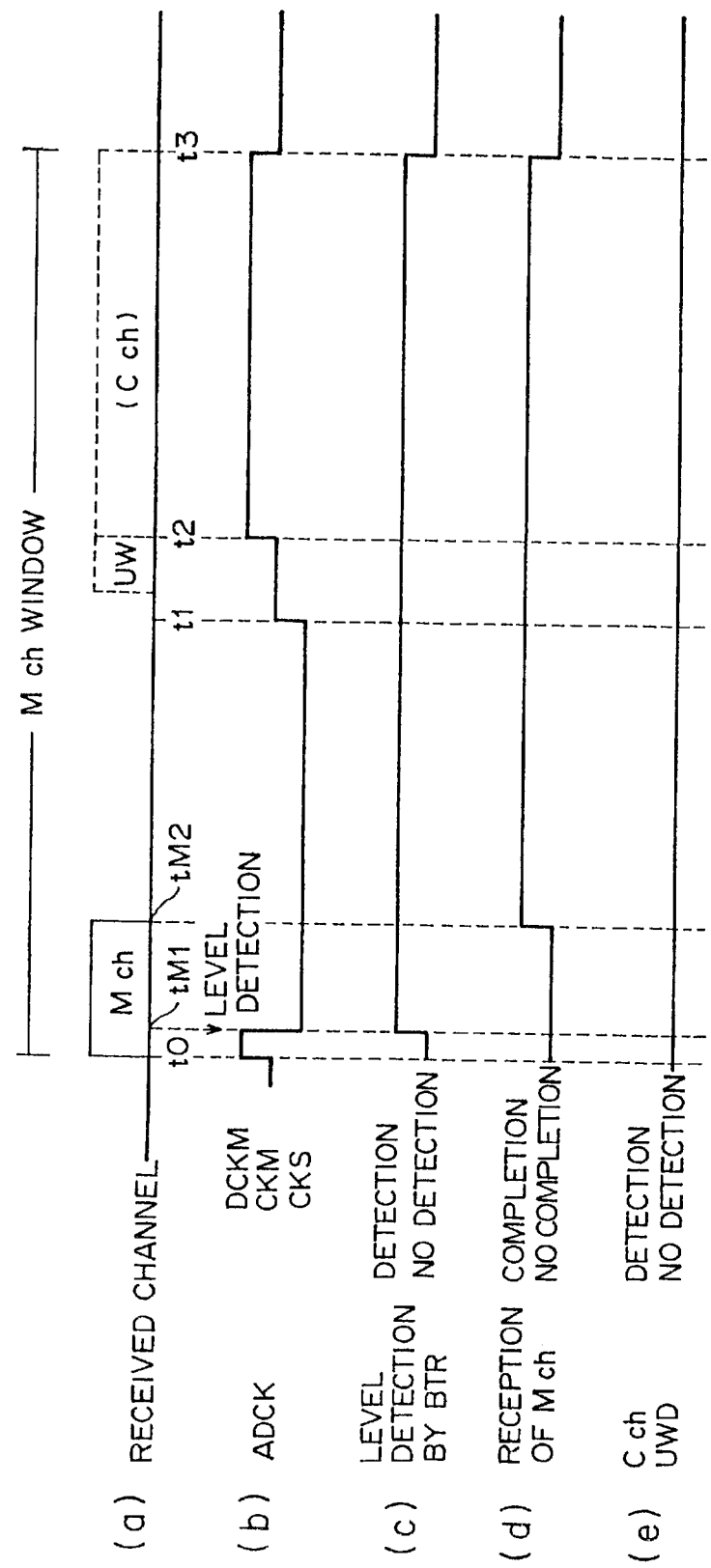
FIGS. 12 to 21 are time charts available for explaining M channel and C channel receive processing which constitute a principal portion of this embodiment.

(4-1) the Case of Transmission of Only an M channel of a Registered CAU 4-i (see FIG. 12)

In this case, the clock controller 26-3 controls the switch 25-6 to switch the sampling clock (ADCK) for the A/D converters 25A-3 and 25B-3 in the order as shown in (b) of FIG. 12.

Figure 11:
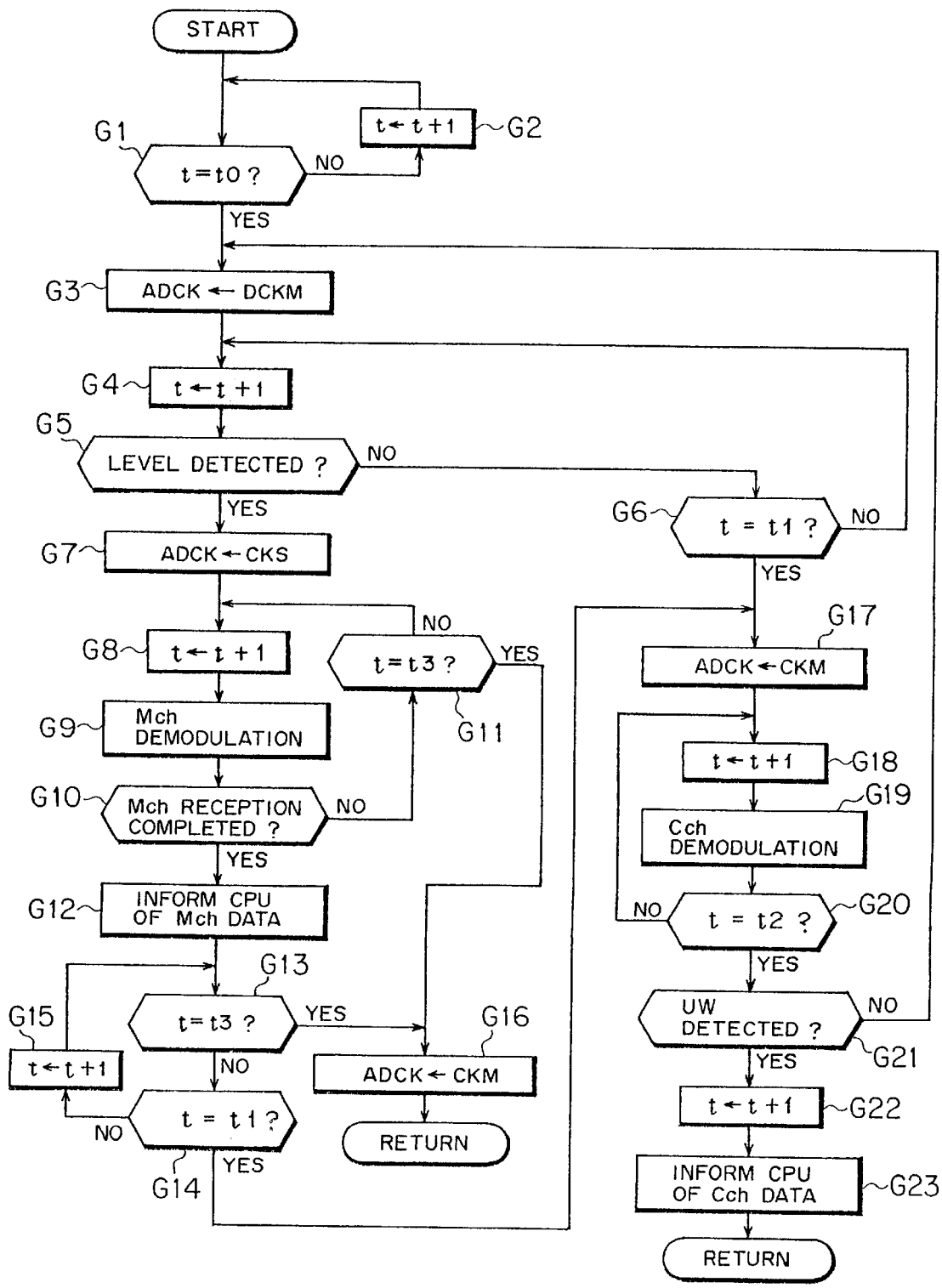
FIG. 11 is a flow chart available for describing M channel and C channel receive processing in a demodulation section 25 and frame disassembling section 26 in the CAM 2 in this embodiment.

More specifically, the controller 26-3, at the start time t0 of "M channel window", switches the sampling clock (ADCK) from the system basic clock (CKM) to the M-channel receive detection clock (DCKM) (corresponding to the step G3 in FIG. 11). Meanwhile, as shown in (a) of FIG. 12, the M channel from a registered CAU 4-i arrives at the time t0, and hence, as shown in (c) of FIG. 12, in the BTR section 25-5, the level indicative of the reception of the M channel is detected at the time tM1 [the level detection signal to the controller 26-3 goes high (H)].

Accordingly, at the time tM1, the controller 26-3, as shown in (b) of FIG. 12, switches the aforesaid sampling clock (ADCK) from the M-channel receive detection clock (DCKM) to the M-channel receive clock (CKS) synchronous with the up-frame produced in the BTR section 25-5 (corresponding to the step G7 in FIG. 11) to set the receive mode in the channel receiving section 14 to the M-channel receive mode. Thereupon, the M channel from the registered CAU 4-i is normally received by the channel demultiplexing 26-1. At the time of the completion of the reception of the M channel [the time tM2 in (d) of FIG. 12], the channel demultiplexing section 26-1 informs the controller 26-3 of the reception of the M channel (H level).

Following this, the controller 26-3 fixes the sampling clock (ADCK) to the M-channel receive clock (CKS) as shown in (b) of FIG. 12 before the time t1, and when the time t1 is reached, switches the sampling clock (ADCK) from the M-channel receive clock (CKS) to the system basic clock (CKM) (corresponding to the step G16 in FIG. 11), thus going into a C-channel receive wait condition.

At this time, since the C channel from the registered CAU 4-i does not arrive as indicated by a broken line in (a) of FIG. 12, the UW of the C channel is not detected in the UWD 26-5 during the period between the time t1 and the time t2 as shown in (e) of FIG. 12 (the UW detection signal remains being an L level: the step G20 in FIG. 11 makes NO decision). For this reason, the controller 26-3 changes the sampling clock (ADCK) from the system basic clock (CKM) to the M-channel receive detection clock (DCKM) at the time t2 (corresponding to the step G3 in FIG. 11) to set the receive mode in the channel receiving section 14 to an M-channel receive monitoring mode until the end time t3 of the "M channel window".

Incidentally, in this case, both the M-channel level detection signal and receive completion signal are canceled as shown in (c) and (d) of FIG. 12 when the present time t reaches the end time t3 of the "M channel window" [its level goes low (L)].

In consequence, in the case that only the M channel(s) of the registered CAU(s) 4-i is transmitted, the CAM can normally receive that M channel.

Figure 13:
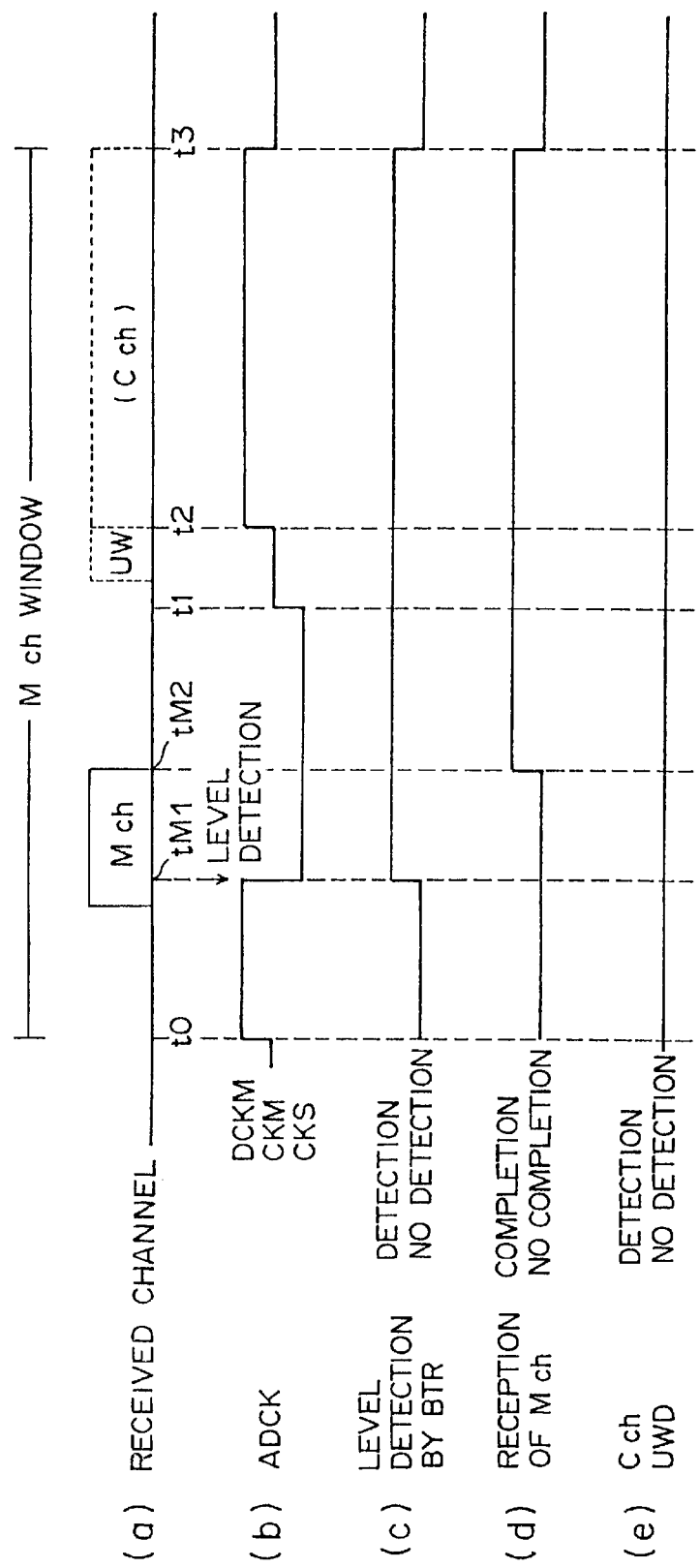

(4-2) the Case that Only an M Channel of a Non-Registered CAU 4-i is Transmitted and the Reception of the M Channel is Completed Before Time t1 (see FIG. 13)

In this case, as shown in (b) of FIG. 13, the clock controller 26-3 stepwise switches the sampling clock (ADCK) to the M-channel receive detection clock (DCKM), the M-channel receive clock (CKS), the system basic clock (CKM), the M-channel receive detection clock (DCKM) and the system basic clock (CKM) at the time t0, the time tM1, the time t1, the time t2 and the time t3, thus providing the normal reception of the M channel in the channel receiving section 14.

Also in this case, as shown in (c) and (d) of FIG. 13, the M-channel level detection signal and receive completion signal disappear (go into an L level) when the present time t reaches the end time t3 of the "M channel window", while the C-channel UW detection signal remains at an L level as shown in (e) of FIG. 13.

Figure 14:
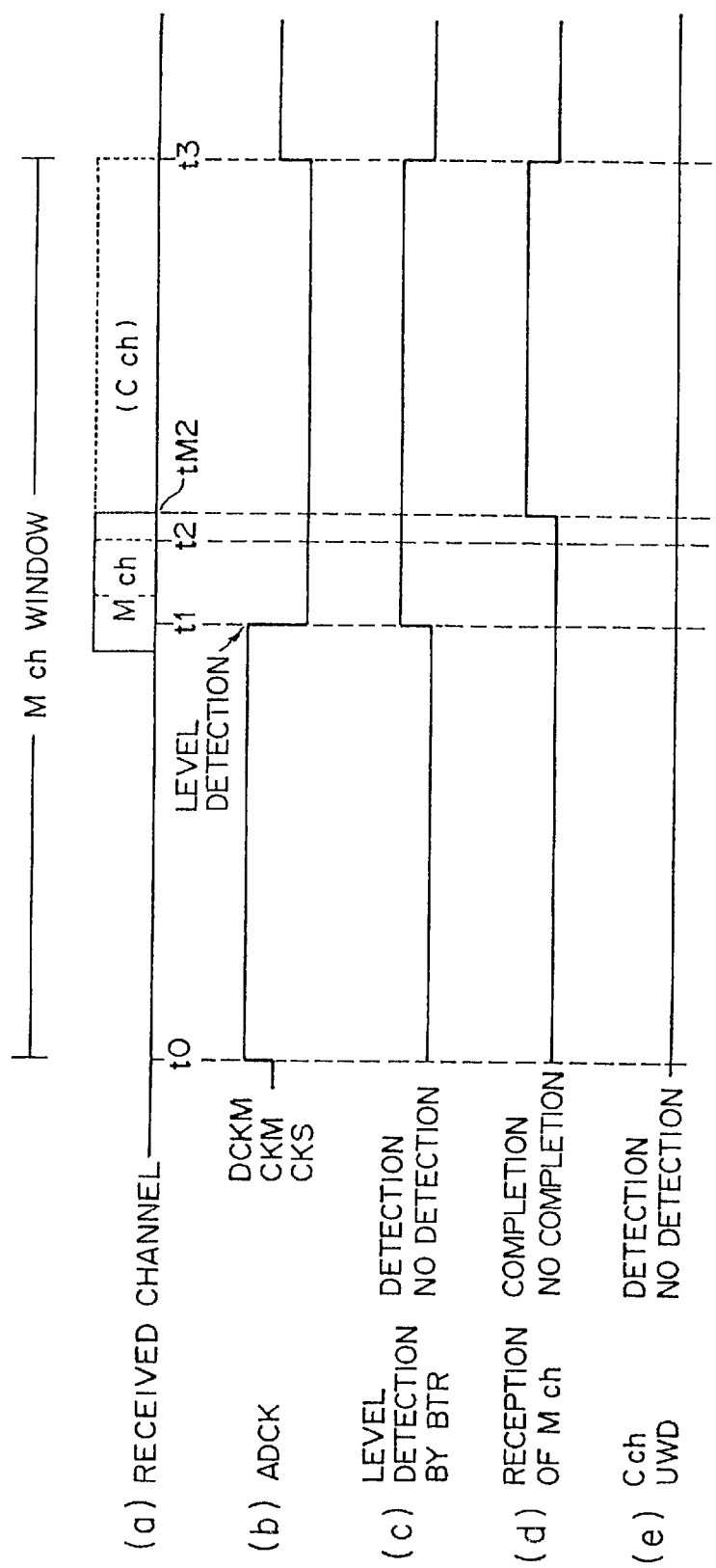

(4-3) the Case that Only an M Channel of a Non-Registered CAU 4-i is Forwarded and the Reception of the M Channel(s) is not Completed Before Time t1 (see FIG. 14)

In this case, as shown in (b) of FIG. 14, the clock controller 26-3 stepwise switches the sampling clock (DACK) to the M-channel receive detection clock (DCKM), the M-channel receive clock (CKS) and the system basic clock (CKM) at the time t0, the time t1 (here, the time t1 the M-channel level detection time tM1) and the time t3, thereby providing the normal reception of the M channel by the channel receiving section 14 from the time t1.

Also in this case, as shown in (c) and (d) of FIG. 14, the M-channel level detection signal and receive completion signal disappear or undo when the present time t reaches the end time t3 of the "M channel window", while the C-channel UW detection signal remains at an L level as shown in (e) of FIG. 14.

Figure 15:
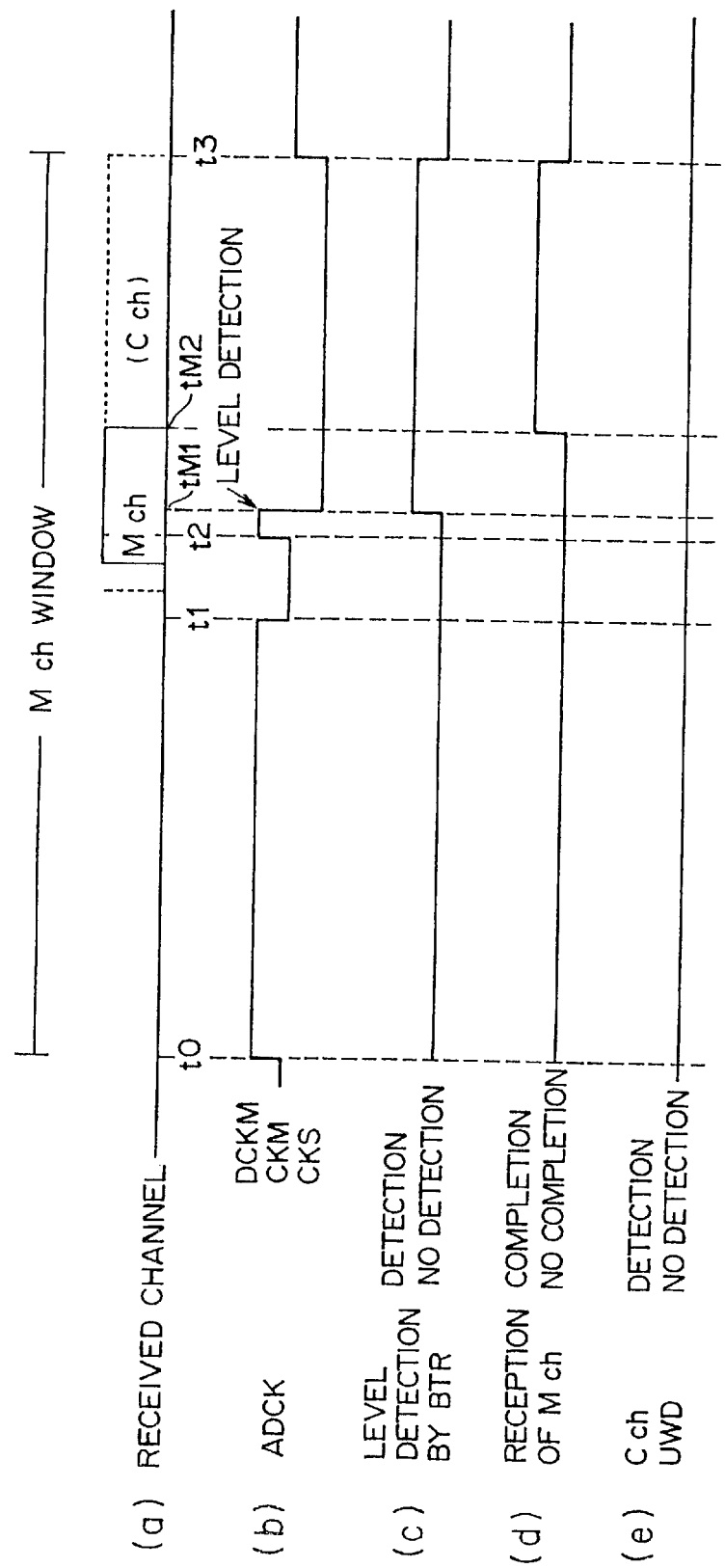

(4-4) the Case that Only an M Channel of a Non-Registered CAU 4-i Arrives between Time t1 and Time t2 (see FIG. 15)

In this case, since the clock controller 26-3 switches the sampling clock (ADCK) to the system basic clock (CKM) for the period from the time t1 to the time t2, even if an M channel is received during this period, the M channel level can not be detected in the BTR section 25-5.

However, the controller 26-3 again switches the sampling clock (ADCK) to the M-channel receive detection clock (DCKM) in the case of no detection of the UW of the C channel during this period and places the channel receiving section 14 into the M-channel receive detection mode, and since the preamble of the M channel is sufficiently longer than the period between the time t1 and the time t2, even if the portion received for the period between the time t1 and the time t2 is not received in the BTR section 25-5, it is detectable by the remaining portion. Accordingly, even in this case, the M channel is normally receivable.

Also in this case, as shown in (c) and (d) of FIG. 15, the M-channel level detection signal and receive completion signal disappear when the present time t reaches the end time t3 of the "M channel window", while the C-channel UW detection signal remains at an L level as shown in (e) of FIG. 15.

Figure 16:
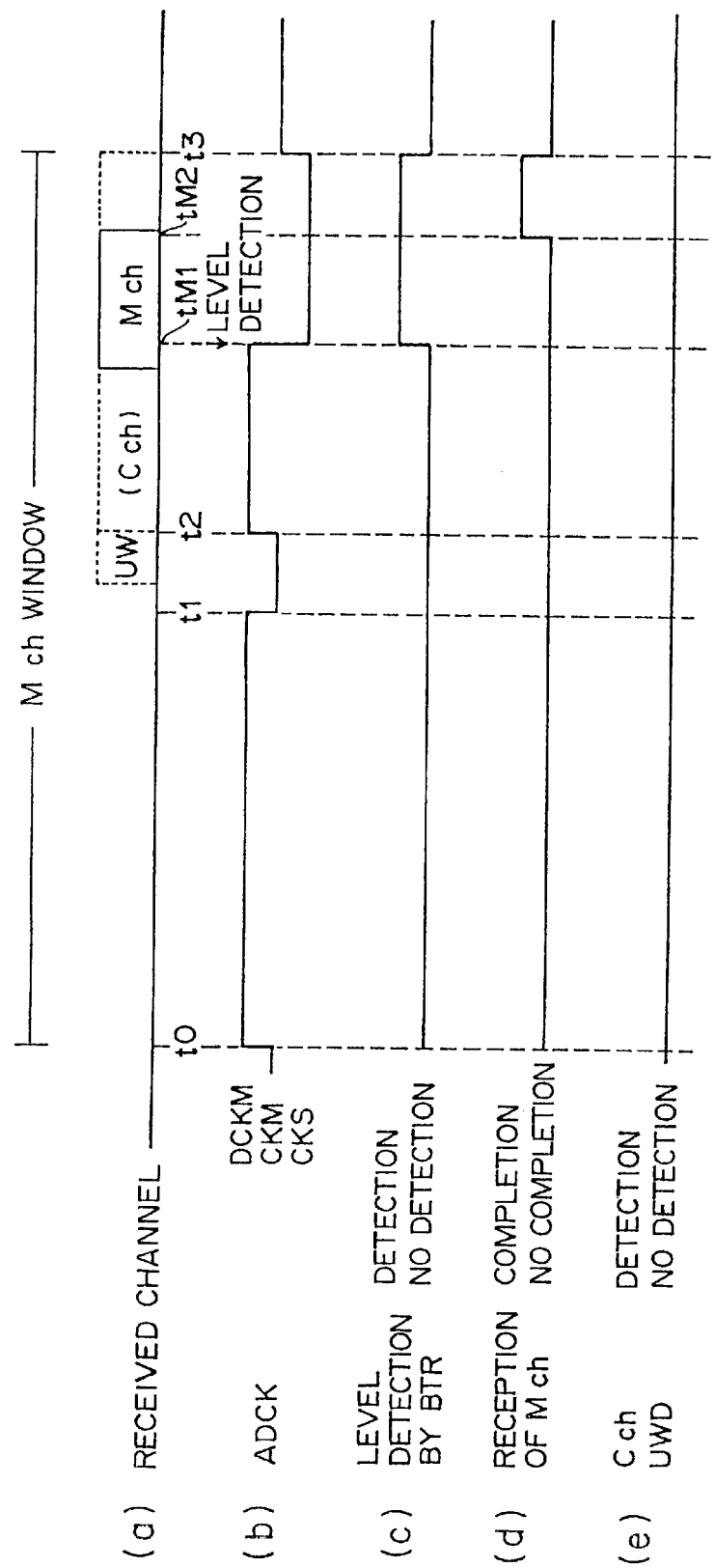

(4-5) the Case that Only an M Channel of a Non-Registered CAU 4-i Arrives between Time t2 and Time t3 (see FIG. 16)

In this case, as shown in (b) of FIG. 16, the clock controller 26-3 stepwise switches the sampling clock (ADCK) to the M-channel receive detection clock (DCKM), the system basic clock (CKM), the M-channel receive detection clock (DCKM), the M-channel receive clock (CKS) and the system basic clock (CKM) at the time t0, the time t1, the time t2, the time tM1 and the time t3, thereby offering the normal reception of the M channel by the channel receiving section 14.

Also in this case, as shown in (c) and (d) of FIG. 16, the M-channel level detection signal and receive completion signal disappear when the present time t reaches the end time t3 of the "M channel window", while the C-channel UW detection signal remains at an L level as shown in (e) of FIG. 16.

Figure 17:
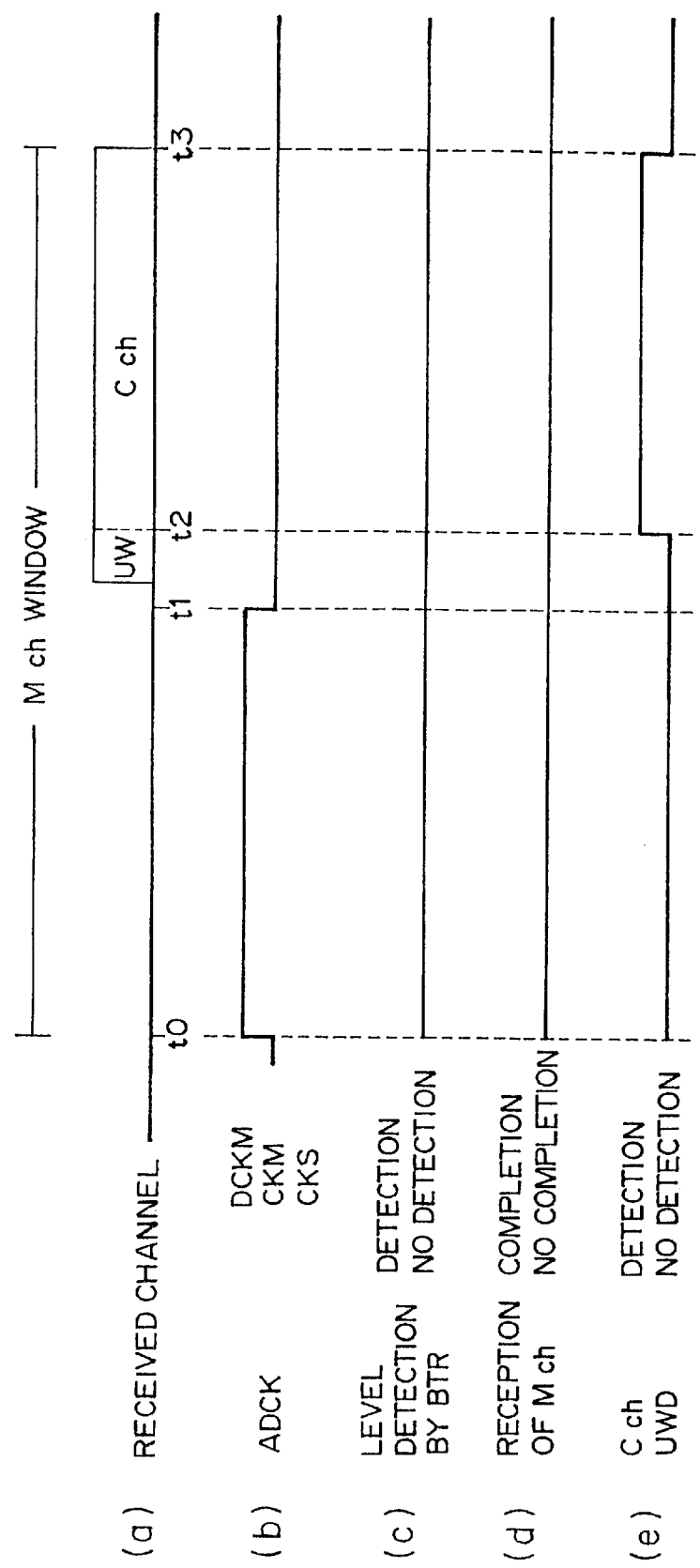

(4-6) the Case that Only a C Channel of a Registered CAU 4-i Arrives (see FIG. 17)

In this case, as shown in (b) of FIG. 17, the clock controller 26-3 switches the sampling clock (ADCK) to the system basic clock (CKM) at the time t1, and subsequently, as shown in (e) of FIG. 17, the UWD detection section 26-5 detects the UW of a C channel at the time t2 (the UW detection signal goes H level at the time t2).

Accordingly, as shown in (b) of FIG. 17, the controller 26-3 keeps the system basic clock (CKM) as the sampling clock (ADCK) after the time t2 to set the mode in the channel receiving section 14 to the C-channel receive mode. Whereupon, the C channel is normally receivable by the channel receiving section 14.

Besides, in this case, because of no occurrence of reception of an M channel, each of the M-channel level detection signal and the M-channel receive completion signal stays at an L level as shown in (c) and (d) of FIG. 17.

Figure 18:
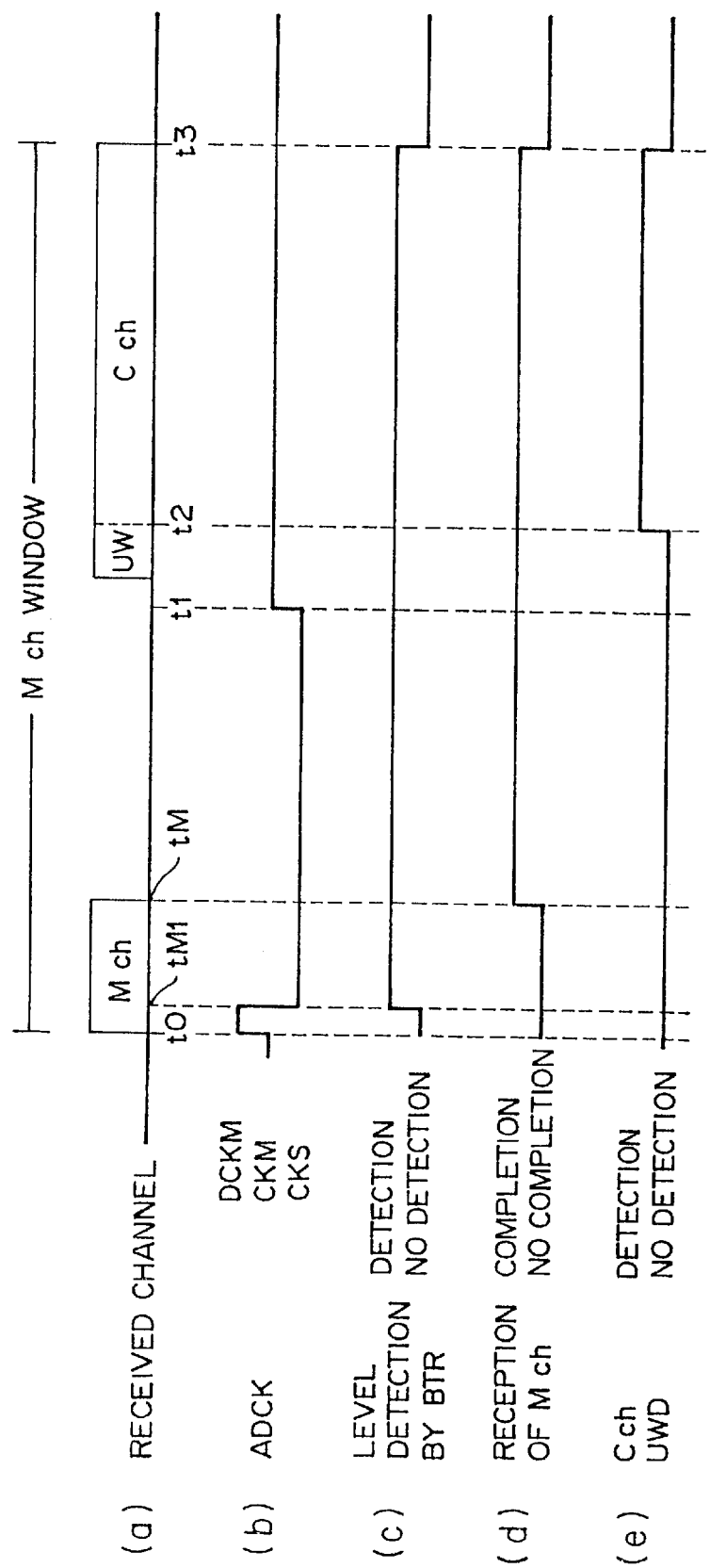

(4-7) the Case that an M Channel and C Channel from a Registered CAU 4-i Arrive (see FIG. 18)

In this case, as shown in (b) of FIG. 18, the clock controller 26-3 switches the sampling clock (ADCK) from the system basic clock (CKM) to the M-channel receive detection clock (DCKM) at the time t0 and from this clock (DCKM) to the M-channel receive clock (CKS) at the time tM1, thus providing the normal reception of the M channel by the channel receiving section 14.

After this, the controller 26-3 switches the sampling clock (ADCK) from the M-channel receive clock (CKS) to the system basic clock (CKM) at the time t1. In this state, as shown in (e) of FIG. 18, the UW of the C channel is detected in the UWD 26-5, and hence, the controller 26-3 maintains the system basic clock (CKM) as the sampling clock (ADCK) to set the mode in the channel receiving section 14 to a C-channel receive mode, so that the C channel is normally detectable in the channel receiving section 14.

Also in this case, as shown in (c), (d) and (e) of FIG. 18, the M-channel level detection signal and receive completion signal and the C-channel UW detection signal disappear when the present time t reaches the end time t3 of the "M channel window".

Figure 19:
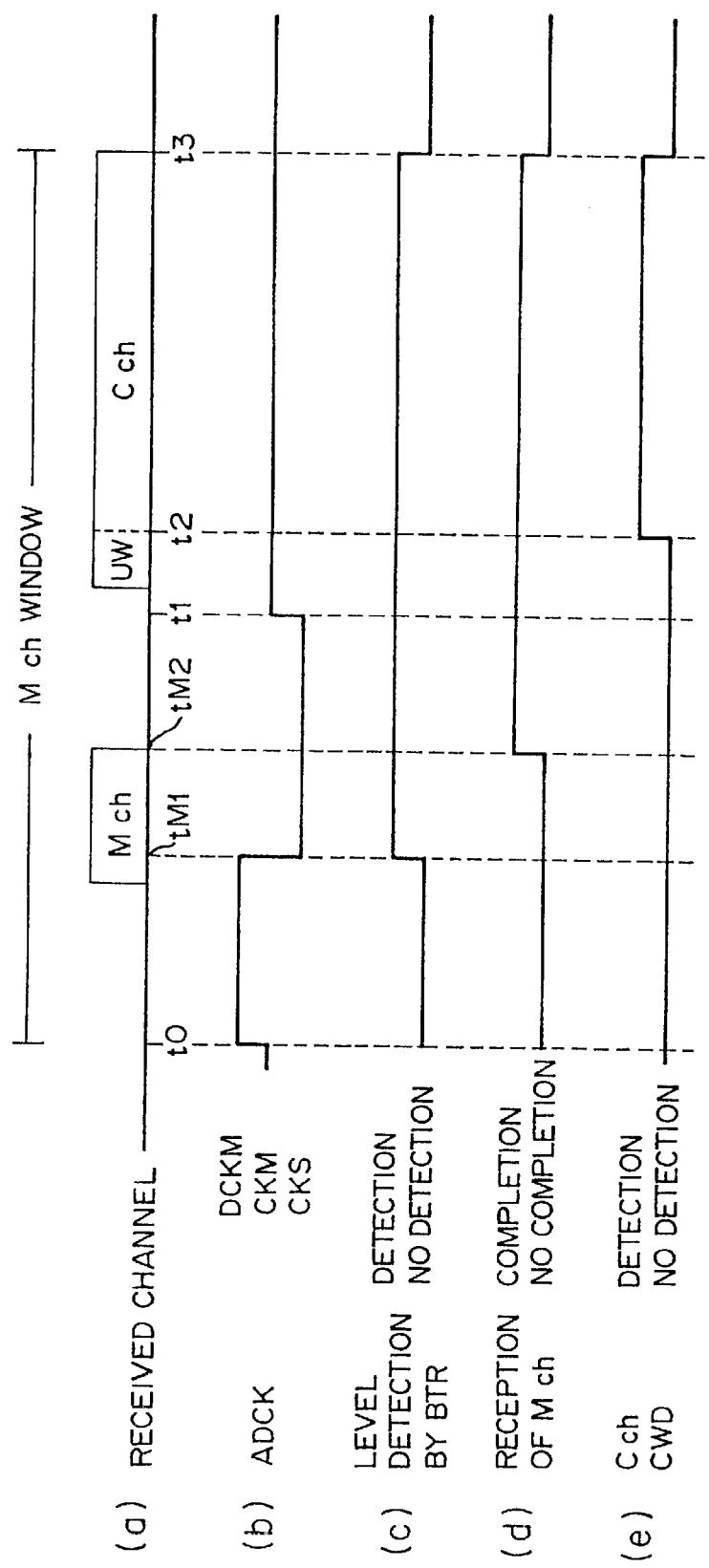

(4-8) the Case that the Reception of an M Channel from a Non-Registered CAU 4-i is Completed Before Time t1 and a C Channel from a Different Registered CAU 4-i Arrives (see FIG. 19)

Even in this case, as shown in (b) of FIG. 19, the clock controller 26-3 stepwise switches the sampling clock (ADCK) to the M-channel receive detection clock (DCKM) and the M-channel receive clock (CKS) at the time t0 and the time tM1, so that an M channel is normally detected by the channel receiving section 14, and it switches the sampling clock (ADCK) from the M-channel receive clock (CKS) to the system basic clock (CKM) at the time t1, and then, keeps the system basic clock (CKM) at the time t2, so that a C channel is also normally receivable.

Also in this case, as shown in (c), (d) and (e) of FIG. 19, the M-channel level detection signal and receive completion signal and the C-channel UW detection signal disappear when the present time t reaches the end time t3 of the "M channel window".

Figure 20:
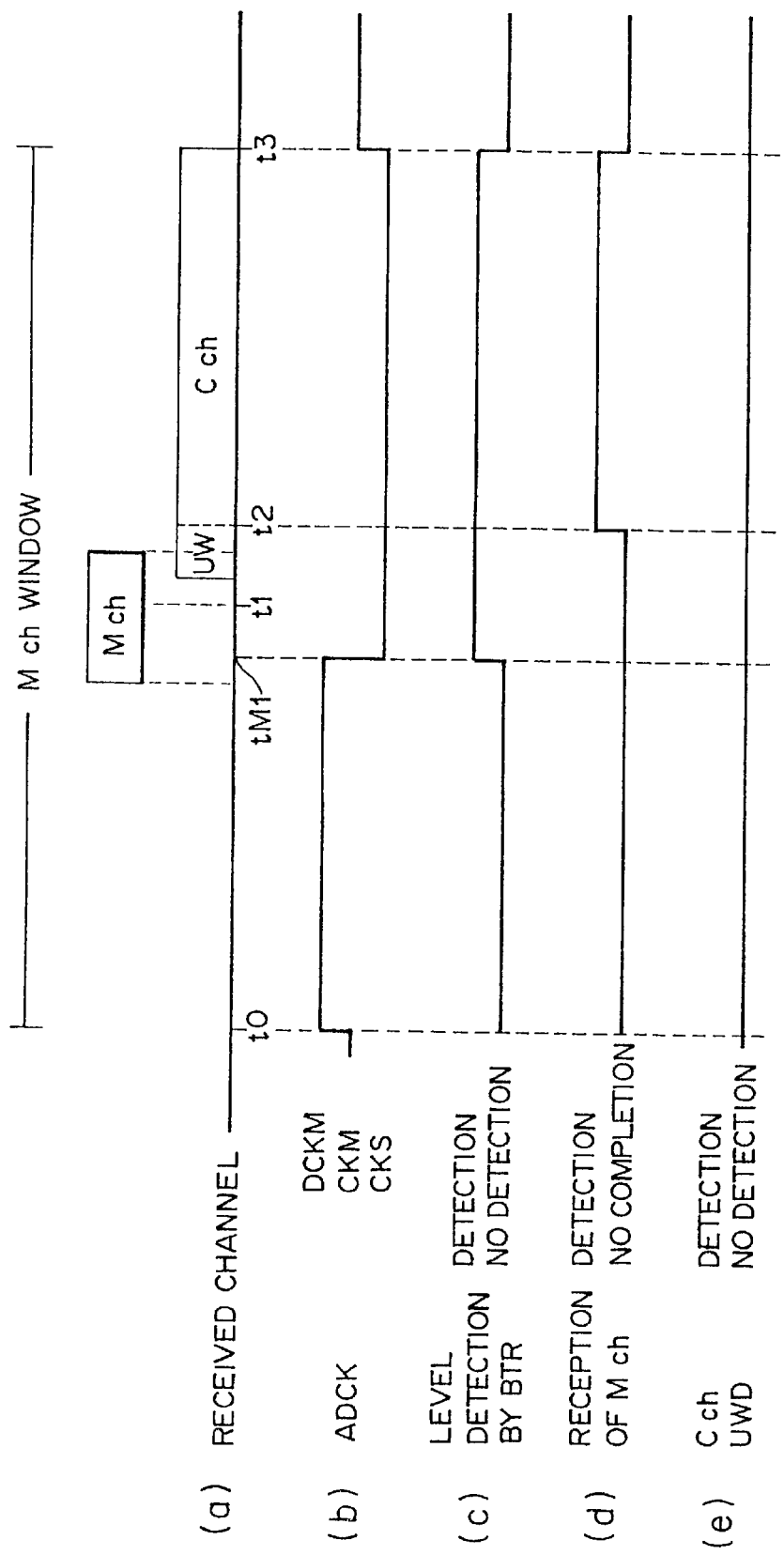

(4-9) the Case that an M channel from a Non-Registered CAU 4-i Arrives between Time t0 and Time t1 but the Reception of the M Channel is not Finished Before Time t1, and a C Channel from Another Registered CAU 4-i also Arrives (see FIG. 20)

In this case, as shown in (c) of FIG. 20, the level detection signal of the BTR section 25-5 goes into an H level at the time tM1 between the time t0 and the time t1, and hence, as shown in (b) of FIG. 20, at the time tM1, the clock controller 26-3 switches the sampling clock (ADCK) from the M-channel receive detection clock (DCKM) to the M-channel receive clock (CKS) to receive an M channel.

However, at this time, since a C channel is received in an overlapped (collision) condition with the M channel as shown in (a) of FIG. 20, it is impossible to normally accomplish the CRC of the M channel, which signifies the difficulty of the normal reception of the M channel.

Likewise, the normal reception of the C channel is also impossible because the sampling clock (ADCK) is switched to the M-channel receive clock (CKS) at the time tM1 as mentioned above to make it difficult to detect the UW in the UWD 26-5 [see (e) of FIG. 20].

Also in this case, as shown in (c) and (d) of FIG. 20, the M-channel level detection signal and receive completion signal disappear when the present time t reaches the end time t3 of the "M channel window", while the C-channel UW detection signal remains at an L level as shown in (e) of FIG. 20.

Figure 21:
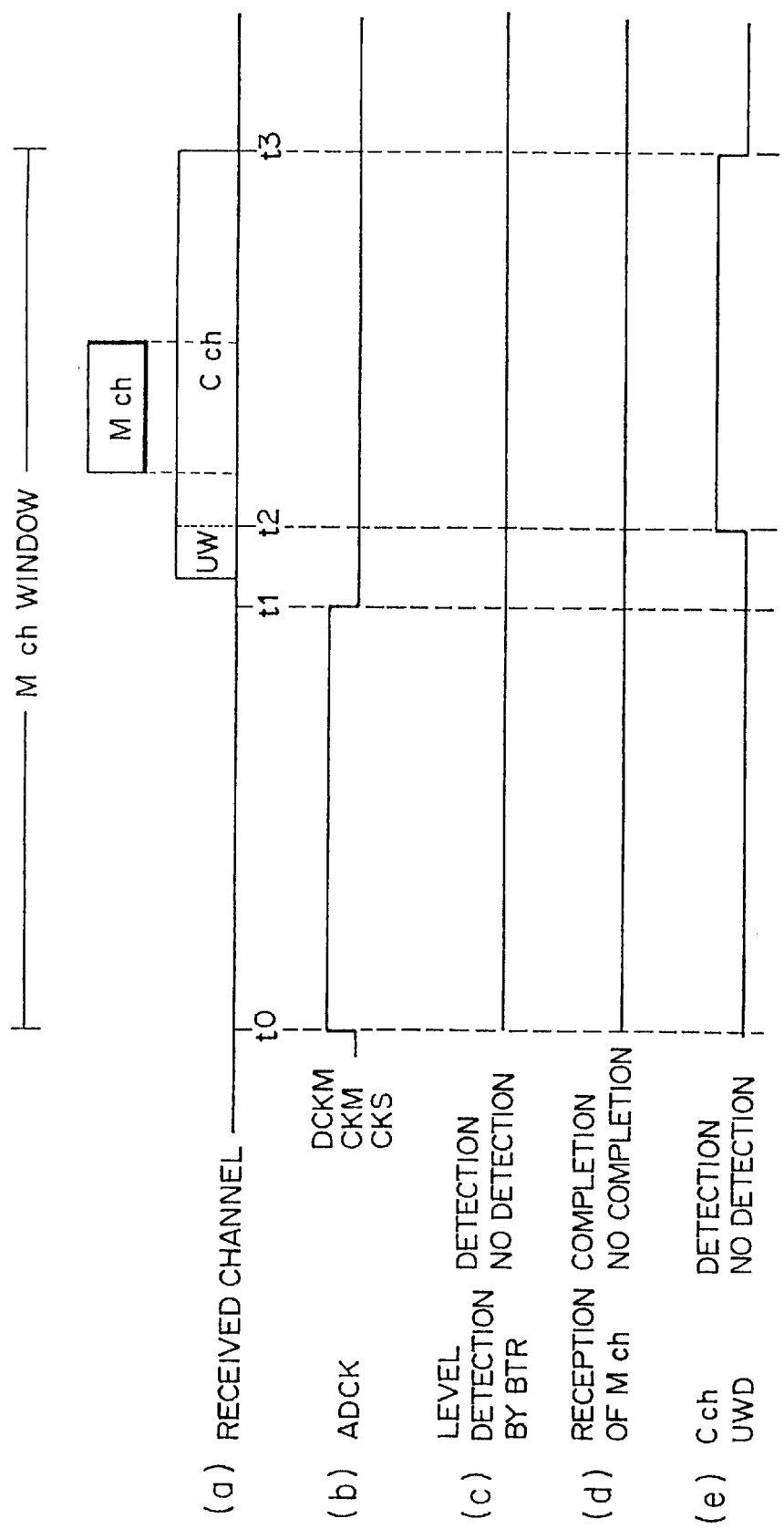

(4-10) the Case that an M Channel from a Non-Registered CAU 4-i Arrives between Time t1 and Time t2 or between Time t2 and Time t3 and the Reception of the M Channel is not Completed Before Time t1, and a C Channel from a Registered CAU 4-i also Arrives (see FIG. 21).

In this case, since the level representative of the reception of an M channel is not detected in the BTR section 26-5 between the time t0 and the time t1 as shown in (c) of FIG. 21, the clock controller 26-3 switches the sampling clock (ADCK) from the M-channel receive detection clock (DCKM) to the system basic clock (CKM) at the time t1 as shown in (b) of FIG. 21. Further, in this state, when the UWD 26-5 detects the UW of the C channel, the controller 26-3 maintains the system basic clock (CKM) as the sampling clock (ADCK).

Accordingly, naturally, not only the M channel to be received in an overlapped condition with the C channel after the time t2 is remote from normality, but also abnormality appears in the C channel data because of the overlapping with the M channel, with the result that the normal reception of the C channel is also impossible.

Also in this case, as shown in (c) and (d) of FIG. 21, the M-channel level detection signal and receive completion signal remain at an L level, while the C1 channel UW detection signal disappears when the present time t1 reaches the end time t3 of the "M channel window" as shown in (e) of FIG. 21.

As described above, in the items (4-9) and (4-10), in the case that an M channel transmitted from a non registered CAU 4-i runs against a C channel coming from a registered CAU 4-i, the M channel and the C channel are impossible to normally receive. However, in the ordinary operations, most of the CAUs 4-i is already registered, and therefore, the possibility of such collision is extremely low. In addition, even if such collision actually occurs, usually the M channel and the C channel are made to be re-transmitted from the CAUs 4-i, so that a significant problem is avoidable.

Furthermore, in case where a plurality of CAUs 4-i existing in one restrict malfunction (the power supplies are cut off) at a time due to troubles such as power failures, although the probability that such collision occurs increases at the re-registration of the malfunctioning CAUs 4-i after the settlement of the power failures, in this case, as mentioned before, the C-channel transmission inhibition signal is issued to the registered CAUs 4-i so that the registered CAUs 4-i stops the transmission of the C channel, and therefore, the occurrence of such collision is preventable.

As described above, since the CATV system 1 (CAM 2) according to this embodiment allows an M channel from an non-registered CAU 4-i is receivable within the period for receiving a C channel from a registered CAU 4-i, the "M channel window" (M-channel receive permission period) is considerably expandable compared with the C-channel receive period in the CATV system 1' shown in FIG. 43.

Figure 22:
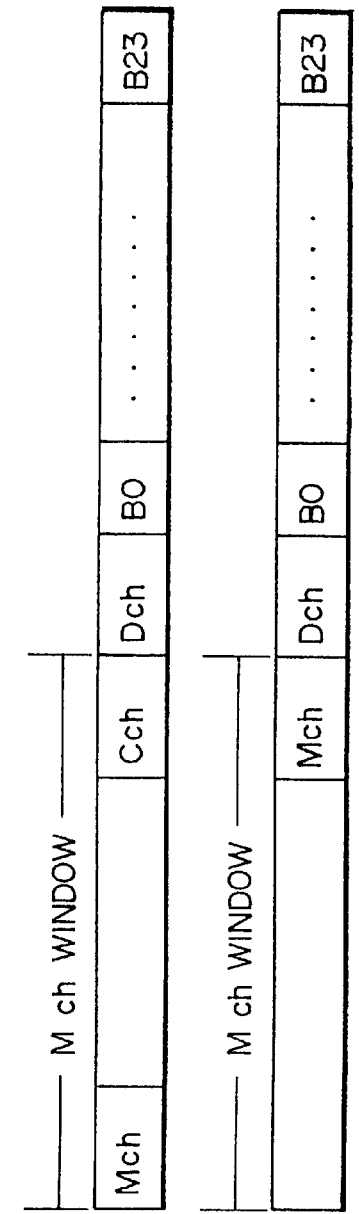
FIGS. 22A and 22B are illustrations of an up-frame format for describing the maximum transmission distance in the two-way CATV system according to this embodiment.

Concretely, in this embodiment, since the a receive permission range for an M channel in an up-frame is taken as shown in FIGS. 22A and 22B, the length $M_{WIN}$ of the "M channel window" is as follows.

$M_{WIN}$=1 frame (8,192 bits)−(Dch+Bch×24 bits)=8,192−(276+276× 24)bits=1,292 bits Now, since the area (length) of the M channel signal itself within the "M channel window" is 108 bits (see FIG. 47), the M-channel variation permission area results in 1,292−108= 1,184. Even in this system 1, since the transmission rate per bit in an up-frame is ¼ (2.048 Mbps) of that of a down-frame (8.192 Mbps), if being converted into time, the aforesaid variation permission area is:

1,184×(1÷2,048,000)=578.1(μs)

In this case, since the time to be taken for when a signal advances by 1 m in the transmission line 8 (coaxial cable) is 6 ns in the worst case, the maximum transmission distance (the going and returning distance between the CAM 2 and the CAU 4-i) is as follows.

578.1(μs)÷6(ns/m), which makes approximately 96 km

In consequence, the maximum transmission distance between the CAM 2 and the CAU 4-i comes to 96÷2=48 km (approximately 40 km if a margin is considered), so that it is expandable up to approximately twice that of the prior art (approximately 20 km). Accordingly, it is possible to construct a system 1 (CAM 2) which is capable of covering a district such as a farm village where subscribers are scattered while securing a minimum of C-channel band required.

In this embodiment, since the receive period T12 for a C channel in the CAM 2 is taken as being an arbitrary period other than the period T11 for receiving an M channel from a registered CAU 4-i as shown in FIG. 3, the following advantages are obtainable.

(1) Since the probability that an M channel and a C channel are received in an overlapped condition is reducible, which raises the reliability of the receive processing on each of the channels.

(2) Since the reception of the C channel takes place within an "M channel window", the C channel is receivable throughout an arbitrary period other than the period T11' for receiving the M channel from a registered CAU 4-i (it is possible to set the length of the C channel to an arbitrary value). In this embodiment, as shown in FIG. 4, a portion of the C channel, comprising an terminal ID, data and CRC code, is expanded up to 960 bits as compared with 512 bits (see FIG. 48) in the prior art, and therefore, the C-channel area is extended to sharply improve the C-channel throughput. Thus, the service in packet communications using a C channel is noticeably improvable.

(5) Description of a Modification

Figure 23:
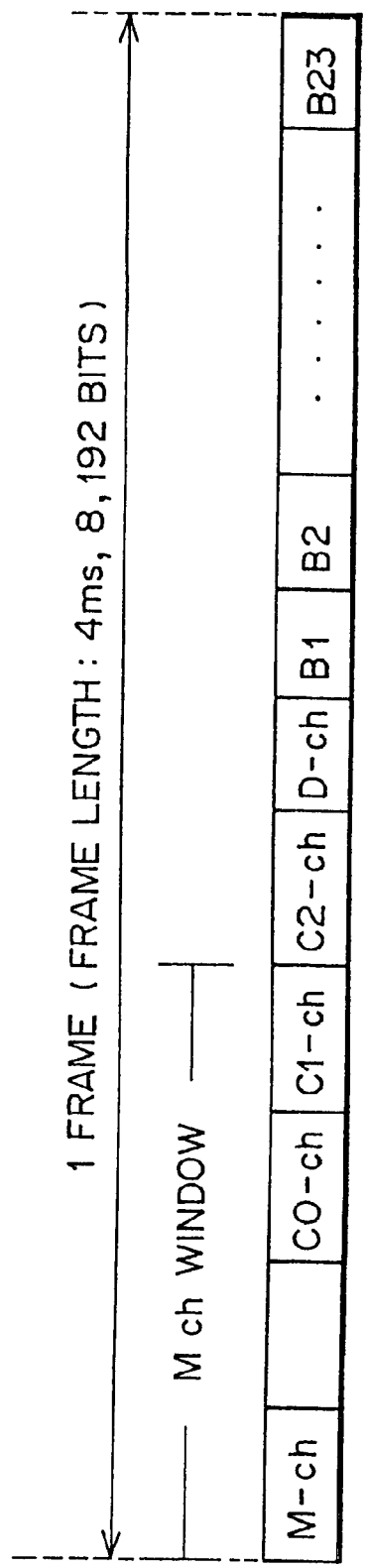
FIG. 23 is an illustration of an up-frame format for describing a modification of the M channel and C channel receive processing which constitutes a principal portion of this embodiment.

Although in the above-described embodiment the CAM 2 (the demodulation section 25 and the frame disassembling section 26) is designed so that an M channel is receivable within the period for receiving one C channel within an up-frame, for example, for a plurality of C channels (C0 to C2) received as shown in FIG. 23, it is also possible that an M channel is received within a period for receiving a portion thereof (for example, the C0 and C1 channels).

Figure 24:
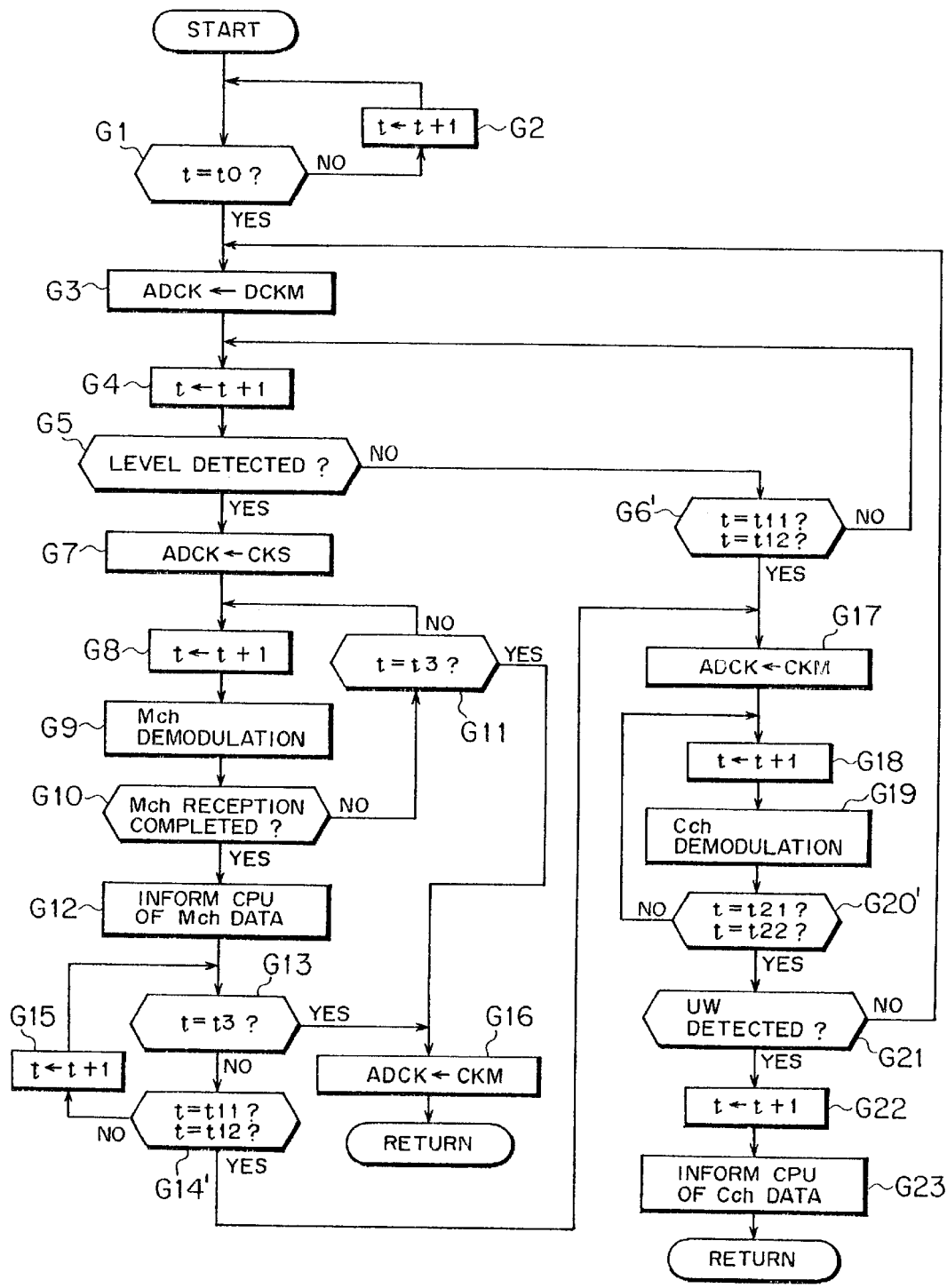
FIG. 24 is a flow chart for describing the modification of the M channel and C channel receive processing which constitutes a principal portion of this embodiment.
Figure 25:
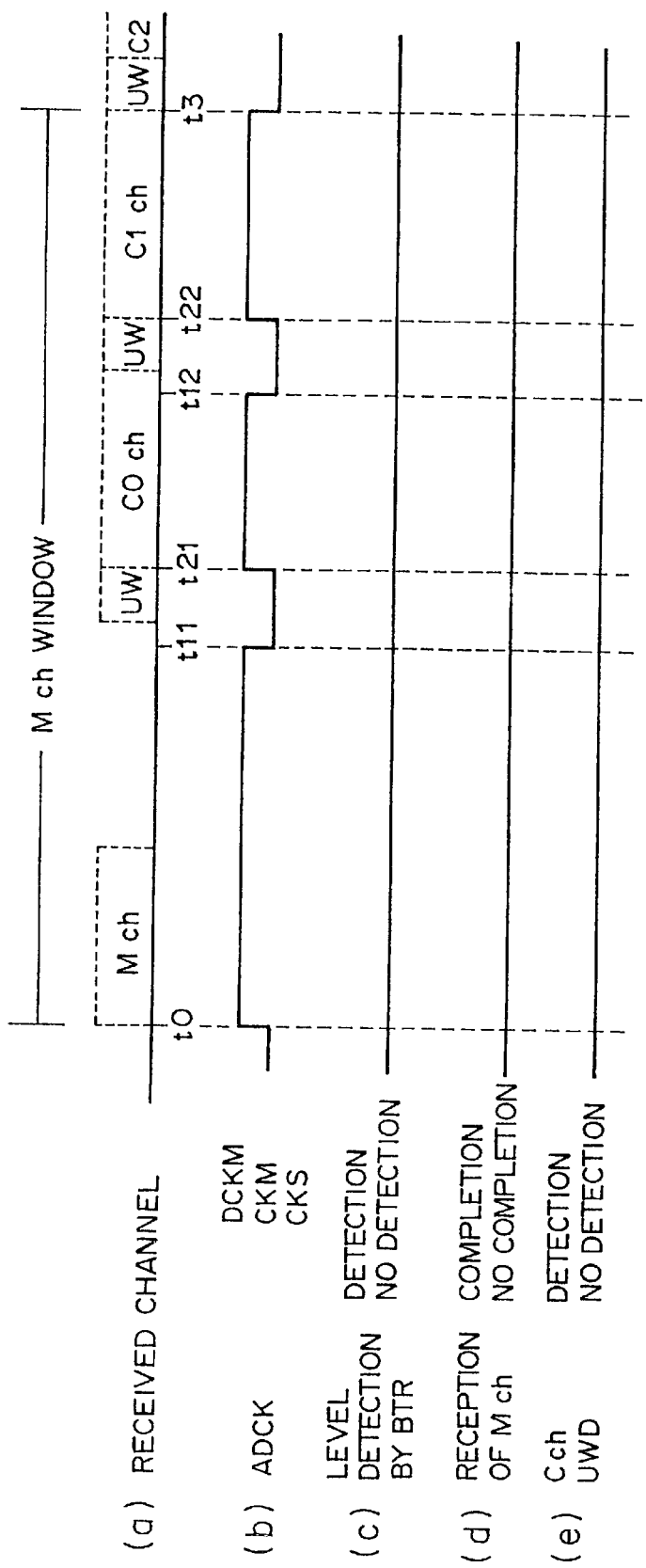
FIGS. 25 to 37 are time charts useful for explaining the modification of the M channel and C channel receive processing which constitute a principal portion of this embodiment.

In this case, for example, when, as shown in (a) of FIG. 25, the start time (the head timing of a multiframe) of an "M channel window" is taken to be t0, the UW detection timings of the C0 and C1 channels are taken as t21, t22, the timings prior by 2 clocks to these UW detection timings are taken as t11, t12 and the end time of the "M channel window" is taken as t3 (where t0<t11<t21<t12<t22<t3), if the aforesaid clock controller 26-3 operates according to the flow chart shown in FIG. 24, an M channel is receivable within the period for receiving the C0 channel and the C1 channel.

More specifically, looking at an operation of a principal portion in this case, referring to FIG. 24, the controller 26-3 monitors whether or not the present time t comes to the time t11 or the time t12 in the steps G6 and G14 in the flow chart of FIG. 11 (steps G6' and G14'), and if reaching the time t1 or the time t12, switches the sampling clock (ADCK) to the system basic clock CKM) (step G17), thus entering a C0 or C1 receive wait mode.

In this state, the controller 26-3 further monitors whether or not the present time t reaches the time t21 or the time t 22 (step G20'), and when the present time t reaches the time t21 or the time 22, the UWD 26-5 checks whether the UW of the C0 or C1 channel is detected (from step G20' through its YES route to step G21).

If the check result indicates the detection of the UW (when step G21 makes YES decision), the controller 26-3 keeps the sampling clock (ADCK) to be the system basic clock (CKM) to set the mode in the channel receiving section 14 to a C channel receive mode, and further, communicates C channel data from the channel demultiplexing section 26-1 (register 26c) to the CPU 27 (steps G22 and G23).

On the other hand, if the UW of the C channel is not detected in the UWD 26-5 (the answer of step G21 is "NO"), the controller 26-3 switches the sampling clock (ADCK) to the M-channel receive detection clock (DCKM) (step G3), and again sets the mode of the channel receiving section to an M-channel receive detection mode.

Furthermore, in the M-channel receive detection mode, when the BTR section 25-5 detects the level representative of the reception of the M channel (if the decision of step G5 shows "NO"), the controller switches the sampling clock (ADCK) to the M-channel receive clock (CKM) (from step G5 through its YES route to step G7), then entering the M-channel receive mode.

Accordingly, the CAM 2 can receive the M channel within a period (C0 channel receive period) between the time t21 and the time t12, and in like manner, can receive the M channel within a period (C1 channel receive period) between the time t22 and the time t3. Incidentally, the steps other than the steps G6', G14' and G20' in FIG. 24 are for conducting the processing similar to those mentioned previously with reference to FIG. 11.

Concrete examples will be described hereinbelow with reference to FIGS. 25 to 37.

(5-1) None of Channels (that is, an M Channel, a C0 Channel and a C1 Channel) arrives from a CAU 4-i (see FIG. 25)

In this case, as shown in (c) to (d) of FIG. 25, the level detection signal, the M-channel receive completion signal and the UW detection signal respectively coming from the BTR section 25-5, the channel demultiplexing section 26-1 and the UWD 26-5 all remain at an L level for a period from the t0 to the time t3 constituting an "M channel window".

Thus, as shown in (b) of FIG. 25, for the purpose of detection of an M channel, the clock controller 26-3 switches the sampling clock (ADCK) to the M-channel receive detection clock (DCKM) for periods other than the periods during which the UW of the C0 or C1 channel is detectable (the period between the time t11 and the time t21 and the period between the time t12 and the time t22) to set the mode in the channel receiving section 14 to the M-channel receive detection mode.

Figure 26:
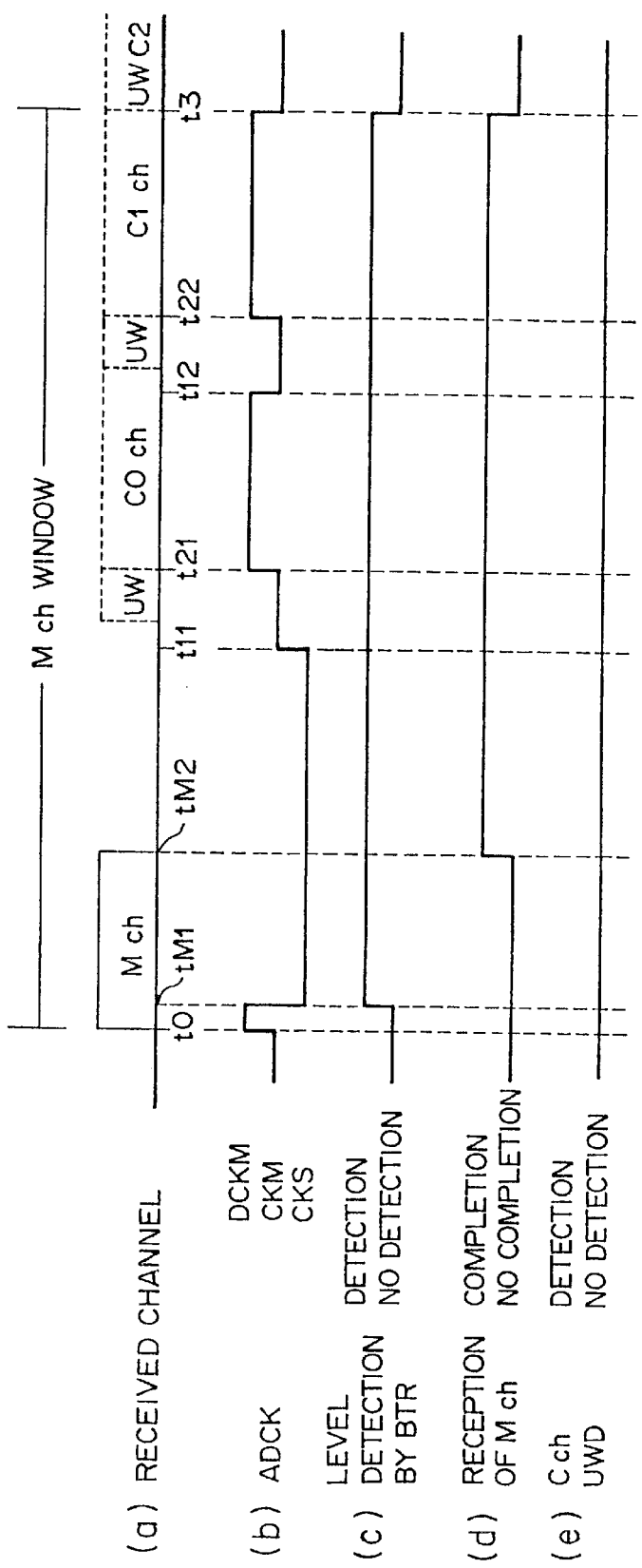

(5-2) the Case that Only an M Channel from a Registered CAU 4-i Arrives (see FIG. 26)

In this case, at the time (time tM1) that the level indicative of the reception of the M channel is detected in the BTR section 25-5 and the level detection signal goes into an H level as shown in (c) of FIG. 26, the clock controller 26-3 switches the sampling clock (ADCK) to the M-channel receive clock (CKS) produced in the BTR section 25-5 as shown in (b) of FIG. 26 to set the mode of the channel receiving section 14 to the M-channel receive mode. Owing to this, the M channel is normally receivable through the channel demultiplexing section 26-1.

Following this, as shown in (b) of FIG. 26, the controller 26-3 switches the sampling clock (ADCK) from the M-channel receive clock (CKS) to the system basic clock (CKM) at the time t11, and performs the switching of the sampling clock (ADCK) like the case in (b) of FIG. 26, because of no detection of the UW of each of the C0 and C1 channels as shown in (e) of FIG. 26.

As shown in (c) and (d) of FIG. 26, both the M-channel level detection signal and receive completion signal disappear (turn into an L level) when the present time t reaches the end time t3 of the "M channel window".

Figure 27:
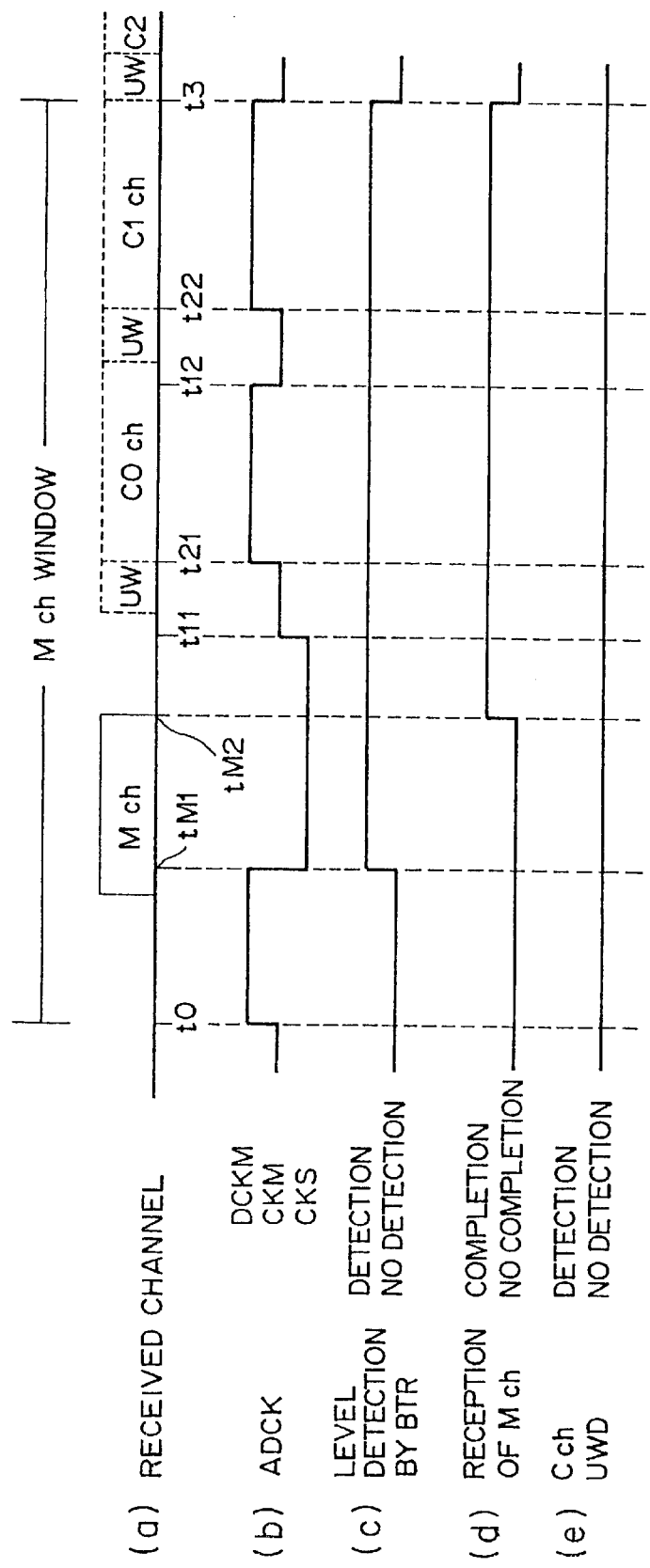

(5-3) the Case that Only an M Channel from a Non-Registered CAU 4-i Arrives between Time t0 and Time t11 (see FIG. 27)

In this case, as shown in (b) of FIG. 27, the clock controller 26-3 switches the sampling clock (ADCK) from the system basic clock (CKM) to the M-channel receive detection clock (DCKM) at the start time t0 of the "M channel window" to set the mode of the channel receiving section 14 to the M-channel receive detection mode, and subsequently, switches the sampling clock (ADCK) to the M-channel receive clock (CKS) at the time (time tM1) that the BTR section 25-5 detects the receive level of the M channel as shown in (c) of FIG. 27, so that the M channel is normally receivable.

Following this, the controller 26-3 performs the switching of the sampling clock (ADCK) as well as the case in (b) of FIG. 27, for that no detection of each of the UW of the C0 and C1 channels is made as shown in (e) of FIG. 27. Also in this case, as shown in (c) and (d) of FIG. 27, both the M-channel level detection signal and receive completion signal disappear when the present time t reaches the end time t3 of the "M channel window".

Figure 28:
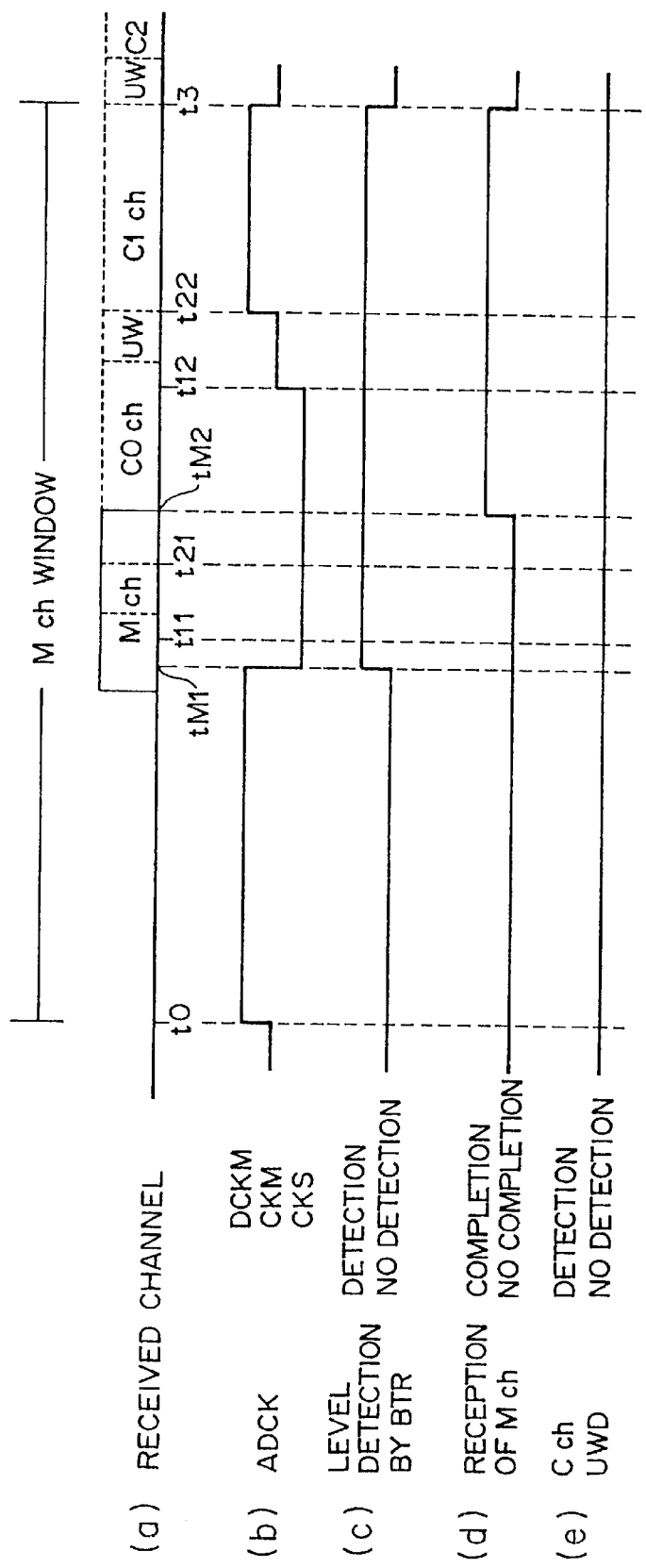

(5-4) the Case that Only an M Channel from a Non-Registered CAU 4-i Arrives between Time t0 and Time t11 and the Reception of the M Channel is not Completed Before Time t11 (see FIG. 28).

Likewise, in this case, as shown in (b) of FIG. 28, the clock controller 26-3 switches the sampling clock (ADCK) from the system basic clock (CKM) to the M-channel receive detection clock (DCKM) at the start time t0 of the "M channel window" to set the mode of the channel receiving section 14 to the M-channel receive detection mode, and subsequently, switches the sampling clock (ADCK) to the M-channel receive clock (CKS) at the time (time tM1) that the BTR section 25-5 detects the receive level of the M channel as shown in (c) of FIG. 28.

At this time, the controller 26-3 keeps the M-channel receive clock (CKS) as the sampling clock (ADCK) until the arrival at the time t12. Thereupon, even in the C0-channel receive period, the M channel is normally receivable.

Following this, the controller 26-3 switches the sampling clock (ADCK) to the system basic clock (CKM) at the time t12, thereby setting the mode of the channel receiving section 14 to a mode for detecting the UW of the C1 channel. However, in this case, since no detection of the UW of the C1 channel is made in the UWD 26-5 as shown in (e) of FIG. 28, the sampling clock (ADCK) is again set to the M-channel receive detection clock (DCKM) to set the mode of the channel receiving section 14 to the M-channel receive detection mode.

Similarly, in this case, as shown in (c) and (d) of FIG. 28, both the M-channel level detection signal and receive completion signal disappear when the present time t reaches the end time t3 of the "M channel window".

Figure 29:
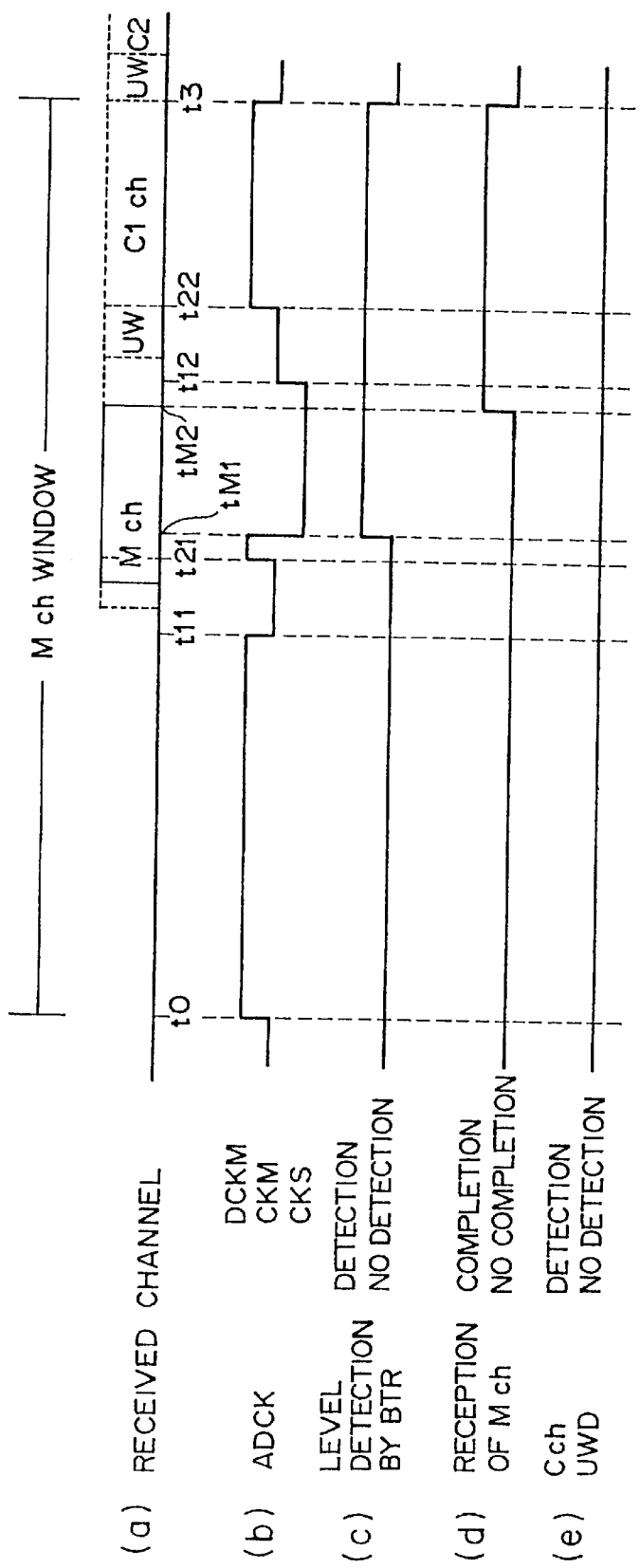

(5-5) the Case that Only an M Channel from a Non-Registered CAU 4-i Arrives between Time t11 and Time t21 and the Reception of the M Channel is Completed Before Time t12 (see FIG. 29)

In this case, the clock controller 26-3 switches the sampling clock (ADCK) from the system basic clock (CKM) to the M-channel receive detection clock (DCKM) at the time t21 to set the mode of the channel receiving section 14 to the M-channel receive detection mode, and subsequently, as shown in (c) of FIG. 29, the BTR section 25-5 detects the receive level of the M channel at the time tM1.

In this case, as shown in (b) of FIG. 29, since the sampling clock (ADCK) is the system basic clock (CKM) between the time t11 and the time t21, the detection of the level. of the M channel in the BTR section 25-5 is difficult within this period. However, the preamble of the M channel is sufficiently longer than the period between the time t11 and the time t21, and therefore, the BTR section 25-5 can detect the reception of the M channel on the basis of a portion other than the portion received within the period between the time t11 and the time t21.

Furthermore, as shown in (b) of FIG. 29, the controller 26-3 switches the sampling clock (ADCK) from the M-channel receive detection clock (DCKM) to the M-channel receive clock (CKS) at the time tM1 to set the mode of the channel receiving section 14 to the M-channel receive mode. This is the reason why the M channel is normally receivable even within the C0-channel receive period.

Thereafter, as shown in (b) of FIG. 29, the controller 26-3 switches the sampling clock (ADCK) to the system basic clock (CKM) at the time t12 to set the mode of the channel receiving section 14 to the C1-channel UW detection mode. In this state, if the UW of the C1 channel is not detected at the time t22 as shown in (e) of FIG. 29, as shown in (b) of FIG. 29, the controller 26-3 switches the sampling clock (ADCK) to the M-channel receive detection clock (DCKM) at the time t22 to set the mode of the channel receiving section 14 to the M-channel receive detection mode, thereby monitoring whether or not the reception of the M channel takes place.

Meanwhile, if the BTR section 25-5 does not detect the level of the M channel up to the time t3, the controller 26-3 switches the sampling clock (ADCK) to the system basic clock (CKM) to set the mode of the channel receiving section 14 to a receive allowable (wait) condition for the C2 channel, D channel and B channel from a registered CAU 4-i.

Similarly, in this case, as shown in (c) and (d) of FIG. 29, both the M-channel level detection signal and receive completion signal disappear when the present time t reaches the end time t3 of the "M channel window".

Figure 30:
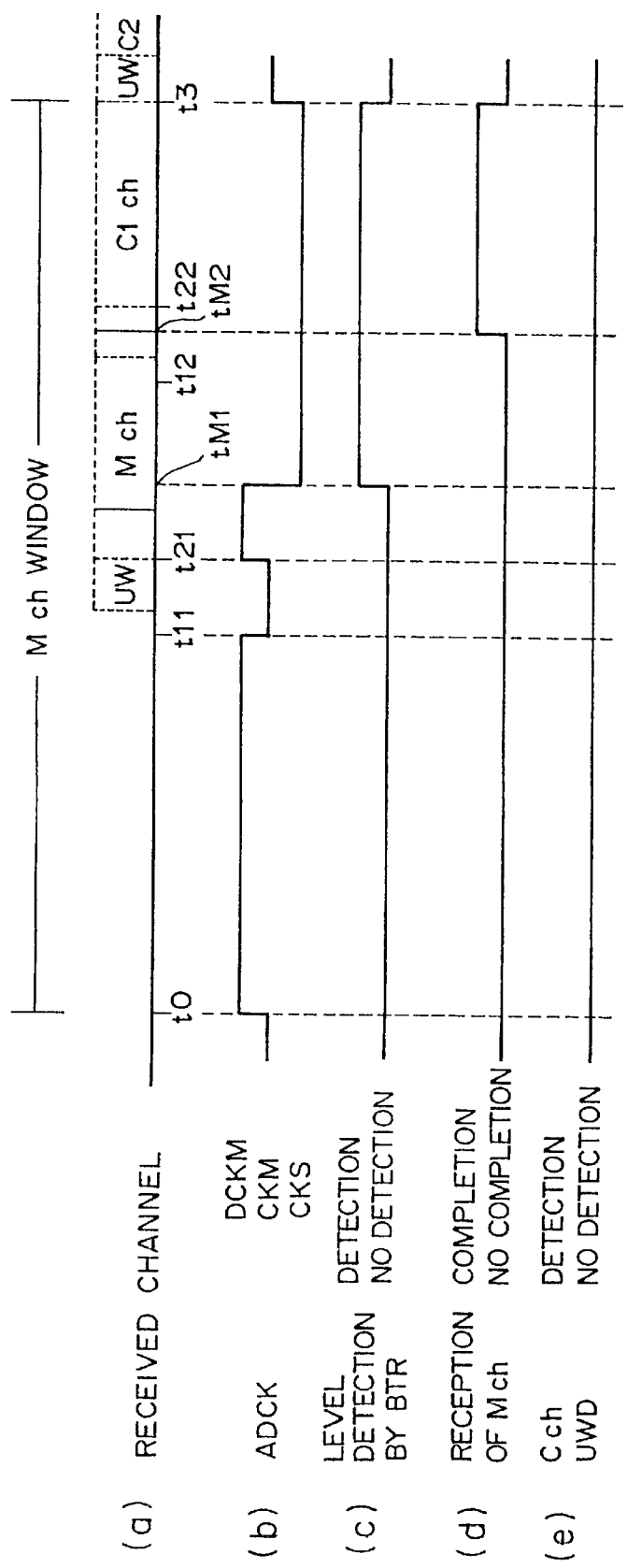

(5-6) the Case that Only an M Channel from a Non-Registered CAU 4-i Arrives between Time t21 and Time t12 and the Reception of the M Channel is not Completed Before Time t12 (see FIG. 30)

In this case, as shown in (b) of FIG. 30, the clock controller 26-3 switches the sampling clock (ADCK) from the system basic clock (CKM) to the M-channel receive detection clock (DCKM) at the time t21 to set the mode of the channel receiving section 14 to the M-channel receive detection mode, and then, as shown in (c) of FIG. 30, the BTR section 25-5 detects the level of the M channel at the time tM1.

Accordingly, the controller 26-3 switches the sampling clock (ADCK) from the M-channel receive detection clock (DCKM) to the M-channel receive clock (CKS) at the time tM1 to set the mode of the channel receiving section 14 to the M-channel receive mode. As a result, also in this case, the M channel is normally receivable even within the C0-channel receive period.

In this case, as shown in (b) of FIG. 30, when the present time t reaches the end time t3 of the "M channel window", the sampling clock (ADCK) is switched to the system basic clock (CKM) to allow the reception of a C2 channel from a registered CAU 4-i (the C1 channel is not receivable). Further, in this case, as shown in (c) and (d) of FIG. 30, both the M-channel level detection signal and receive completion signal disappear when the present time t reaches the end time t3 of the "M channel window".

Figure 31:
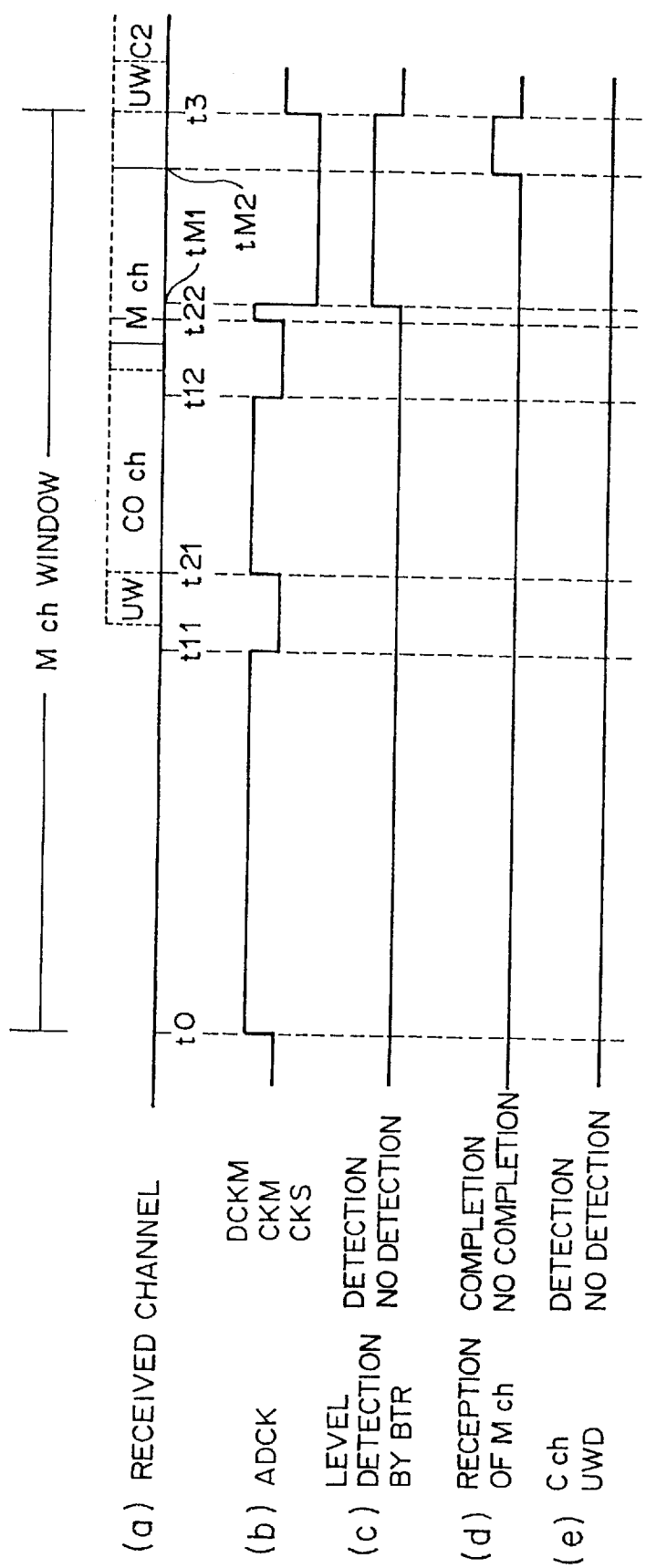

(5-7) the Case that Only an M Channel from a Non-Registered CAU 4-i Arrives between Time r12 and Time t22 (see FIG. 31)

In this case, as shown in (b) of FIG. 31, the clock controller 26-3 switches the sampling clock (ADCK) from the system basic clock (CKM) to the M-channel receive detection clock (DCKM) at the time t22 to set the mode of the channel receiving section 14 to the M-channel receive detection mode, and then, as shown in (c) of FIG. 31, the BTR section 25-5 detects the level of the M channel at the time tM1 on the basis of the remaining portion of the preamble of the M channel received between the time t12 and the time t22.

Accordingly, as shown in (b) of FIG. 31, the controller 26-3 switches the sampling clock (ADCK) from the system basic clock (CKM) to the M-channel receive clock (CKS) at the time tM1 to set the mode of the channel receiving section 14 to the M-channel receive mode. As a result, the channel receiving section 14 can normally receive the M channel even within the C1-channel receive period.

Similarly, in this case, as shown in (b) of FIG. 31, when the present time t reaches the end time t3 of the "M channel window", the sampling clock (ADCK) is switched to the system basic clock (CKM) to receive a C2 channel from a registered CAU 4-i. Further, in this case, as shown in (c) and (d) of FIG. 31, both the M-channel level detection signal and receive completion signal disappear when the present time t reaches the end time t3 of the "M channel window".

Figure 32:
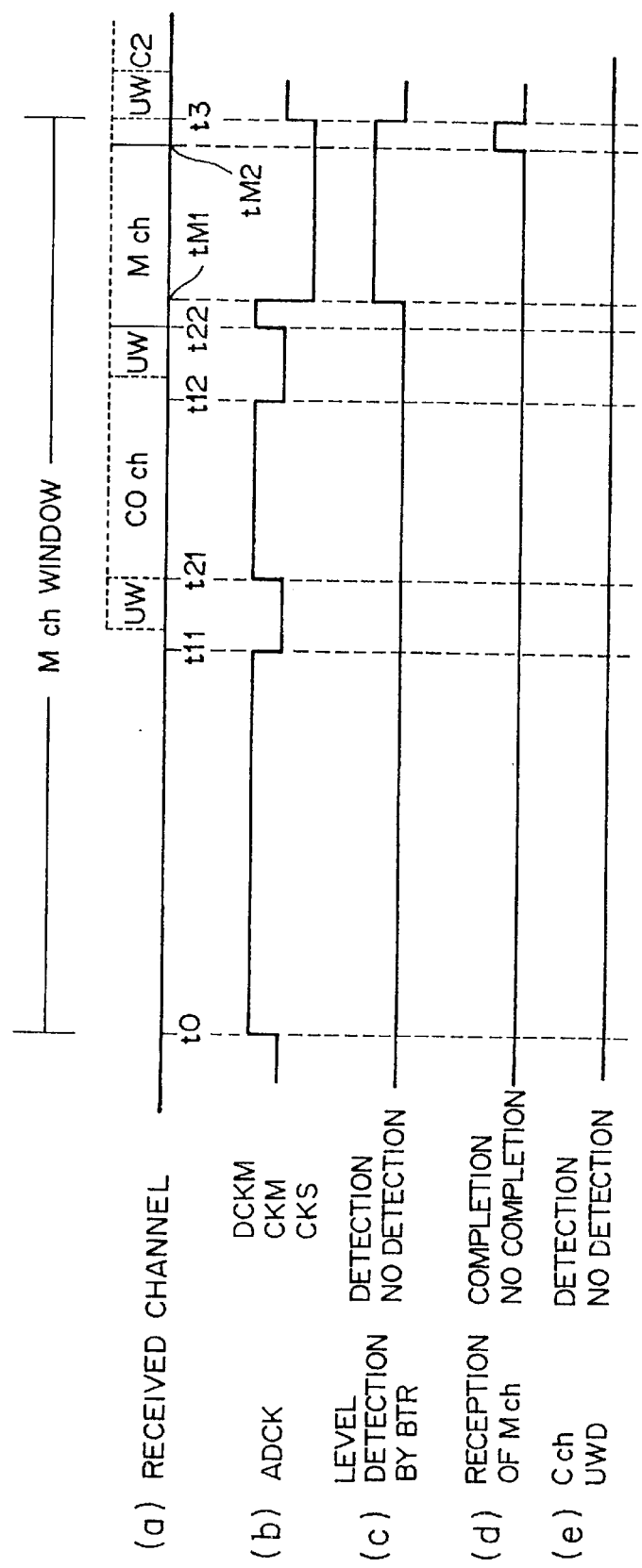

(5-8) the Case that Only an M Channel from a Non-Registered CAU 4-i Arrives between Time t22 and Time t3 (see FIG. 32)

Also in this case, now that the BTR section 25-5 detects the level of the M channel at the time tM1 as shown in (c) of FIG. 32, as shown in (b) of FIG. 32, the controller 26-3 switches the sampling clock (ADCK) from the system basic clock (CKM) to the M-channel receive clock (CKS) at the time tM1 to set the mode of the channel receiving section 14 to the M-channel receive mode. As a result, the channel receiving section 14 can normally receive the M channel even within the C1-channel receive period.

Similarly, in this case, as shown in (b) of FIG. 32, when the present time t reaches the end time t3 of the "M channel window", the sampling clock (ADCK) is switched to the system basic clock (CKM) to receive a C2 channel from a registered CAU 4-i. Further, in this case, as shown in (c) and (d) of FIG. 32, both the M-channel level detection signal and receive completion signal disappear when the present time t reaches the end time t3 of the "M channel window".

Figure 33:
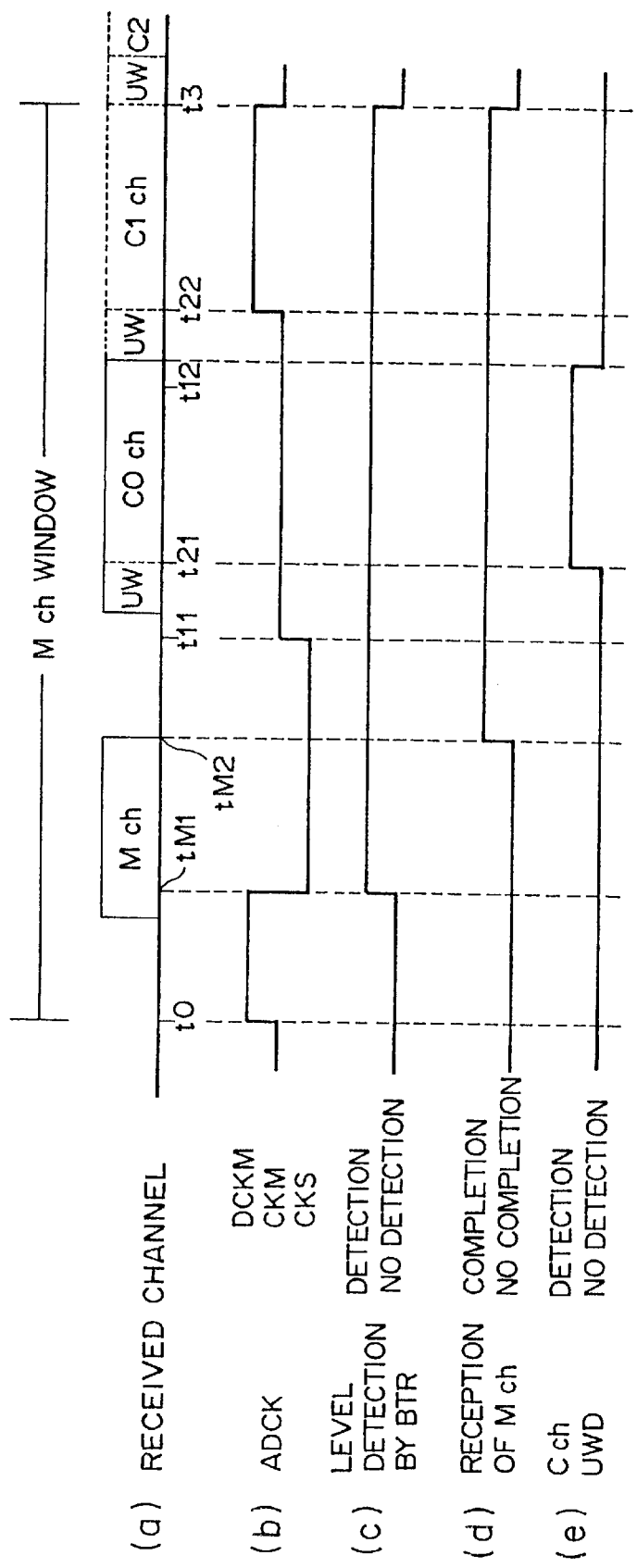

(5-9) the Case that an M Channel from a Non-Registered CAU 4-i Arrives between Time t0 to Time t11 and a C0 Channel from a Registered CAU 4-i Also Arrives (see FIG. 33).

In this case, as shown in (b) of FIG. 33, the controller 26-3 switches the sampling clock (ADCK) to the M-channel receive detection clock (DCKM) at the time t0 to set the mode of the channel receiving section 14 to the M-channel receive detection mode, and thereafter, as shown in (c) of FIG. 33, the BTR section 25-5 detects the level of the M channel at the time tM1.

Thus, as shown in (b) of FIG. 33, the controller 26-3 switches the sampling clock (ADCK) from the M-channel receive detection clock (DCKM) to the M-channel receive clock (CKS) at the time tM1 to set the mode of the channel receiving section 14 to the M-channel receive mode. As a result, the M channel is normalized by the channel receiving section 14 before the time t11.

Following this, as shown in (b) of FIG. 33, when the time t11 is reached, the controller 26-3 brings back the sampling clock (ADCK) from the M-channel receive clock (CKS) to the system basic clock (CKM) to set the mode of the channel receiving section 14 to the C0-channel receive detection mode.

In this state, when the UWD 26-3 detects the UW of the C0 channel at the time t21 as shown in (e) of FIG. 33, the controller 26-3 preserves the system basic clock (CKM) as the sampling clock (ADCK) as shown in (b) of FIG. 33, thereby setting the mode of the channel receiving section 14 to the C-channel receive mode. In consequence, the C0 channel is also normally receivable in the channel receiving section 14. Incidentally, the UW detection signal on the C0 channel disappears (assumes an L level) at the time of the completion of the reception in the channel demultiplexing section 26-1 as shown in (e) of FIG. 33.

Thereafter, in this case, since the UW of the C1 channel is not detected in the UWD 26-5 at the time t22, as shown in (b) of FIG. 33, the controller 26-3 switches the sampling clock (ADCK) from the system basic clock (CKM) to the M-channel receive detection clock (DCKM) at the time t22 to set the mode of the channel receiving section 14 to the M-channel receive detection mode.

Furthermore, since the level of the M channel is not in the BTR section 25-5 before the end time t3 of the "M channel window" as shown in (c) of FIG. 33, the controller 26-3 switches the sampling clock (ADCK) from the M-channel receive detection clock (DCKM) to the system basic clock (CKM) at the time t3 to receive the C2 channel from a registered CAU 4-i.

Also in this case, as shown in (c) and (d) of FIG. 33, both the M-channel level detection signal and receive completion signal disappear when the present time t reaches the end time t3 of the "M channel window".

Figure 34:
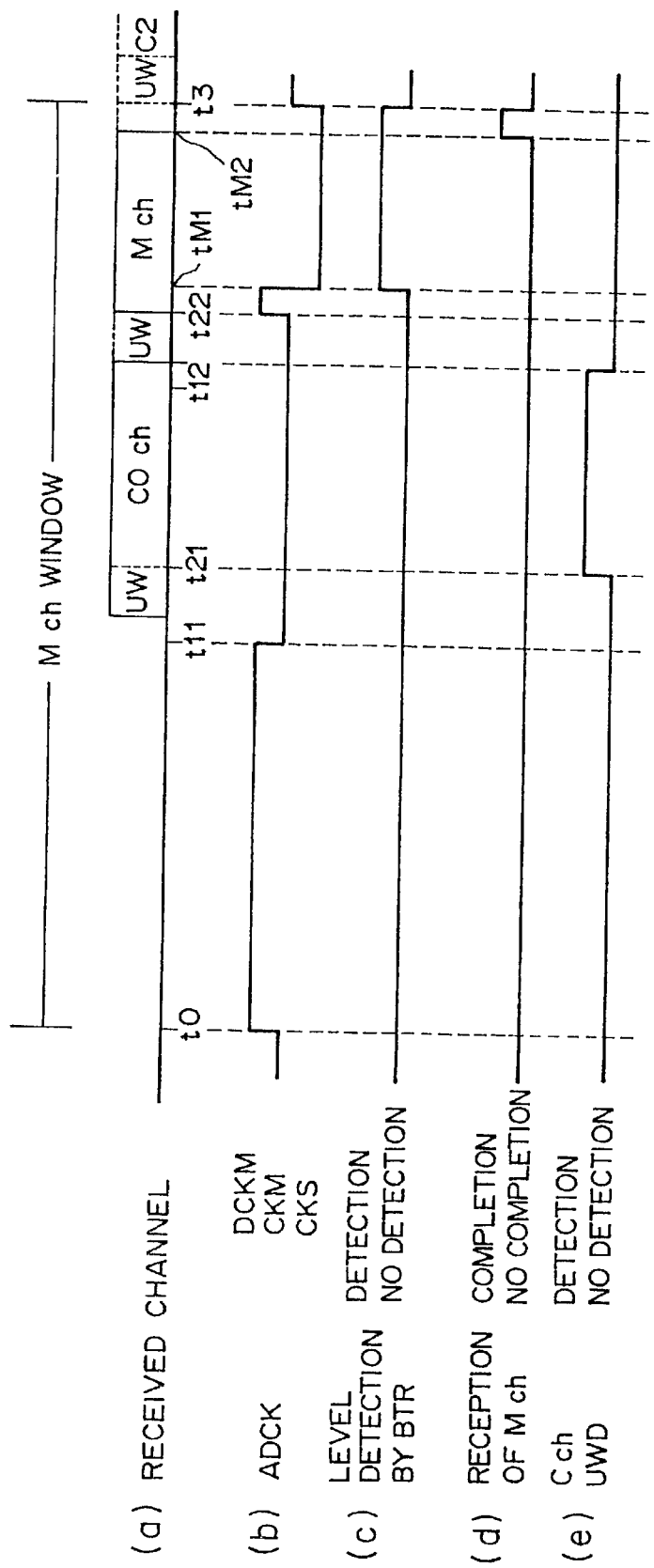

(5-10) the Case that an M Channel from a Non-Registered CAU 4-i Arrives between Time t22 to Time t3 and a C0 Channel from a Registered CAU 4-i Also Arrives (see FIG. 34).

In this case, no detection of the reception of the M channel is made before the time t11 as shown in (b) of FIG. 34, the controller 26-3 switches the sampling clock (ADCK) from the M-channel receive detection clock (DCKM) to the system basic clock (CKM) at the time t11, and thereafter, the UW of the C0 channel is detectable in the UWD 26-5 at the time t21 as shown in (e) of FIG. 34.

Thus, as shown in (b) of FIG. 34, the controller 26-3 keeps the system basic clock (CKM) as the sampling clock (ADCK) after the time t21 to set the mode of the channel receiving section 14 to the C0-channel receive mode. As a result, the C0 channel is normally receivable by the channel receiving section 14.

Following this, as shown in (b) of FIG. 34, when the time t22 is reached, the controller 26-3 switches the sampling clock (ADCK) from the system basic clock (CKM) to the M-channel receive detection clock (DCKM), and thereafter, the BTR section 25-5 detects the level of the M channel at the time tM1 in (c) of FIG. 34. Thus, as shown in (b) of FIG. 34, the controller 26-3 switches the sampling clock (ADCK) from the system basic clock (CKM) to the M-channel receive clock (CKS) to set the mode of the channel receiving section 14 to the M-channel receive mode.

Whereupon, the channel receiving section 14 can normally receive the M channel even within the C1-channel receive period.

Also in this case, as shown in (b) of FIG. 34, when the present time t reaches the end time t3 of the "M channel window", the sampling clock (ADCK) is switched to the system basic clock (CKS) to receive a C2 channel from a registered CAU 4-i. Further, as shown in (c) and (d) of FIG. 34, both the M-channel level detection signal and receive completion signal disappear when the present time t reaches the end time t3 of the "M channel window".

Figure 35:
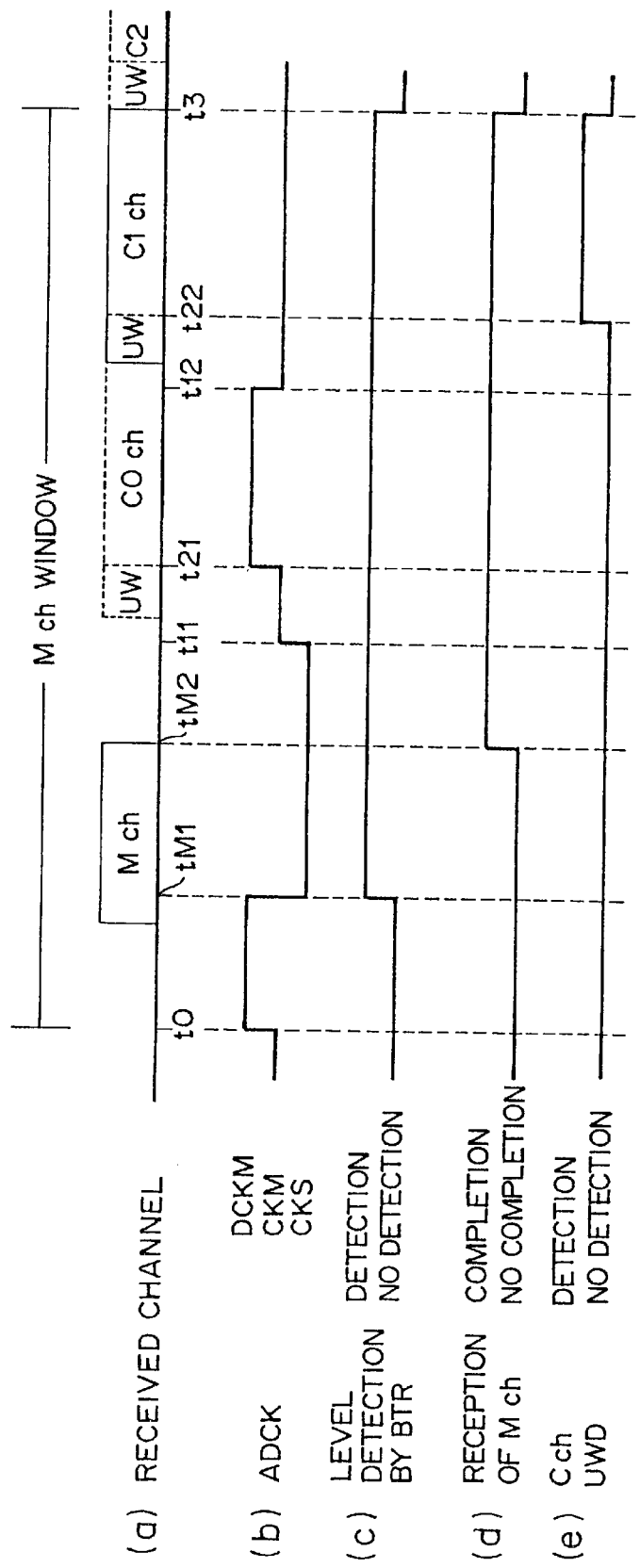

(5-11) the Case that an M Channel from a Non-Registered CAU 4-i Arrives between Time t0 and Time t11 and a C1 Channel from a Registered CAU 4-i Also Arrives (see FIG. 35)

In this case, as shown in (b) of FIG. 35, the controller 26-3 switches the sampling clock (ADCK) from the system basic clock (CKM) to the M-channel receive detection clock (DCKM) at the time t0, and thereafter, the BTR section 25-5 detects the level of the M channel at the time tM1.

Thus, as shown in (b) of FIG. 35, the controller 263 switches the sampling clock (ADCK) from the M-channel receive detection clock (DCKM) to the M-channel receive clock (CKS) at the time tM1 to set the mode of the channel receiving section 14 to the M-channel receive mode, with the result that the channel receiving section 14 can normally receive the M channel.

Furthermore, when the present time t reaches the time t11 after the completion of the reception of the M channel at the time tM2 as shown in (d) of FIG. 35, the controller 26-3 switches the sampling clock (ADCK) from the M-channel receive clock (CKS) to the system basic clock (CKM) as shown in (b) of FIG. 35 to set the mode of the channel receiving section 14 to the C0-channel receive detection mode, thereby monitoring the reception of the UW of the C0 channel.

At this time, since no reception of the C0 channel is made as shown in (e) of FIG. 35 (the UW of the C0 channel is not detected), the controller 26-3 switches the sampling clock (ADCK) from the system basic clock (CKM) to the M-channel receive detection clock (DCKM) on the arrival at the time t21 as shown in (b) of FIG. 35 to set the mode of the channel receiving section 14 to the M-channel receive detection mode.

Incidentally, at this time, although the M-channel level detection signal is at an H level as shown in (c) of FIG. 35, since the M-channel receive completion signal is also at an H level as shown in (d) of FIG. 35, the clock controller 26-3 recognizes that the M channel is already received, and hence, does not perform the switching of the sampling clock (ADCK).

Following this, as shown in (b) of FIG. 35, the controller 26-3 switches the sampling clock (ADCK) to the system basic clock (CKM) upon the arrival at the time t12 to set the mode of the channel receiving section 14 to the C1-channel receive detection mode. In this state, when the UWD 26-5 detects the UW of the C1 channel at the time t22, the controller 26-3 preserves the system basic clock (CKM) as the sampling clock (ADCK) at the time t22 as shown in (b) of FIG. 35, thereby setting the mode of the channel receiving section 14 to the C-channel receive mode. As a result, the channel receiving section 14 can normally receive the C1 channel.

Also in this case, as shown in (c) and (d) of FIG. 35, both the M-channel level detection signal and receive completion signal disappear when the present time t reaches the end time t3 of the "M channel window".

Figure 36:
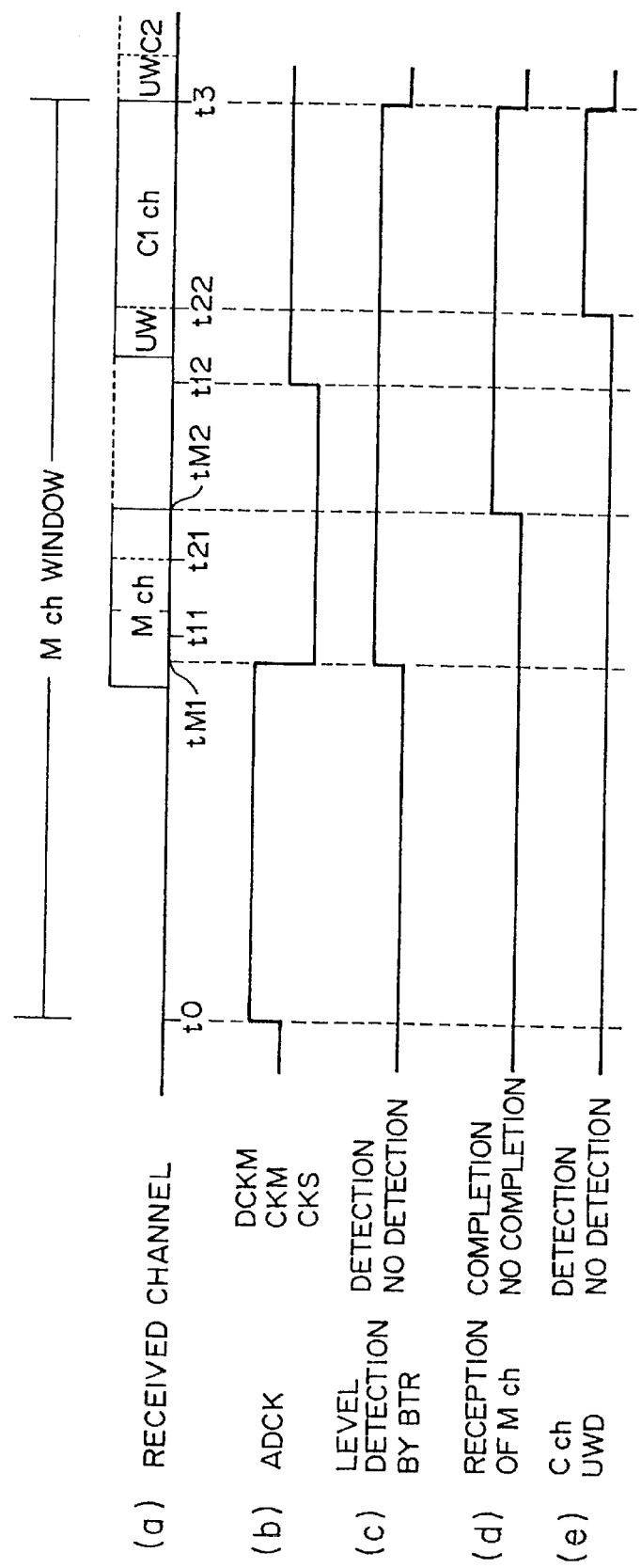

(5-12) the Case that an M Channel from a Non-Registered CAU 4-i Arrives between Time t0 and Time t11 but the Reception of the M Channel is not Completed Before Time t11, and a C1 Channel from a Registered CAU 4-i Also Arrives (see FIG. 36)

Likewise, since the BTR section 25-5 detects the level of the M channel at the time tM1 as shown in (c) of FIG. 36, the controller 36-3 switches the sampling clock (ADCK) from the M-channel receive detection clock (DCKM) to the M-channel receive clock (CKS) at the time tM1 as shown in (b) of FIG. 36 to set the mode of the channel receiving section 14 to the M-channel receive mode.

Furthermore, in this case, as shown in (b) of FIG. 36, the controller 26-3 maintains the M-channel receive clock (CKS) as the sampling clock (ADCK) until the present time t reaches the time t12. Thus, even if the M channel arrives in the C0-channel receive period, the M channel is normally receivable.

Thereafter, when the present time t reaches the time t12, as shown in (b) of FIG. 36, the controller 26-3 switches the sampling clock (ADCK) to the system basic clock (CKM) to set the mode of the channel receiving section 14 to the C1-channel receive detection mode. In this state, when the UWD 26-5 detects the UW of the C1 channel at the time t22 as shown in (e) of FIG. 36, the controller 26-3 maintains the system basic clock (CKM) as the sampling clock (ADCK) after the time t22 to set the mode of the channel receiving section 14 to the C1-channel receive mode. Owing to this, the channel receiving section 14 can also normally receive the C1 channel.

Also in this case, as shown in (c), (d) and (e) of FIG. 36, both the M-channel level detection signal and receive completion signal and the C-channel UW detection signal disappear when the present time t reaches the end time t3 of the "M channel window".

Figure 37:
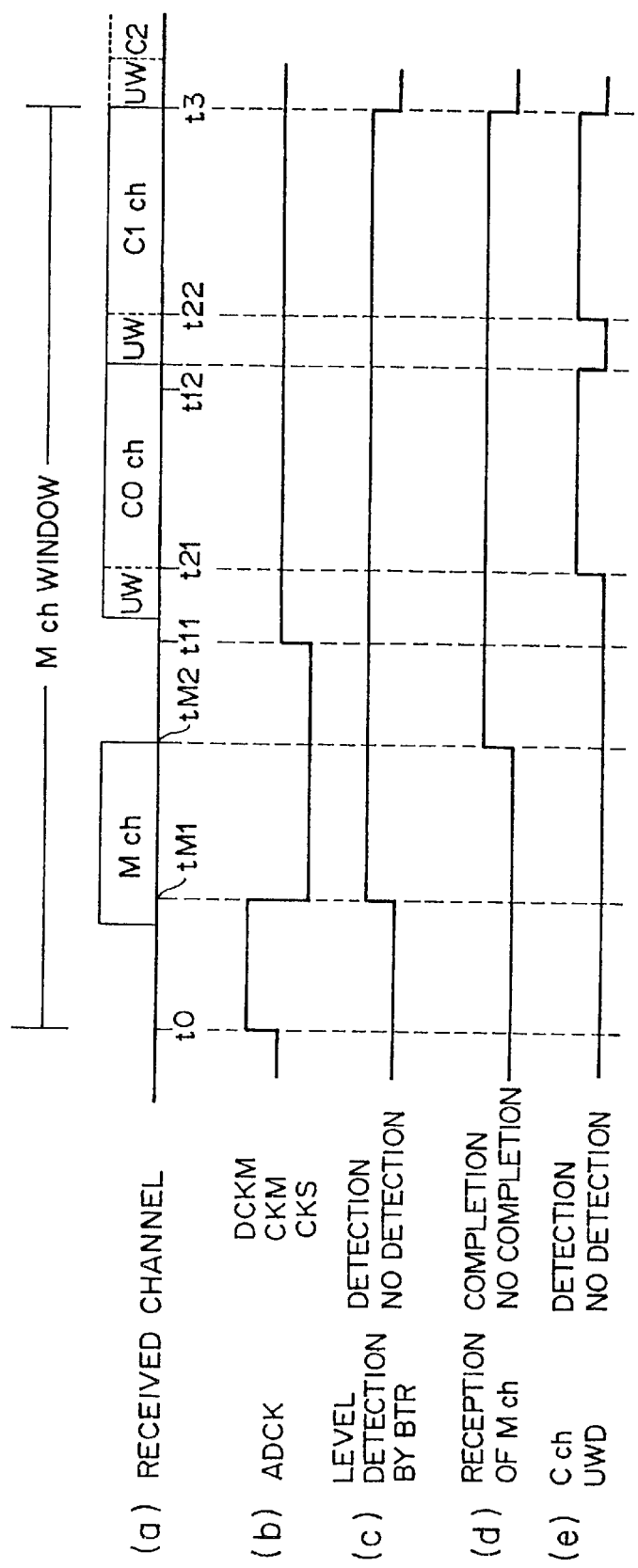

(5-13) the Case that an M Channel from a Non-Registered CAU 4-i Arrives between Time t0 and Time t11 and C0 and C1 Channels from Registered CAUs 4-i (see FIG. 37)

Even in this case, since the BTR section 25-5 detects the level of the M channel at the time tM1 as shown in (c) of FIG. 37, the controller 26-3 switches the sampling clock (ADCK) from the M-channel receive detection clock (DCKM) to the M-channel receive clock (CKS) at the time tM1 as shown in (b) of FIG. 37, thereby setting the mode of the channel receiving section 14 to the M-channel receive mode. Thus, the channel receiving section 14 can normally complete the reception of the M channel before the time t11.

After this, when the present time t reaches the time t11, as shown in (b) of FIG. 37, the controller 26-3 switches the sampling clock (ADCK) from the M-channel receive clock (CKS) to the system basic clock (CKM) to set the mode of the channel receiving section 14 to the C0-channel receive detection mode. In addition, in this case, since the UWD 26-5 detects the UW of the C0 channel at the time t21, the controller 26-3 maintains the system basic clock (CKM) as the sampling clock (ADCK) after the time t21, thereby putting the mode of the channel receiving section 14 to the C0-channel receive mode. Accordingly, the C0 channel is normally receivable in the channel receiving section 14.

Following this, when the UWD 26-5 detects the UW of the C1 channel at the time t22, the controller 26-3 further keeps the system basic clock (CKM) as the sampling clock (ADCK) after the time t22 to put the mode of the channel receiving section 14 into the C1-channel receive mode, which allows the channel receiving section 14 to also normally receive the C1 channel subsequently to the C0 channel.

Also in this case, as shown in (c) and (d) of FIG. 37, both the M-channel level detection signal and receive completion signal disappear when the present time t reaches the end time t3 of the "M channel window". In addition, the UW detection signals of the C0 and C1 channels undo at the time that the reception of the C0 channel and the C1 channel come to an end as shown in (e) of FIG. 37.

As described above, in the CATV system 1 (CAM 2) according to the modification, since the sampling clock (ADCK) is switched to control the receive processing by the channel receiving section 14 so that the clock controller 26-3 is capable of receiving a portion (C0 channel and C1 channel) of the C0 channel, the C1 channel and the C2 channel for the packet communications, this modification can offer the effects and advantage similar to those of the above-described embodiment, coupled with the following advantages.

That is, since there is a possibility that the C0 channel and the C1 channel are not normally received because of the overlapped reception with the M channel (its reliability lowers), for the packet communications using the C0 and C1 channels, for instance, it is also possible to set a cheaper charge than that of the packet communications using the other C2 channel, and therefore, it is possible to flexibly offer the communication service in answer to the needs from the users.

Although this modification is made to allow the reception of the M channel within the above-mentioned two C-channel receive periods, it is also possible that the M channel can be received within the three or more C-channel (C0 to CX channels: where X is an integer not less than 2) receive periods.

In this case, for instance, as well as the cases shown in FIGS. 25 to 37, the UW detection timings on the Cj channels (where j=0 to X) are respectively prescribed as times t21, t22, t23, . . . and the timings prior by 2 clocks to these UW detection timings are respectively prescribed as the times t11, t12, t13, . . . to set the receive periods for the respective Cj channels, and the controller 26-3 decides, in the steps G6' and G14' in FIG. 24, whether the present time t reaches the aforesaid times t11, t12, t13, . . . , and further, decides, in the step G20' in the same illustration, whether or not the present time t reaches the aforesaid times t21, t22, t23, . . . , so that the above-mentioned functions are realizable.

(6) Others

Figure 38:
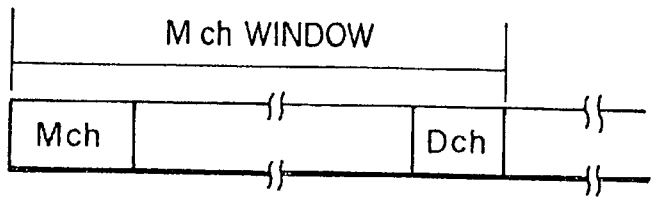
FIGS. 38 to 42 are illustrations of an up-frame format for describing another modification of the M channel and C channel receive processing which constitutes a principal portion of this embodiment.
Figure 39:
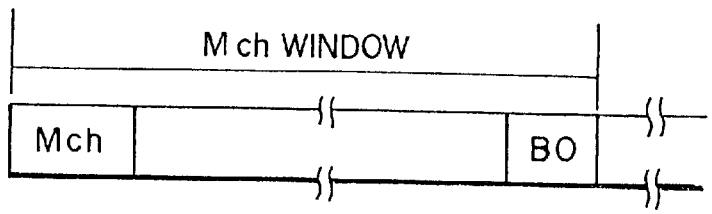

Although in the above-described embodiment the C-channel receive period is exemplified as a (M-channel-receivable) period for receiving a service channel (fixed channel), it is also possible that this period is set as a D-channel receive period as illustratively shown in FIG. 38 or is set as a B-channel receive period as illustratively shown in FIG. 39. In either case, as in the above-described embodiment, the "M channel window" is extensible, and the throughput of the D channel and the B channel is improvable to improve the bands of call control communications or communications of data including voices.

Figure 40:
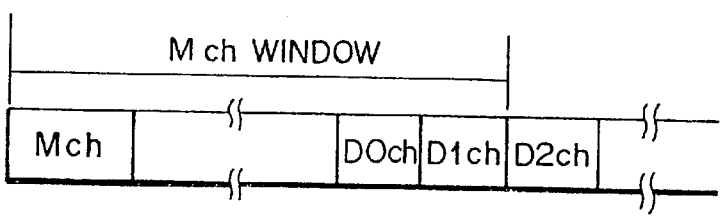
Figure 41:
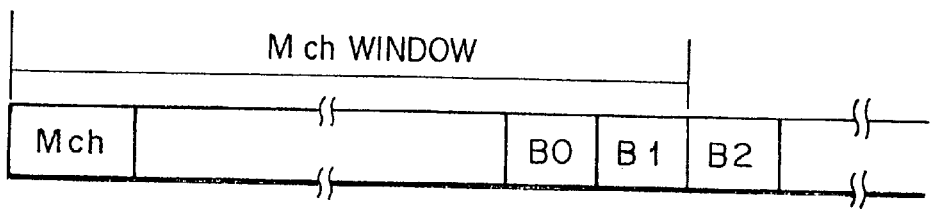

In addition, as well as the above-described modification, this period can also be set as a period for receiving a portion of a plurality of D channels as illustratively shown in FIG. 40, or set as a period for receiving a portion of a plurality of B channels as illustratively shown in FIG. 41. In either case, as well as the above-described modification, it is possible to make a difference between a portion of channels which allows the reception of the M channel (that is, which is included within the "M channel window") and the other channels, with the result that it is possible to flexibly offer the communication service in answer to the needs from the users.

Figure 42:
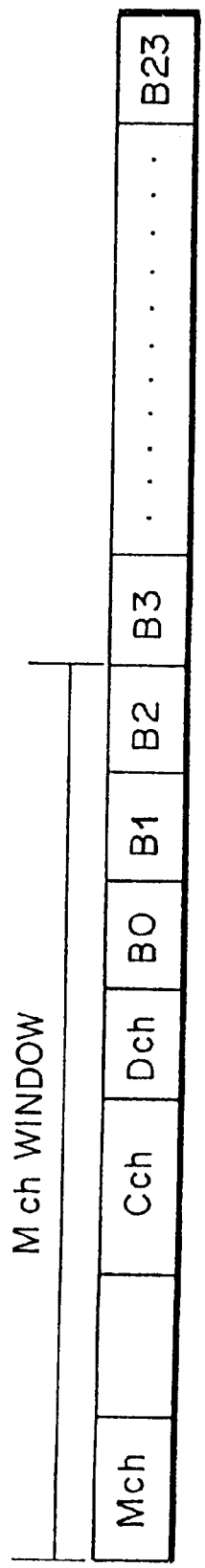

Moreover, it is also acceptable that, as illustratively shown in FIG. 42, this period is set as a period for receiving a plurality of channels such as a C channel, a D channel and a B channel which are different in application. In this case, it is possible that the C channel, the D channel and the B channel are properly extended to expand the bands of packet communications, call control communications and data communications including audio data for improving the throughput of each of the communications. Accordingly, it is possible to improve the services in the respective communications, and to more flexibly offer the communication service in answer to the needs from the users.

Besides, a combination of channels to be received within this period can be determined arbitrarily (for example, a combination of a C channel and a D channel, a combination of a D channel and a B channel, or a combination of a C channel and a B channel).

It should be understood that the present invention is not limited to the above-described embodiment, and that it is intended to cover all changes and modifications of the embodiments of the invention herein which do not constitute departures from the spirit and scope of the invention.

What is claimed is:

1. A time division multiple access communication system comprising a plurality of subscriber's units and a center unit for performing a time division multiple access communication with respect to said subscriber's units, with a synchronization establishing signal being exchanged between said center unit and each of said subscriber's units for establishing synchronization in the communication between said center unit and said subscriber's unit so that said subscriber's unit controls its own signal transmission timing to establish the synchronization of the communication with said center unit, said center unit including:

a channel receiving section for receiving a frame signal including said synchronization establishing signal from a non-synchronization established subscriber's unit, whose receive timing is variable in the frame signal in accordance with a distance from said non-synchronization established subscriber's unit, as a varying channel signal, and a communication signal, as a fixed channel signal, from a synchronization established subscriber's unit at a constant timing; and a control section for controlling receive processing in said channel receiving section so as to receive said varying channel signal from the non-synchronization established subscriber's unit during a fixed channel receive period for receiving and processing said fixed channel signal from the synchronization established subscriber's unit in the same frame signal.

2. A time division multiple access communication system as defined in claim 1,
wherein said center unit includes:
a varying channel receive detecting section for detecting the reception of said varying channel signal; and
a fixed channel receive detecting section for detecting the reception of said fixed channel signal, and
said control section, when said varying channel receive detecting section detects the reception of said varying channel signal within said fixed channel receive period, controls said receive processing in said channel receiving section to receive said varying channel signal, and, when said fixed channel receive detecting section detects the reception of said fixed channel signal within said fixed channel receive period, controls said receive processing in said channel receiving section to receive said fixed channel signal.

3. A time division multiple access communication system as defined in claim 2, wherein said control section sets, as said fixed channel receive period, an arbitrary period other than a period for receiving said varying channel signal from the synchronization established subscriber's unit, and controls said receive processing in said channel receiving section so that said varying channel signal is receivable within said fixed channel receive period.

4. A time division multiple access communication system as defined in claim 3, wherein said control section sets, as said fixed channel receive period, a period for receiving a packet communication channel signal, and controls said receive processing in said channel receiving section so that said varying channel signal is receivable within said packet communication channel signal receive period.

5. A time division multiple access communication system as defined in claim 3, wherein said control section sets, as said fixed channel receive period, a portion receive period for receiving a portion of a plurality of packet communication channel signals, and controls said receive processing in said channel receiving section so that said varying channel signal is receivable within said portion receive period.

6. A time division multiple access communication system as defined in claim 1, wherein said control section sets, as said fixed channel receive period, an arbitrary period other than a period for receiving said varying channel signal from the synchronization established subscriber's unit, and controls said receive processing in said channel receiving section so that said varying channel signal is receivable within said fixed channel receive period.

7. A time division multiple access communication system as defined in claim 6, wherein said control section sets, as said fixed channel receive period, a period for receiving a packet communication channel signal, and controls said receive processing in said channel receiving section so that said varying channel signal is receivable within said packet communication channel signal receive period.

8. A time division multiple access communication system as defined in claim 6, wherein said control section sets, as said fixed channel receive period, a portion receive period for receiving a portion of a plurality of packet communication channel signals, and controls said receive processing in said channel receiving section so that said varying channel signal is receivable within said portion receive period.

9. A signal receiving method for use in a time division multiple access communication system comprising a plurality of subscriber's units and a center unit for performing a time division multiple access communication with respect to said subscriber's units, with a synchronization establishing signal being exchanged between said center unit and each of said subscriber's units for establishing synchronization in the communication between said center unit and said subscriber's unit so that said subscriber's unit controls its own signal transmission timing to establish the synchronization in the communication with said center unit,
wherein, when said center unit receives a frame signal including said synchronization establishing signal from a non-synchronization established subscriber's unit, whose receive timing is variable in accordance with a distance from said non-synchronization established subscriber's unit, as a variable in accordance with a distance from said non-synchronization established subscriber's unit, as a varying channel signal, and a communication signal, as a fixed channel signal, from a synchronization established subscriber's unit at a constant timing, the reception and processing of said varying channel signal, from the non-synchronization established subscriber's unit, takes place within a fixed channel receive period for receiving said fixed channel signal from the synchronization established subscriber's unit in the same frame signal.

10. A signal receiving method for use in a time division multiple access communication system as defined in claim 9, wherein said center unit conducts receive processing for said varying channel signal when detecting the reception of said varying channel signal within said fixed channel receive period while performing receive processing for said fixed channel signal when detecting the reception of said fixed channel signal within said fixed channel receive period.

11. A signal receiving method for use in a time division multiple access communication system as defined in claim 10, wherein said center unit sets, as said fixed channel receive period, an arbitrary period other than a period for receiving said varying channel signal from the synchronization established subscriber's unit, and receives said varying channel signal within said arbitrary period.

12. A signal receiving method for use in a time division multiple access communication system as defined in claim 10, wherein, when said varying channel signal and said fixed channel signal are received in said center unit in an overlapped condition within said fixed channel receive period, said center unit sends a request for stopping transmission of said fixed channel signal to the synchronization established subscriber's unit, while said subscriber's unit stops the transmission of said fixed channel signal when receiving said request from said center unit.

13. A signal receiving method for use in a time division multiple access communication system as defined in claim 11, wherein said fixed channel receive period is set as a period for receiving a channel signal in packet communication.

14. A signal receiving method for use in a time division multiple access communication system as defined in claim 11, wherein said fixed channel receive period is set as a period for receiving a portion of a plurality of channel signals in packet communication.

15. A signal receiving method for use in a time division multiple access communication system as defined in claim 11, wherein said fixed channel receive period is set as a period for receiving a channel signal in call control.

16. A signal receiving method for use in a time division multiple access communication system as defined in claim 11, wherein said fixed channel receive period is set as a period for receiving a portion of a plurality of channel signals in call control.

17. A signal receiving method for use in a time division multiple access communication system as defined in claim 11, wherein said fixed channel receive period is set as a period for receiving a channel signal in data communication.

18. A signal receiving method for use in a time division multiple access communication system as defined in claim 11, wherein said fixed channel receive period is set as a period for receiving a portion of a plurality of channel signals in data communication.

19. A signal receiving method for use in a time division multiple access communication system as defined in claim 11, wherein said fixed channel receive period is set as a period for receiving a plurality of channel signals in different applications.

20. A signal receiving method for use in a time division multiple access communication system as defined in claim 19, wherein said plurality of channel signals are composed of an arbitrary combination of a packet communication channel signal, a call control channel signal and a data communication channel signal.

21. A signal receiving method for use in a time division multiple access communication system as defined in claim 9, wherein said center unit receives said varying channel signal within an arbitrary period other than a period for receiving said varying channel signal from the synchronization established subscriber's unit which is set as said fixed channel receive period.

22. A signal receiving method for use in a time division multiple access communication system as defined in claim 9, wherein, when said varying channel signal and said fixed channel signal are received in said center unit in an overlapped condition within said fixed channel receive period, said center unit sends a request for stopping transmission of said fixed channel signal to the synchronization established subscriber's unit, while said subscriber's unit stops the transmission of said fixed channel signal when receiving said request from said center unit.

23. A signal receiving method for use in a time division multiple access communication system as defined in claim 21, wherein said fixed channel receive period is set as a period for receiving a channel signal in packet communication.

24. A signal receiving method for use in a time division multiple access communication system as defined in claim 21, wherein said fixed channel receive period is set as a period for receiving a portion of a plurality of channel signals in packet communication.

25. A signal receiving method for use in a time division multiple access communication system as defined in claim 21, wherein said fixed channel receive period is set as a period for receiving a channel signal in call control.

26. A signal receiving method for use in a time division multiple access communication system as defined in claim 21, wherein said fixed channel receive period is set as a period for receiving a portion of a plurality of channel signals in call control.

27. A signal receiving method for use in a time division multiple access communication system as defined in claim 21, wherein said fixed channel receive period is set as a period for receiving a channel signal in data communication.

28. A signal receiving method for use in a time division multiple access communication system as defined in claim 21, wherein said fixed channel receive period is set as a period for receiving a portion of a plurality of channel signals in data communication.

29. A signal receiving method for use in a time division multiple access communication system as defined in claim 21, wherein said fixed channel receive period is set as a period for receiving a plurality of channel signals in different applications.

30. A signal receiving method for use in a time division multiple access communication system as defined in claim 29, wherein said plurality of channel signals are composed of an arbitrary combination of a packet communication channel signal, a call control channel signal and a data communication channel signal.

31. A center unit for use in a time division multiple access communication system which comprises a plurality of subscriber's units, with a synchronization establishing signal being exchanged with respect to each of said subscriber's units for establishing synchronization in the communication with respect to said subscriber's unit so that said subscriber's unit controls its own signal transmission timing to establish the synchronization in the communication, said center unit comprising:

a channel receiving section for receiving a frame signal including said synchronization establishing signal from a non-synchronization established subscriber's unit, whose receive timing is variable in accordance with a distance from said non-synchronization established subscriber's unit, as a varying channel signal, and a communication signal, as a fixed channel signal, from a synchronization established subscriber's unit at a constant timing; and a control section for controlling receive processing in said channel receiving section so as to receive said varying channel signal from the non-synchronization established subscriber's unit during a fixed channel receive period for receiving said fixed channel signal from the synchronization established subscriber's unit in the same frame signal.

32. A center unit for use in a time division multiple access communication system as defined in claim 31, further comprising a varying channel receive detecting section for detecting the reception of said varying channel signal, and a fixed channel receive detecting section for detecting the reception of said fixed channel signal, wherein said control section, when said varying channel receive detecting section detects the reception of said varying channel signal within said fixed channel receive period, controls said receive processing in said channel receiving section to receive said varying channel signal, and, when said fixed channel receive detecting section detects the reception of said fixed channel signal within said fixed channel receive period, controls said receive processing in said channel receiving section to receive said fixed channel signal.

33. A center unit for use in a time division multiple access communication system as defined in claim 32, wherein said control section sets, as said fixed channel receive period, an arbitrary period other than a period for receiving said varying channel signal from the synchronization established subscriber's unit, and controls said receive processing in said channel receiving section so that said fixed channel signal is receivable within said fixed channel receive period.

34. A center unit for use in a time division multiple access communication system as defined in claim 33, wherein said control section sets, as said fixed channel receive period, a period for receiving a packet communication channel signal, and controls said receive processing in said channel receiving section so that said varying channel signal is receivable within said packet communication channel signal receive period.

35. A center unit for use in a time division multiple access communication system as defined in claim 33, wherein said control section sets, as said fixed channel receive period, a portion period for receiving a portion of a plurality of packet communication channel signals, and controls said receive processing in said channel receiving section so that said varying channel signal is receivable within said portion period.

36. A center unit for use in a time division multiple access communication system as defined in claim 31, wherein said control section sets, as said fixed channel receive period, an arbitrary period other than a period for receiving said varying channel signal from the synchronization established subscriber's unit, and controls said receive processing in said channel receiving section so that said fixed channel signal is receivable within said fixed channel receive period.

37. A center unit for use in a time division multiple access communication system as defined in claim 36, wherein said control section sets, as said fixed channel receive period, a period for receiving a packet communication channel signal, and controls said receive processing in said channel receiving section so that said varying channel signal is receivable within said packet communication channel signal receive period.

38. A center unit for use in a time division multiple access communication system as defined in claim 36, wherein said control section sets, as said fixed channel receive period, a portion period for receiving a portion of a plurality of packet communication channel signals, and controls said receive processing in said channel receiving section so that said varying channel signal is receivable within said portion period.

* * * * *